US010875641B2

(12) United States Patent
Kovac et al.

(10) Patent No.: US 10,875,641 B2
(45) Date of Patent: Dec. 29, 2020

(54) AERIAL DEVICES CAPABLE OF CONTROLLED FLIGHT

(71) Applicant: Imperial College of Science, Technology and Medicine, London (GB)

(72) Inventors: Mirko Kovac, London (GB); Pooya Sareh, London (GB)

(73) Assignee: Imperial College of Science, Technology and Medicine, London (GB)

( * ) Notice: Subject to any disclaimer, the term of this patent is extended or adjusted under 35 U.S.C. 154(b) by 447 days.

(21) Appl. No.: 15/578,532

(22) PCT Filed: May 27, 2016

(86) PCT No.: PCT/GB2016/051567
§ 371 (c)(1),
(2) Date: Nov. 30, 2017

(87) PCT Pub. No.: WO2016/193690
PCT Pub. Date: Dec. 8, 2016

(65) Prior Publication Data
US 2018/0155018 A1   Jun. 7, 2018

(30) Foreign Application Priority Data

Jun. 1, 2015 (GB) .................................... 1509509.4
Jan. 4, 2016 (GB) .................................... 1600130.7

(51) Int. Cl.
*B64C 29/00*     (2006.01)
*B64C 39/02*     (2006.01)
(Continued)

(52) U.S. Cl.
CPC .......... *B64C 29/0016* (2013.01); *B64C 25/10* (2013.01); *B64C 27/20* (2013.01);
(Continued)

(58) Field of Classification Search
CPC .. B64C 9/34; B64C 9/36; B64C 25/10; B64C 27/20; B64C 29/0016; B64C 39/024;
(Continued)

(56) References Cited

U.S. PATENT DOCUMENTS 6,322,021 B1   11/2001  Fisher et al.
9,527,596 B1*  12/2016  Adams .................. B64C 39/024
(Continued)

FOREIGN PATENT DOCUMENTS

EP    1193168    4/2002
EP    1988014   12/2010
(Continued)

OTHER PUBLICATIONS

GB Search Report for corresponding GB Application No. GB1600130.7 dated Jun. 27, 2016, 9 pages.
(Continued)

*Primary Examiner* — Rodney A Bonnette
(74) *Attorney, Agent, or Firm* — Lee & Hayes, P.C.

(57) ABSTRACT

An aerial device (100) capable of controlled flight has a body (110), a rotor (120) arranged to rotate relative to the body; and a deployable sheet (130), the sheet having an undeployed configuration in which the sheet is folded against the body and a deployed configuration in which the sheet is at least partially unfolded away from the body.

18 Claims, 69 Drawing Sheets

(51) Int. Cl.
  *B64C 25/10* (2006.01)
  *B64C 27/20* (2006.01)
  *B64D 45/04* (2006.01)

(52) U.S. Cl.
  CPC ............ *B64C 39/024* (2013.01); *B64D 45/04* (2013.01); *B64C 2201/027* (2013.01); *B64C 2201/162* (2013.01); *B64C 2201/165* (2013.01); *B64C 2203/00* (2013.01)

(58) Field of Classification Search
  CPC ........ B64C 2201/027; B64C 2201/162; B64C 2201/165; B64C 2203/00; B64D 45/04
  See application file for complete search history.

(56) References Cited

U.S. PATENT DOCUMENTS

| | | |
|---|---|---|
| 2002/0060267 A1 | 5/2002 | Yavnai |
| 2006/0016930 A1 | 1/2006 | Pak |
| 2009/0008507 A1 | 1/2009 | Pearson |
| 2014/0061362 A1 | 3/2014 | Olm et al. |
| 2017/0057630 A1* | 3/2017 | Schwaiger .............. B64C 27/20 |

FOREIGN PATENT DOCUMENTS

| | | |
|---|---|---|
| EP | 2336022 | 6/2011 |
| KR | 101461059 | 11/2014 |
| WO | WO9530575 | 11/1995 |
| WO | WO2014080388 | 5/2014 |
| WO | WO2015124556 | 8/2015 |

OTHER PUBLICATIONS

PCT Search Reported for corresponding PCT International Application No. PCT/GB2016/051567 dated Jun. 1, 2015, 9 pages.

* cited by examiner (a)

(b)

(c)

(a)

(b)

(c)  (d)

(a)

(b)

(c)

Ambulance Drone

Delivery Drones

Research Drones

Search and Rescue Drones (a)

(b)

(a)

(b)

(c)

(a)

(b)

AERIAL DEVICES CAPABLE OF CONTROLLED FLIGHT

This Application is a 371 national phase application of international application number PCT/GB2016/051567 filed on May 27, 2016, which claims priority to GB Patent Application No. 1509509.4 filed on Jun. 1, 2015 and GB Patent Application No. 1600130.7 filed on Jan. 4, 2016, both of which are incorporated herein by reference.

FIELD

This disclosure relates to aerial devices capable of controlled flight, and in particular, but without limitation, to unmanned aerial vehicles (UAVs).

BACKGROUND

UAVs, also known as drones, are aircraft without a human pilot aboard. They can either be remotely piloted, or self-piloted using onboard control systems.

UAVs have many applications, including search and rescue operations, the inspection of structures (such as heritage buildings or pipelines), land surveying, and surveillance.

SUMMARY

Aspects and features of the invention are set out in the appended claims.

BRIEF DESCRIPTION OF THE DRAWINGS

Examples of the present disclosure will now be explained with reference to the accompanying drawings in which.

Throughout the description and the drawings, like reference numerals refer to like parts.

DETAILED DESCRIPTION

Figure 1:
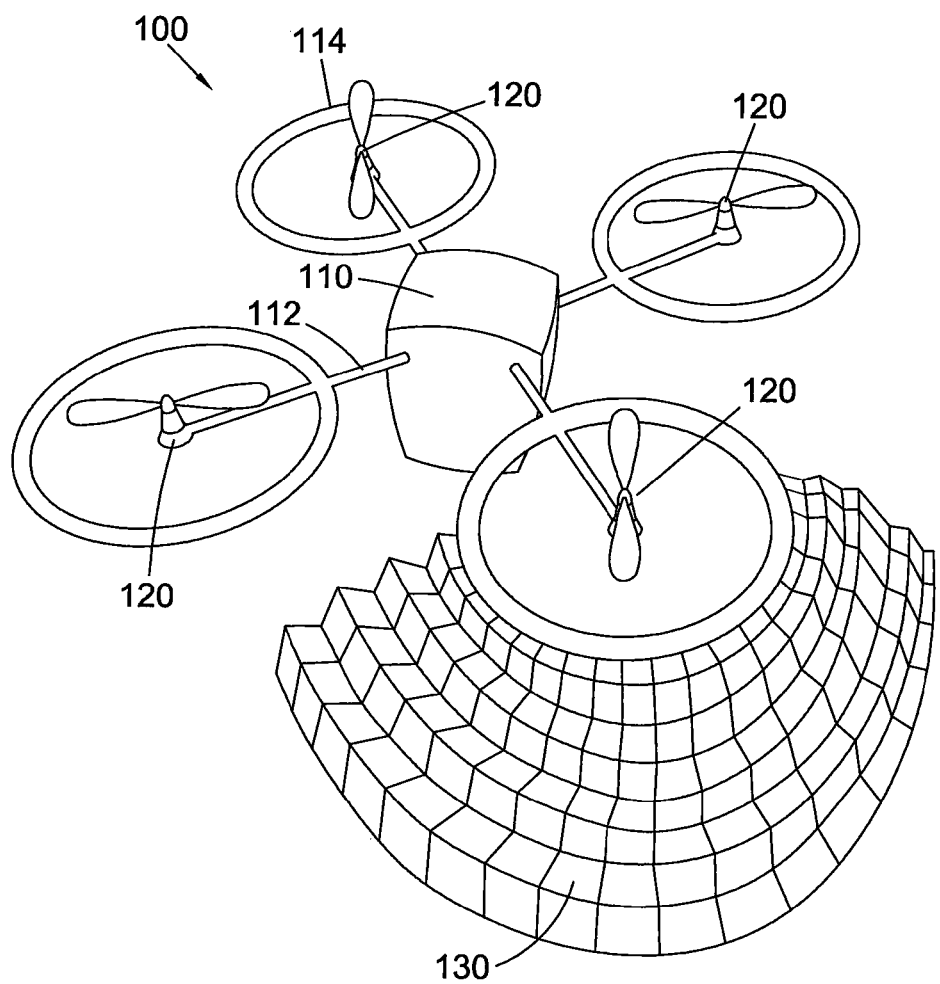
FIG. 1 shows a quadcopter having a deployable structure.

An example of an aerial device is shown in FIG. 1. The aerial device 100 comprises a number of rotors, which may for example be propellers, and which render the aerial device 100 capable of controlled flight. The aerial device 100 of FIG. 1 has four propellers 120, and is accordingly referred to as a 'quadcopter'. The propellers 120 are mounted to the body 110 of the aerial device 100, and are arranged to rotate relative thereto. When rotated, the propellers 120 provide lift to the aerial device 100, allowing it to fly. In the example of FIG. 1, the body 110 includes arms 112 and rings 114.

Figure 2:
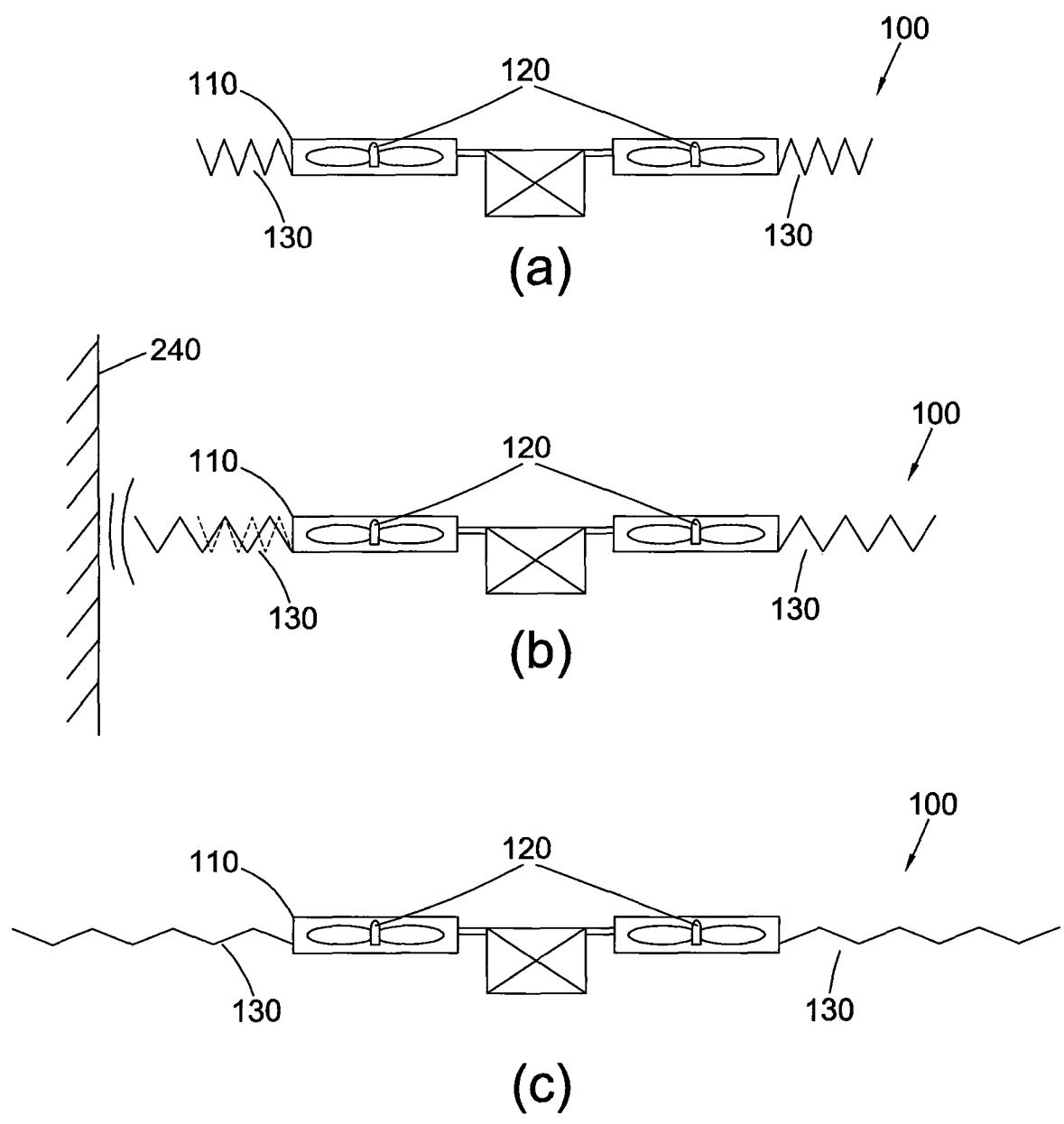
FIG. 2 shows a side view of a deployable structure in various exemplary configurations.

The aerial device 100 also comprises a deployable structure 130. The deployable structure 130 has a folded deployable sheet, which may be moved between a folded (undeployed) configuration and an (at least partially) unfolded (deployed) configuration. In the event that, during flight, the aerial device 100 collides with something and the deployable structure is deployed, the folded sheet will absorb some or all of the energy of the collision—for example by folding back up or by crumpling—thereby helping reduce or prevent damage to the thing that is collided with and/or at least part of the aerial device 100. FIG. 2 shows a side view of the deployable structure 130 in various exemplary configurations.

In a region containing soft obstacles such as curtains or trees, the deployable structure 130 may be in a configuration that provides the aerial device 100 with a high level of stiffness, as illustrated in FIG. 2a. In this undeployed configuration, the deployable structure 130 is folded against the body 110 of the aerial device 100.

In a region containing rigid obstacles 240 such as building facades or concrete walls, the deployable structure 130 may be in a configuration that provides the aerial device 100 with a lower level of stiffness, as illustrated in FIG. 2b. In this partially deployed configuration, the deployable structure 130 is partially unfolded away from the body 110 in a direction parallel to a (or the) plane in which the propellers 130 rotate. The portion of the aerial device 100 that has the lower level of stiffness (the deployable structure 130) is able, upon collision of the aerial device with an obstacle, to absorb collision energy thereby reducing or preventing damage to the obstacle and or other parts of the aerial device.

In a fully deployed configuration, as well as providing the aerial device with a lower level of stiffness when compared to the undeployed configuration, the deployable structure 130 may also contribute to the locomotion of the aerial device 100, as illustrated in FIG. 2c, allowing the device 100 to glide and thereby increase its flight range and endurance. In this fully deployed configuration, the deployable structure 130 is unfolded away from the body 110, such that it is substantially flat. If the deployable structure 130 is to be used for gliding, its folding pattern and/or deployed configuration may be designed or configured to have a maximal span.

In the event of a failure of the propulsion or control systems of the aerial device 100, by acting as a parachute, the deployable structure 130 may decrease the impact velocity of the aerial device 100 onto the ground, thereby improving the crashworthiness of the aerial device 100 and reducing the likelihood of damage to the aerial device 100.

Figure 3:
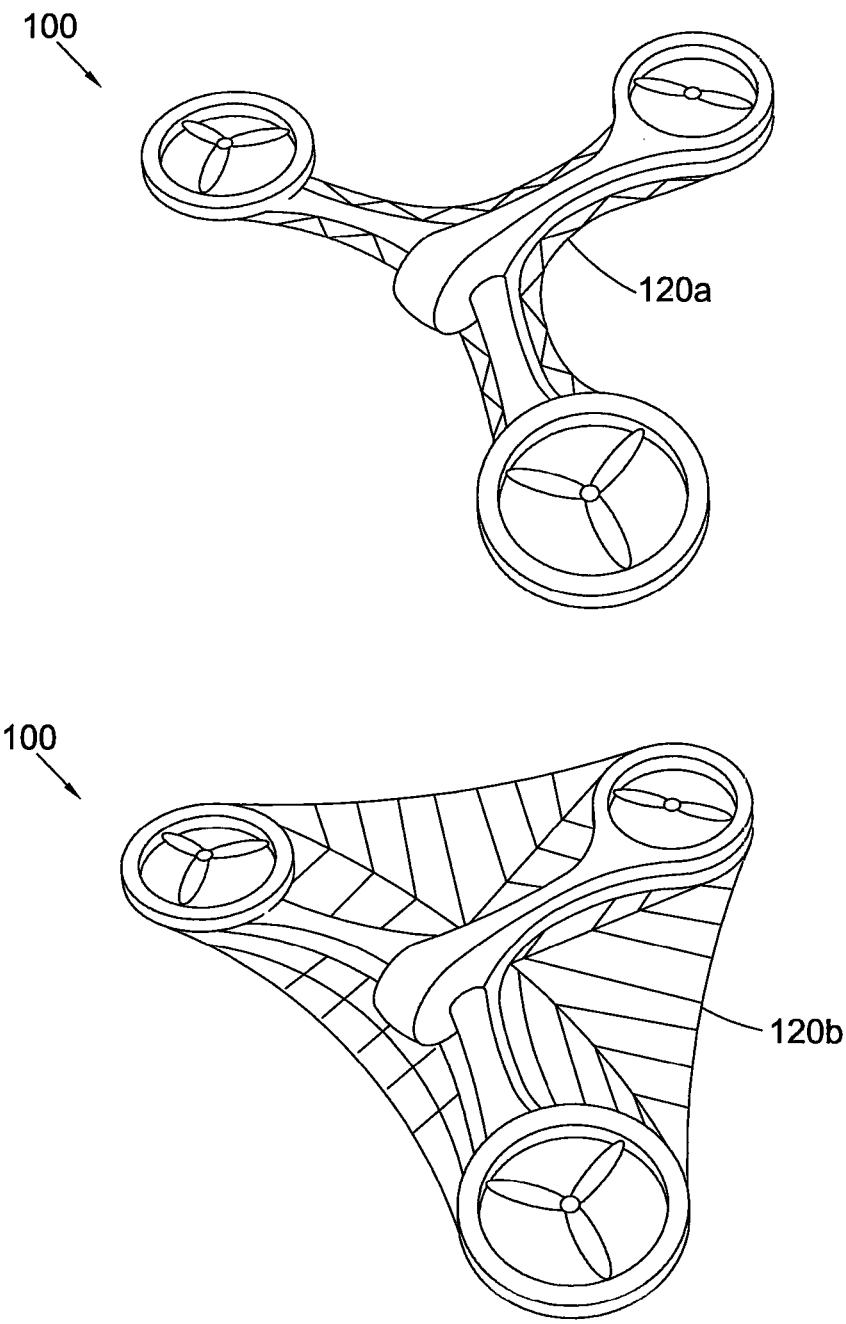
FIG. 3 illustrates the use of a deployable structure for gliding purposes.

FIG. 3 further illustrates the use of a deployable structure for gliding purposes. In an undeployed configuration, the deployable structure 120a is folded against the body 110. In a deployed configuration, the deployable structure 120b is unfolded away from the body 110 to form a wing or aerofoil.

Many folding patterns, such as origami patterns, can be used for the deployable structure 130. A suitable pattern may be designed or selected according to geometric and/or functional requirements. For example, the Miura-ori fold may be employed. The Miura-ori fold technique is a method of folding a flat surface into a smaller area. The crease patterns of the Miura-ori fold form a tessellation of the surface by parallelograms. In one direction, the creases of the pattern lie along straight lines, with each parallelogram forming the mirror reflection of its neighbour across each crease. In the other direction, the creases zigzag, and each parallelogram is the translation of its neighbour across the crease. Each of the zigzag paths of creases consists solely of mountain folds or of valley folds, with mountains alternating with valleys from one zigzag path to the next. Each of the straight paths of creases alternates between mountain and valley folds. The Miura-ori fold is a form of rigid origami, meaning that the fold can be carried out by a continuous motion in which, at each step, each parallelogram is completely flat. This property allows it to be used to fold surfaces made of rigid materials. A folded Miura-ori fold can be packed into a very compact shape, its thickness essentially being restricted only by the thickness of the folded material. The fold can also be unpacked in just one motion by pulling on opposite ends of the folded material, and likewise folded again by pushing the two ends back together. This property reduces the number of actuators, or motors, required to unfold a so folded sheet, reducing the overall weight and complexity of the mechanism.

The corrugated surface of the deployable structure 130 may reduce the intensity of vortices, thereby increasing the lift-to-drag ratio and providing enhanced flight performance.

Figure 4:
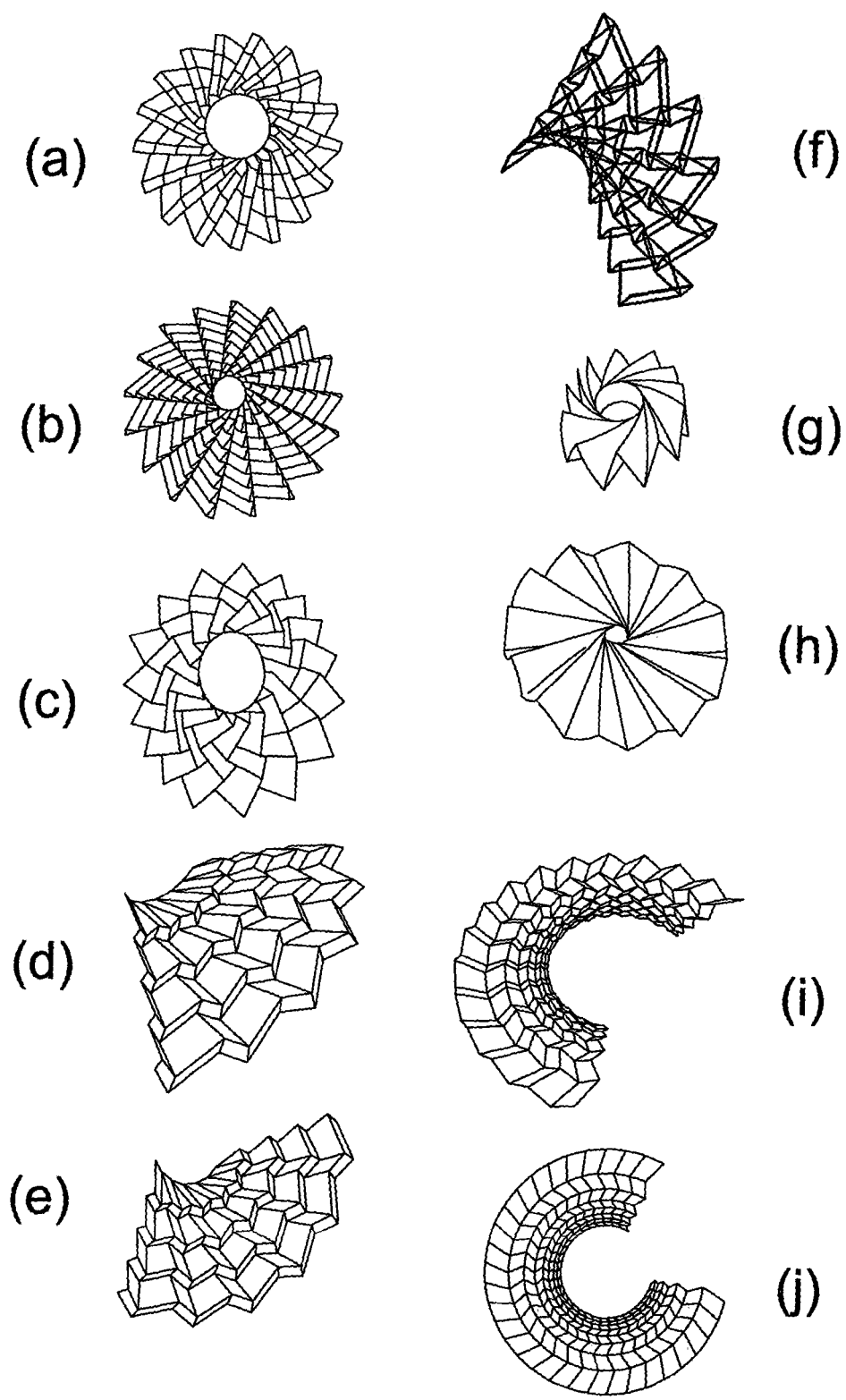
FIG. 4 shows a number of folding patterns.

A number of folding patterns are shown in FIG. 4. Origami patterns with (or with close to) cyclic or dihedral symmetry can also be used, for example, a Ring4 pattern (FIG. 4a), a Ring8 pattern (FIG. 4b) or an oval tessellation pattern (FIG. 4c). A fragment of a Ring4 pattern is shown in FIG. 4d in a partially deployed configuration. FIG. 4e shows the fold pattern of the fragment, and FIG. 4f shows a top view of a flat-folded fragment of the Ring4 pattern. A fragment of a Nojima circular Miura-ori pattern is shown in FIG. 4i in a partially deployed configuration. FIG. 4j shows the fold pattern of the fragment. FIG. 4g and FIG. 4h show a wrapping sheet or membrane which can be wrapped around the frame of a rotor of an aerial device 100. Variations of the Yoshimura pattern (not shown) can also be used.

Figure 23:
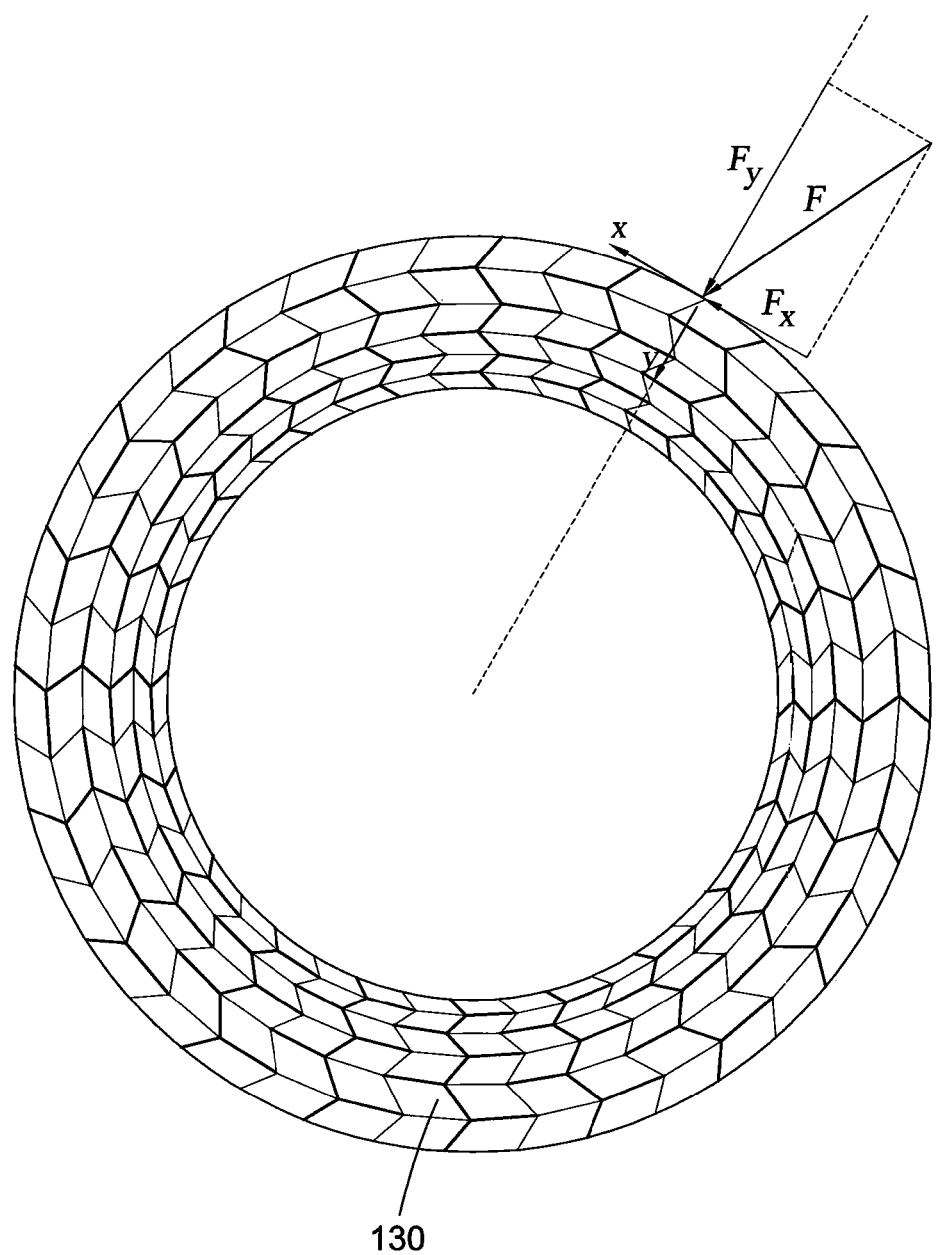
FIG. 23 shows a further folding pattern.

A folding pattern with cyclic symmetry is shown in FIG. 23. This folding pattern is a cyclic variation of the Miura-ori, which has been customised for minimal radial size while keeping the maximum number of circumferential fold lines. This pattern is capable of reducing the peak normal force experienced by the aerial device 100, and has minimal unfolded span while keeping the maximum number of fold lines, which act as 'springs' in the radial direction for impact protection. When the sheet is folded, its internal radius is reduced by approximately 6% with respect to its original (unfolded) internal radius; for example, the internal radius of the sheet is reduced from approximately 100 mm to approximately 94 mm.

It is contemplated that the aerial devices disclosed herein may have a deployable structure being a sheet that comprises a plurality of creases that define a tessellated surface thereof, the surface being tessellated substantially or entirely according to the pattern of any of FIG. 4(a), 4(b), 4(c), 4(d), 4(e), 4(f), 4(g), 4(h), 4(i), 4(j) or 23. As an example, the surface may be tessellated according to only a portion of the pattern of any of FIGS. 4(a), 4(b), 4(c), 4(d), 4(e), 4(f), 4(g), 4(h), 4(i), 4(j) or 23 and/or one or more holes may be present on the facets of the tessellated surface.

Figure 24:
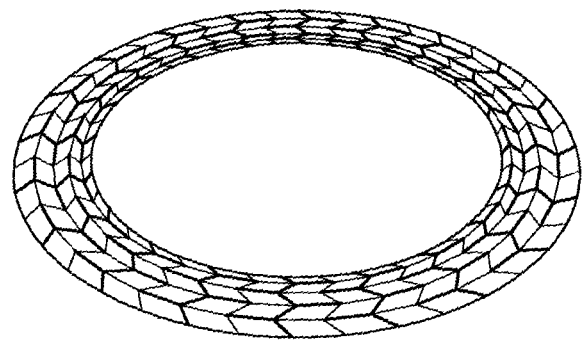
FIG. 24 shows a folding simulation of the folding pattern of FIG. 23.
Figure 24:
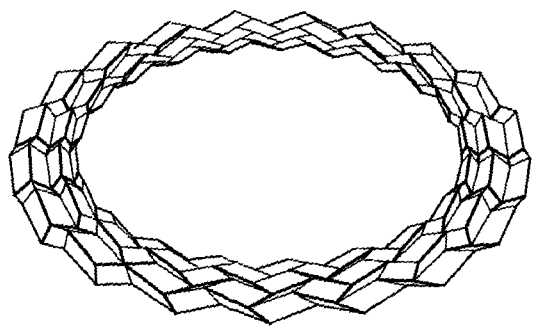
Figure 24:
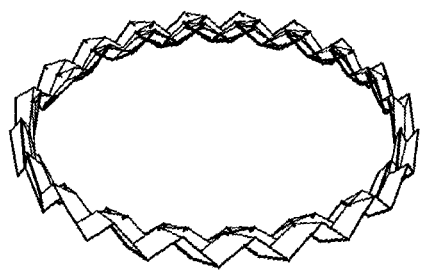

A folding simulation of the folding pattern of FIG. 23 is shown in FIG. 24. In FIG. 24(a), the sheet is completely unfolded, while in FIGS. 24(b) and 24(c), the sheet is at least partially folded.

In order to reduce the weight of a deployable structure 130, pieces may be cut out of it, or holes may be made on the facets of the folding pattern.

Figure 5:
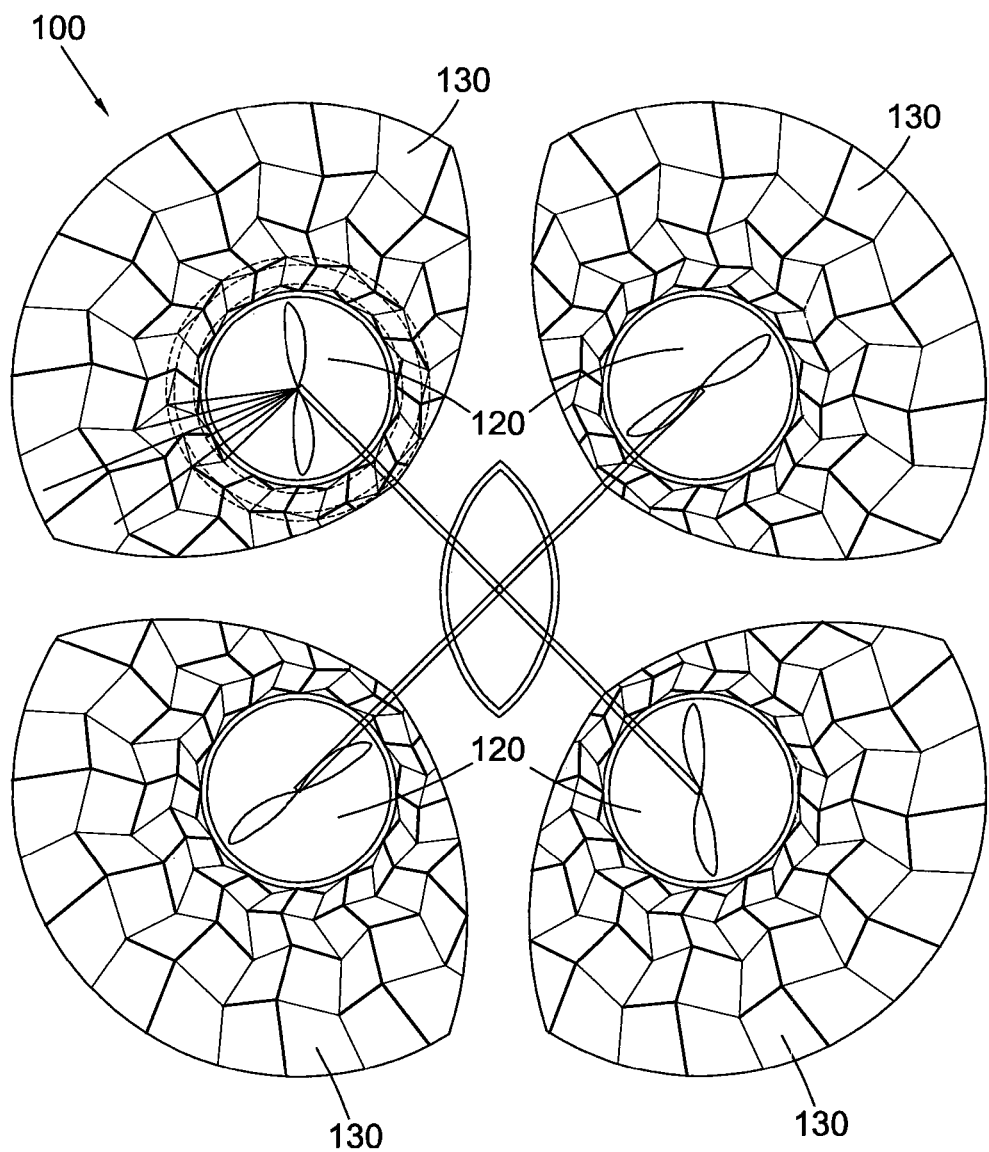
FIG. 5 shows a quadcopter comprising a deployable sheet with a cyclic pattern.

FIG. 5 shows a quadcopter comprising a deployable structure 130 folded with a cyclic pattern. This pattern is Miura-based, and is tailored to fit into rotor frames of a typical quadcopter. The deployable structure 130 folds onto the external surface of a cylindrical frame of each rotor 120.

The deployable sheet may, for example, be made out of paper, card, foldable plastic and may comprise a plurality of unfoldable planar portions connected by moveable joints— for example memory material hinges, hinges operable to pivot about a pin, roller, or bearing, and fabric hinges operable to open and close by virtue of the flexibility of a central fabric portion. Example plastic materials suitable for creating living hinges (hinges made from the same material as the sheet) include polyethylene and polypropylene.

Figure 6:
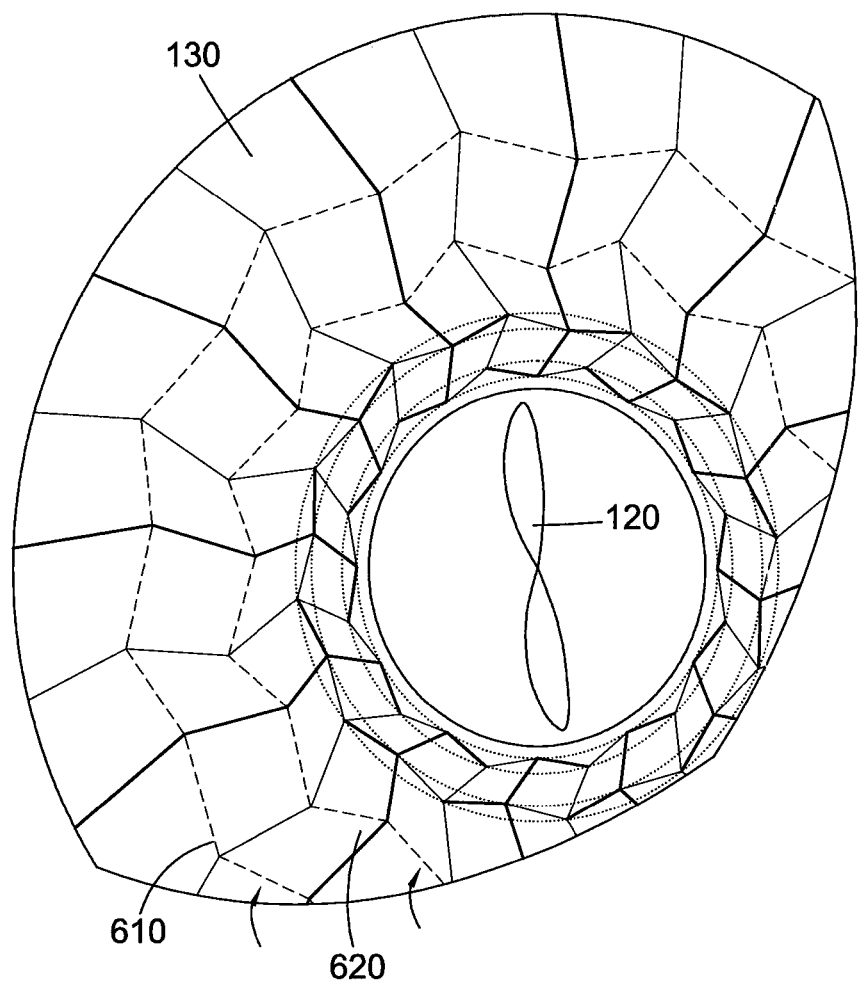
FIG. 6 illustrates the perforation or scoring of a deployable sheet.

The creases of the deployable structure 130 may be perforated or scored, as illustrated in FIG. 6, and/or may be manufactured so as to have thinned portions at the location of desired folds, so as to obtain a deployable structure with a desired stiffness level. The deployable structure can thereby be adapted to various missions and environments. For example, when flying around people or animals, or in an area with delicate and vulnerable obstacles (such as artwork, industrial facilities or historical/heritage structures), the deployable structure 130 could have a low level of stiffness, such that it is able to fly safely. FIG. 6 shows exemplary perforation/scoring patterns 610 and 620.

Figure 7:
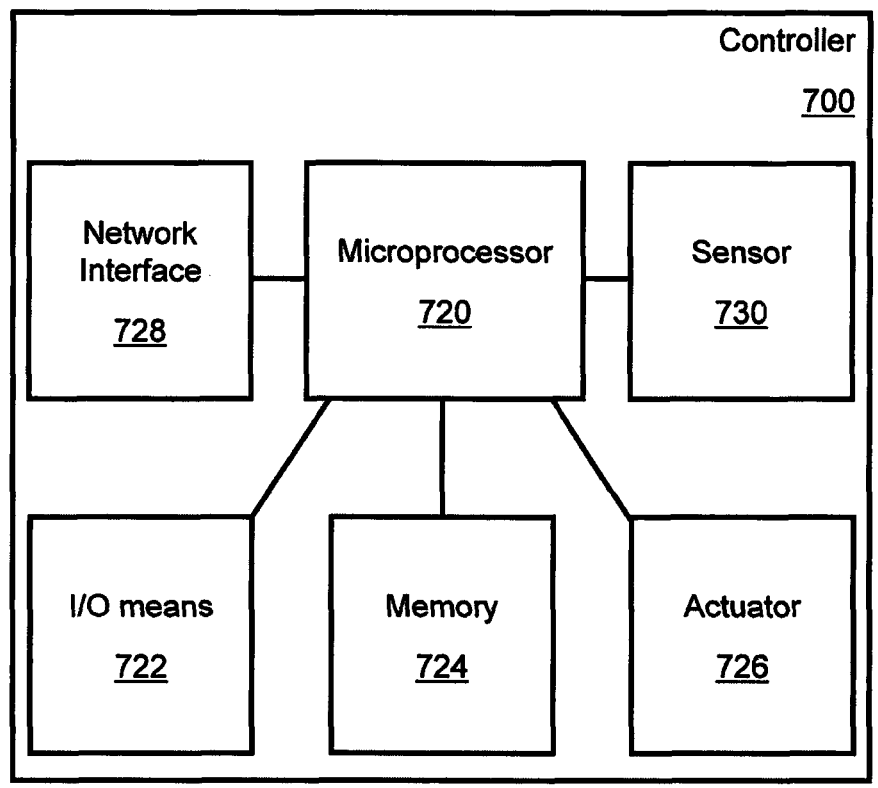
FIG. 7 shows a block diagram of a system for implementing elements of the approach described herein.

FIG. 7 shows a block diagram of a system for operating the aerial device 100 as described herein. In particular, a controller 700 comprises a microprocessor 720 arranged to execute computer-readable instructions as may be provided to the controller 700 via input/output means 722 which may be arranged, without limitation, to interface with one or more wired or wireless ports, for example a USB port. The microprocessor 720 may also store instructions in a memory 724, for example a random access memory. The microprocessor 720 is arranged to output results of executed programmes at the input/output means 722, and/or may communicate those results to another device via a network interface 728 that is arranged to couple, preferably in a wireless manner, the controller 700 to a communications network such as the internet (not shown in FIG. 7). The microprocessor 720 may be further arranged to receive instructions and/or data via the network interface 728, and to receive sensor data from one or more sensors 730.

As a result of executing the computer-readable instructions, the microprocessor 720 may be arranged to operate an actuator 726. The actuator 726 is used to deploy the deployable structure 130 from the undeployed configuration to the deployed configuration, or to undeploy the deployable structure 130 from the deployed configuration to the undeployed configuration.

A person skilled in the art will understand that the actuator 726 may take various forms and be of various types, such as electrostatic, electrical, hydraulic, pneumatic, motor, and/or memory material-based. For example, the deployable structure 130 may be deployed or undeployed by pulling on a string or pushing on a rigid rod which is mounted to the deployable structure 130. Actuators may be placed in the creases of the deployable structure 130. The deployable structure 130 may be manufactured using a shape-memory alloy, which can be actuated electrically using small amounts of current in order to make the alloy move.

The deployment of the deployable structure 130 may be controlled based on sensor data acquired by the sensors 730. In particular, the deployable structure 130 may be deployed based on a sensed distance between the aerial device 100 and an obstacle 240, as also shown in FIG. 2*b*. For example, as the aerial device 100 approaches a rigid obstacle 240, the deployable structure may be at least partially undeployed from a gliding configuration such as that shown in FIG. 2*c* so as to increase its stiffness in anticipation of an impact.

The deployment of the deployable structure 130 may additionally or alternatively be controlled based on an energy level of an energy store (such as the battery) of the aerial device 100. For example, the deployable structure 130 may be deployed when the energy store is almost empty, thereby reducing the chances of damage in the event that the energy store is depleted prior to the aerial device 100 landing.

Figure 65:
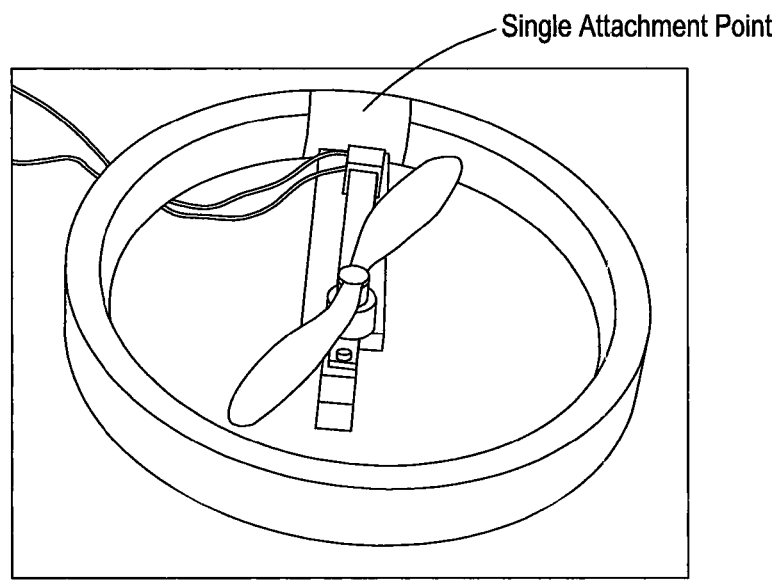
FIG. 65 shows a single attachment point, static rotor guard alternative.

The body 110 defines a space for each propeller 120 to rotate within. The space may be defined by a duct portion of the body 110, and at least a portion of the duct portion may be moveable relative to the body 110 so that, when the propeller 120 rotates relative to the body 110 and the at least a portion of the duct portion is moved, a fluid flow through the duct portion is changed, as illustrated in FIG. 65.

Figure 8:
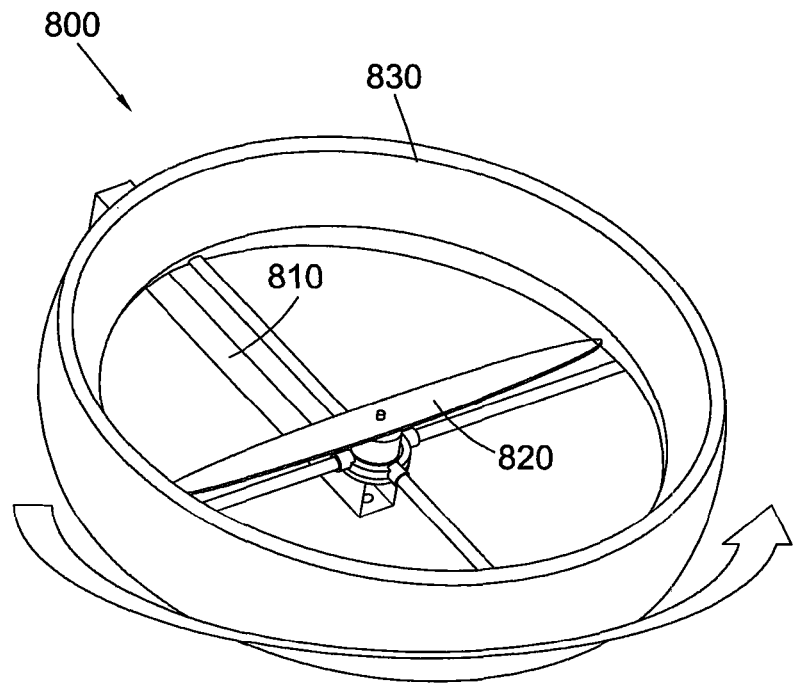
FIG. 8 shows a UAV having a rotatable rotor guard.

The crashworthiness and safety of aerial devices can also be improved by way of a rotor guard, as described herein and illustrated in FIG. 8. The rotor guard and deployable structure described herein may be combined in a single aerial device.

The rotor 820 of an aerial device 800 is mounted to a body (or frame) 810, and is arranged to rotate relative to the body 810. A rotor guard 830 is arranged to define a space for the rotor 820 to rotate within, in this example the rotor guard 830 has a toroidal shape. The rotor guard 830 is arranged to rotate both relative to the body 810 and relative to the rotor 820. As a result, the rotor guard 830 is said to be 'spinning', 'free-to-spin', or 'free-rotating'. The rotor 820 and rotor guard 830 rotate about coincident axes, and the rotor guard 830 and rotor 820 therefore rotate in parallel or coincident planes.

The rotor guard 830 provides protection to the individual rotor blades, rather than to the aerial device as a whole. The rotor guard 830 enables a decoupling of moments between the rotor guard 830 and the aerial device 800 in the horizontal plane when flying, thereby improving the impact response of the aerial device 800 to side-on collisions.

The rotor guard 830 is able to rotate about a single axis, that is, with one degree of freedom (DOF). Although the majority of collisions occur from the side of the aerial device, the rotor guard 830 could instead rotate about two axes (with two DOFs), thereby also providing protection against collisions from above or below the rotor 820.

Figure 9:
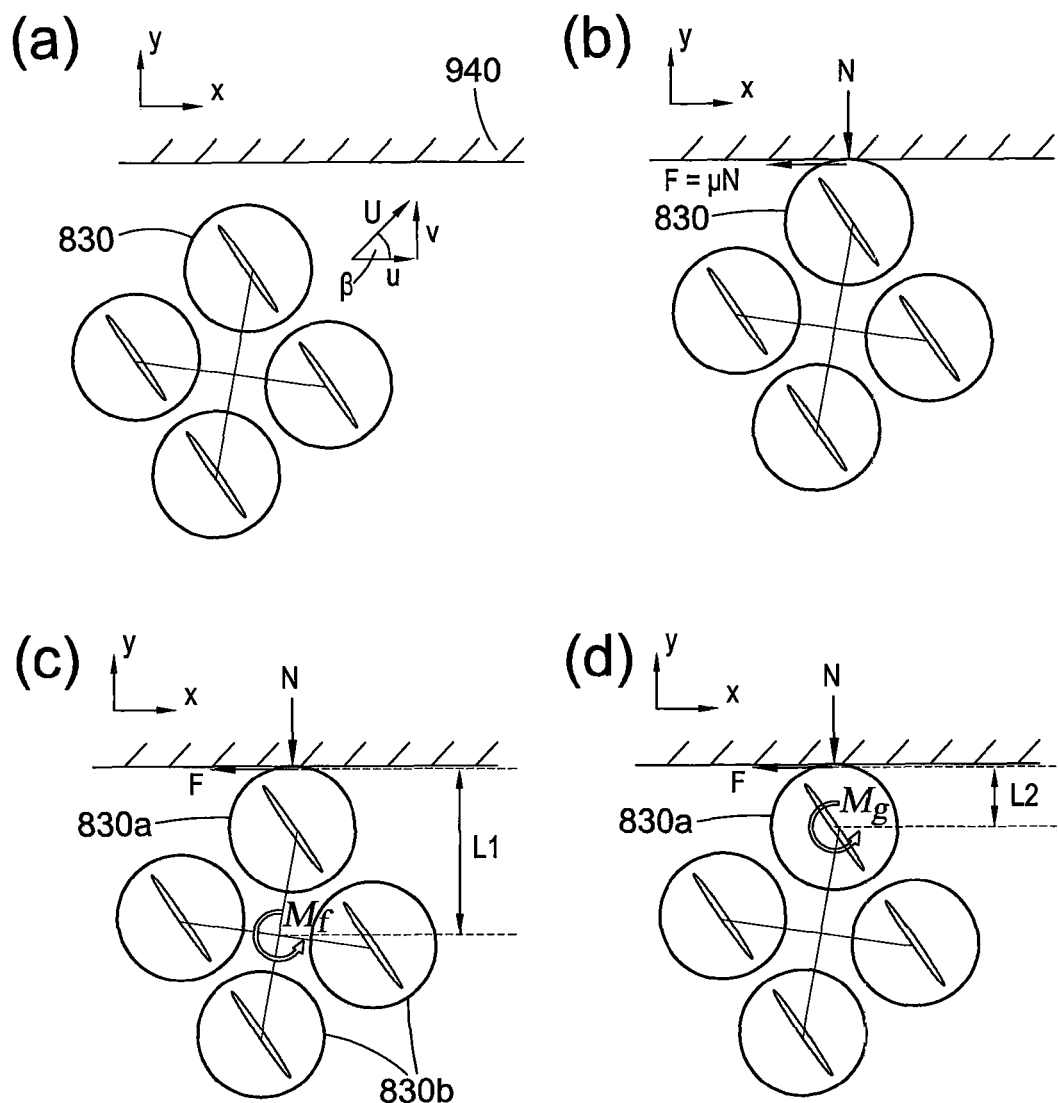
FIG. 9 illustrates the forces applied to a quadcopter during aerial collision with an obstacle.

FIG. 9 illustrates the forces applied to an aerial device 800 during a side-on collision with an obstacle 94C. The obstacle 940 may be any substantially rigid object, such as a wall. In FIG. 9*a*, an aerial device 800 with initial speed U is incident on a surface of the obstacle 940 at an angle β. In FIG. 9*b*, the aerial device 800 comes into contact with the surface. The forces that arise at the interface between the rotor guard 830 and the surface are the normal force N, and the tangential friction force F.

FIG. 9*c* illustrates the forces applied during such a collision in the case where a fixed rotor guard 830 is mounted to the rotor 820 colliding with the obstacle 940. In this case, the moment caused by the tangential friction force F causes the entire aerial device 800 to yaw (in this case, to rotate in a counter-clockwise direction). The yawing motion of the aerial device 800 may have a number of effects. If a camera is mounted to the body of the aerial device 800 and the aerial device is being remotely piloted, the disruption caused by the sudden, unforeseen spinning of the aerial device 800 may cause the pilot to lose control. Furthermore, if the obstacle 940 extends far enough in the direction of the x axis, the rotation of the aerial device 800 may cause the rotor guards 830*b* mounted to other rotors to impact with the obstacle 940 (in addition to rotor guard 830*a*), further destabilising the aerial device 800.

In contrast, in FIG. 9*d*, the rotor guard 830 is able to rotate independently of the body of the aerial device 800 and the body 810 of the rotor, thereby reducing the destabilisation of the aerial device 800 in the event of a collision.

Figure 25:
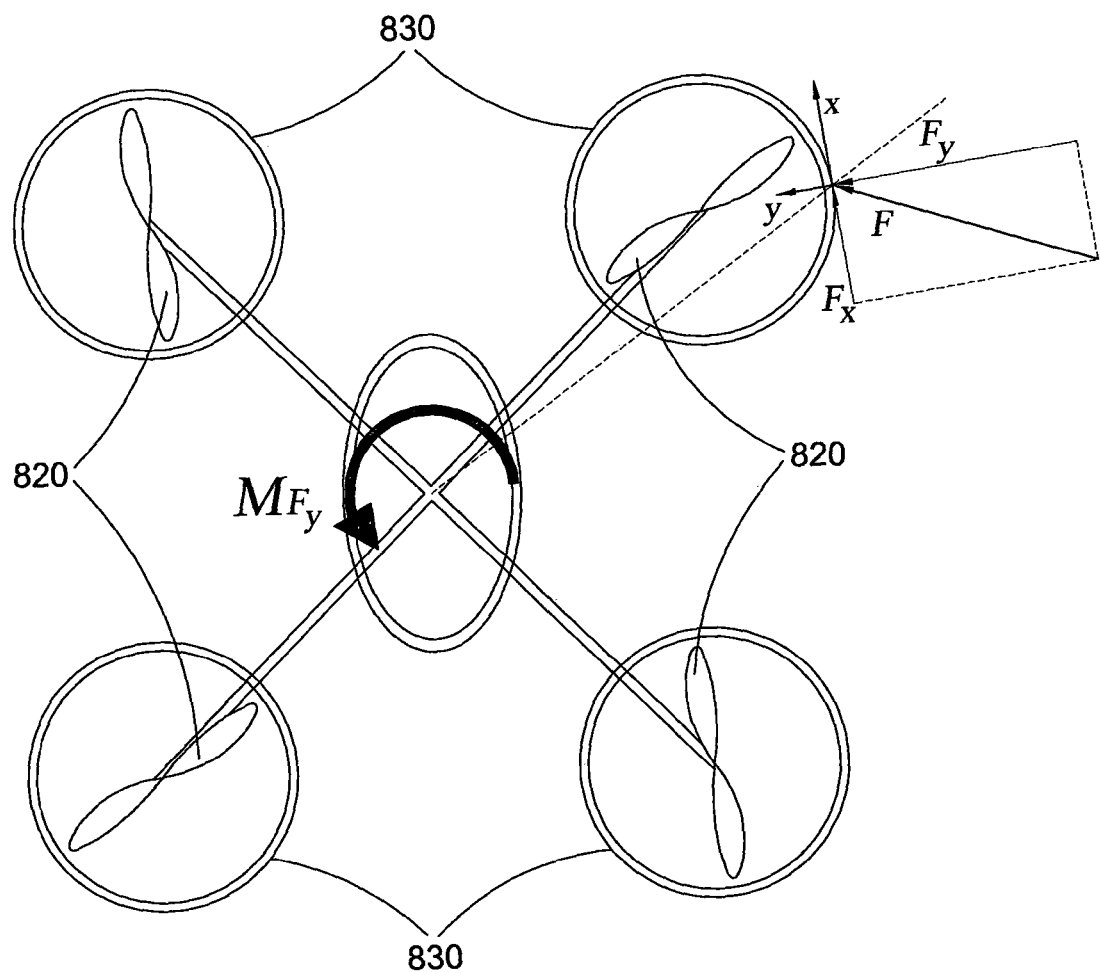
FIG. 25 also illustrates the forces applied to a quadcopter during aerial collision with an obstacle.

FIG. 25 also illustrates the forces applied to an aerial device 800 during aerial collision with an obstacle. In FIG. 25, each of the rotors 820 is protected by an individual rotor guard 830. When a collision with an obstacle occurs, the normal component of the impact force $F_y$ generates a yawing moment $M_{F_y}$ around the centre of mass of the aerial device 800, which can lead to significant disturbances in the trajectory of the aerial device 800.

Figure 10:
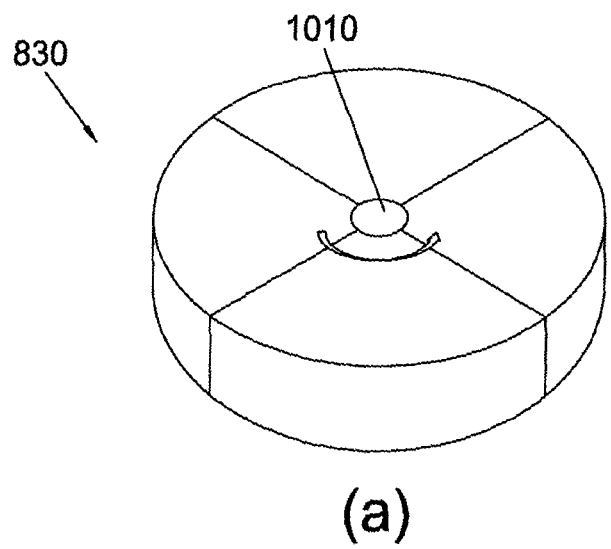
FIG. 10 illustrates possible configurations for a rotor guard.
Figure 10:
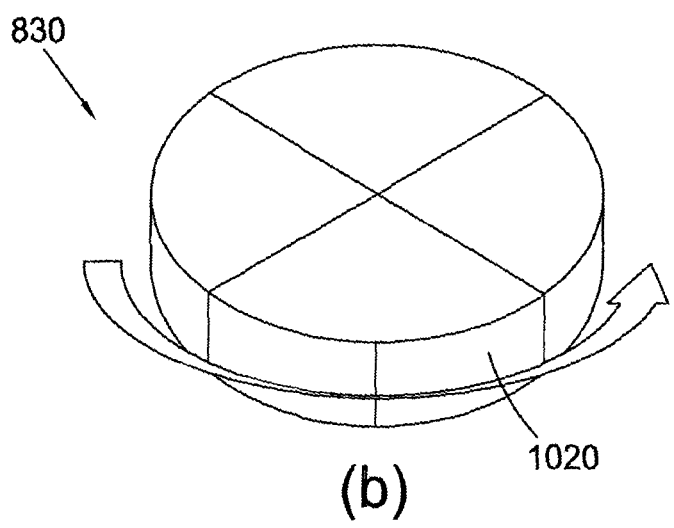

FIG. 10 illustrates possible configurations for a rotor guard 830.

In a first configuration, illustrated in FIG. 10*a*, the rotor guard 830 rotates about a central bearing 1010 (which may be a rolling bearing), which couples the rotor guard 830 to the body 810 of the aerial device 800. In the ideal case where the rotor guard 830 can rotate completely freely, the freedom of rotation of the rotor guard 830 would completely decouple the moment on the rotor guard (labelled as $M_g$ in FIG. 9*d*) from the moment on the aerial device (labelled as $M_f$ in FIG. 9*c*). However, in reality, the friction between the rotor guard 830 and the central bearing 1010 causes a small degree of coupling between the rotor guard moment $M_g$ and the moment experienced by the aerial device $M_f$.

The first configuration is lightweight and provides a rotational response to impact which is only slightly damped; however, the small area of connection between the rotor guard 830 and the body 810 makes the rotor guard more vulnerable to damage. For example, the moments caused by impacts from above or below could dislodge the rotor guard 830 from the central bearing 1010.

In a second configuration, illustrated in FIG. 10*b*, the rotor guard 830 comprises an inner, static, portion and an outer portion, a toroidal bumper 1020 that rotates around the static portion of the rotor guard 830. The rotation of the bumper 1020 is facilitated by the presence of rollers between the static portion and the bumper 1020.

This second configuration provides a larger area of connection between the body 810 and the rotor guard 830 than the first configuration; however, it involves an extra component—the bumper 1020—which adds weight to the rotor guard. In addition, the friction between the bumper 1020 and the rollers results in a coupling between rotor guard moment $M_g$ and the moment experienced by the aerial device $M_f$, thereby reducing the rotational responsiveness of the bumper 1020 to a collision. As one possibility, the bumper may be omitted but one or more rollers positioned about the periphery of the rotor guard retained, the rollers being freely rotatable about axes substantially parallel to the axis of rotation of the rotor.

Figure 11:
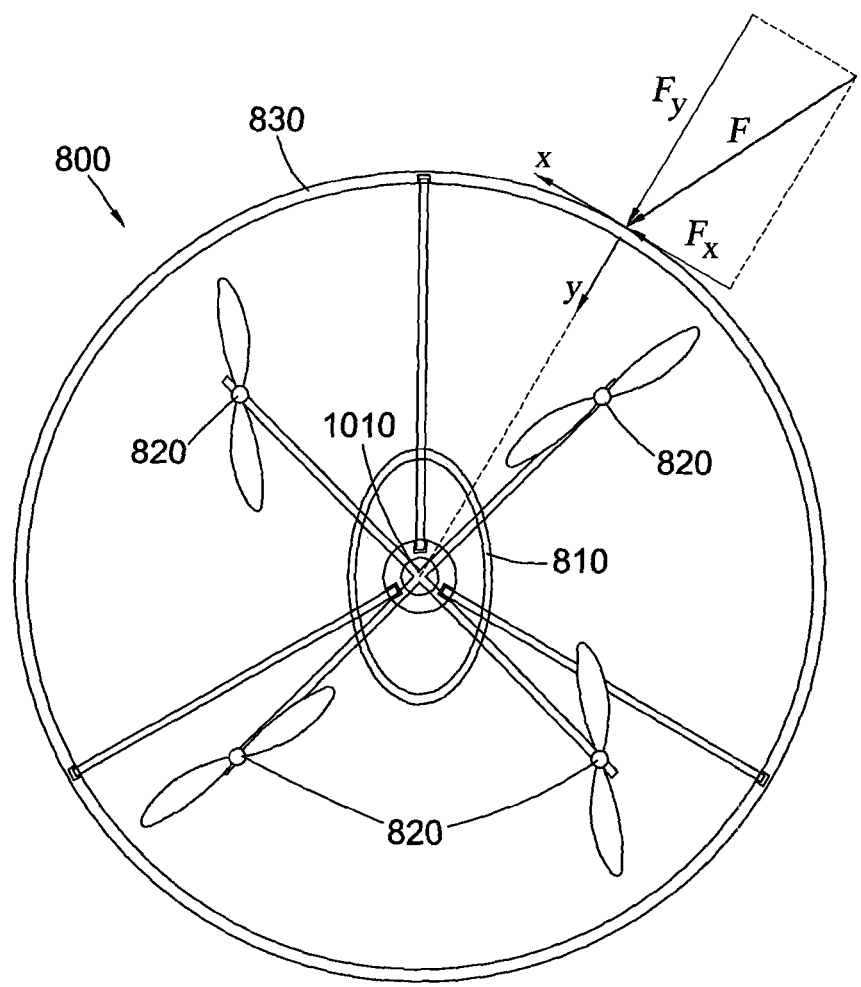
FIG. 11 shows a UAV having a rotor guard defining a space within which four propellers rotate.

The rotor guard 830 may define a space within which multiple rotors 820 rotate. For example, as one possibility, the aerial device 800 may comprise four rotors 820, and the rotor guard 830 may define a space within which all four rotors 820 rotate, as illustrated in FIG. 11. FIG. 11 shows a passively spinning collective (protecting all propellers) guard mounted on a quadcopter. It should be noted that the circular guard may have an aerodynamically shaped cross section for better aerodynamic performance. In FIG. 11, the rotor guard 830 includes three rods which connect the rotor guard 830 to the body 810 via the central bearing 1010.

Figure 26:
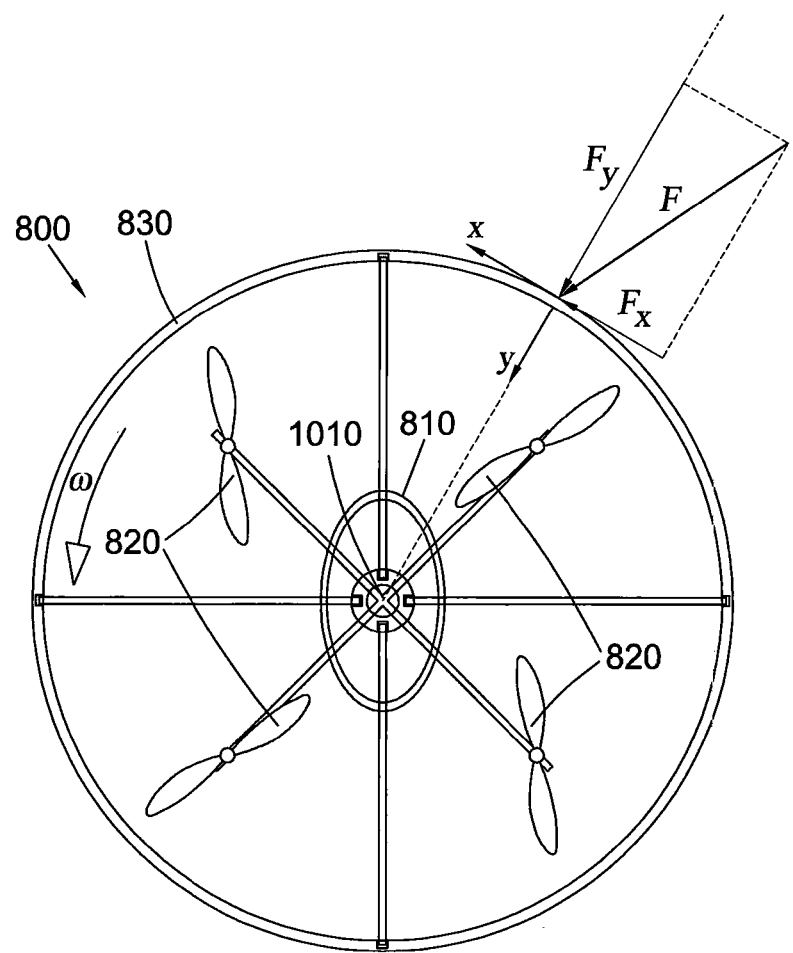
FIG. 26 shows an alternative configuration for a UAV having a rotor guard defining a space within which four propellers rotate.

FIG. 26 shows an alternative configuration for a passively spinning collective guard or protector mounted on a quadcopter. In FIG. 26, the rotor guard 830 includes four rods which couple the rotor guard 830 to the body 810 via the central bearing 1010.

Figure 12:
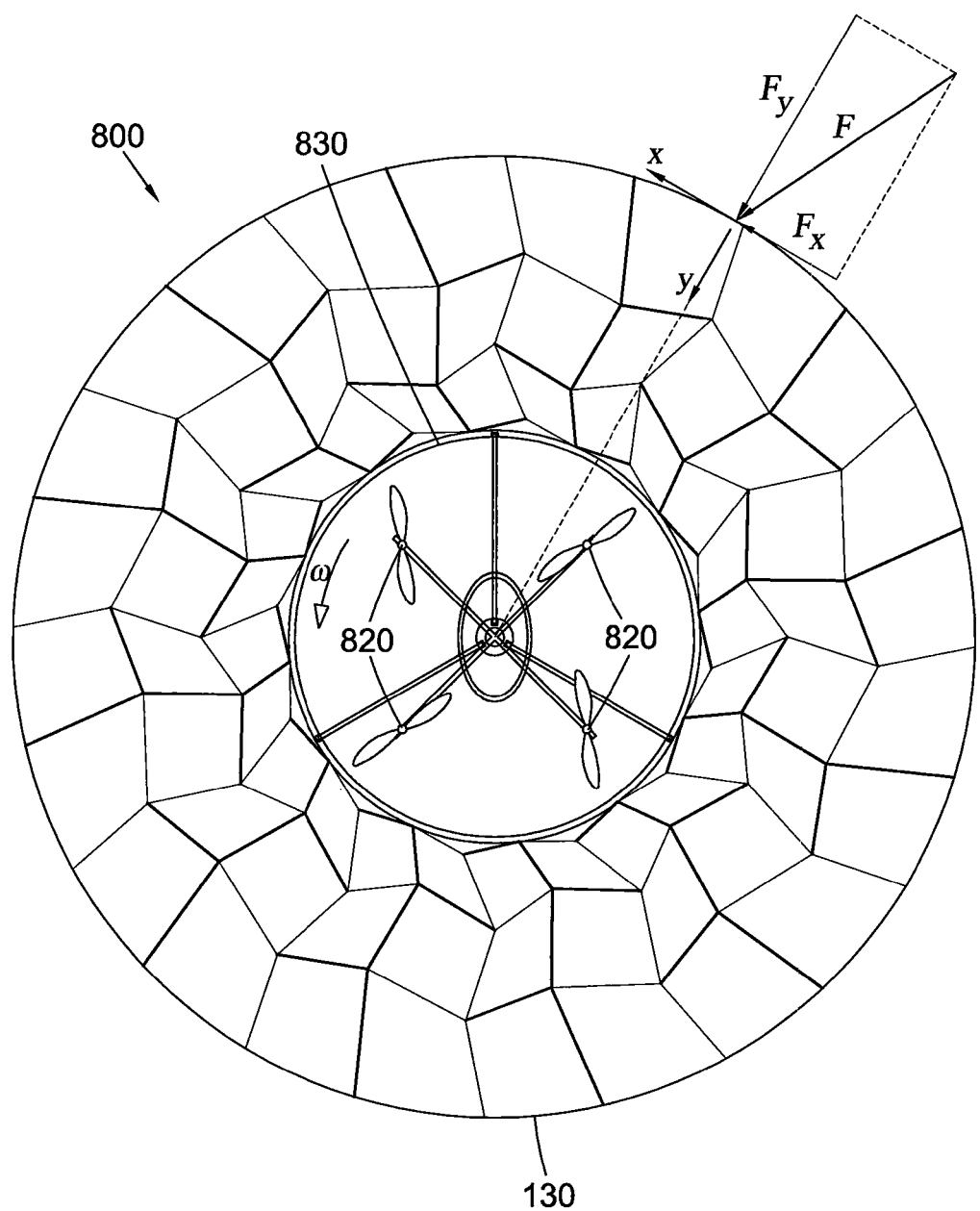
FIG. 12 shows a UAV having a rotor guard and a deployable structure.

The rotor guard 830 and the deployable structure 130 described above may be combined in a single aerial device 800, such that some of the kinetic energy of an impact may be absorbed by plastic deformation of the deployable structure 130. An exemplary aerial device combining the rotor guard 830 and the deployable structure 130 is shown in FIG. 12. FIG. 12 shows a quadcopter having a passively spinning collective (protecting all propellers) guard that has an origami shock absorption/gliding system mounted thereon. It should be noted that the circular guard may have an aerodynamically shaped cross section for better aerodynamic performance.

Figure 13:
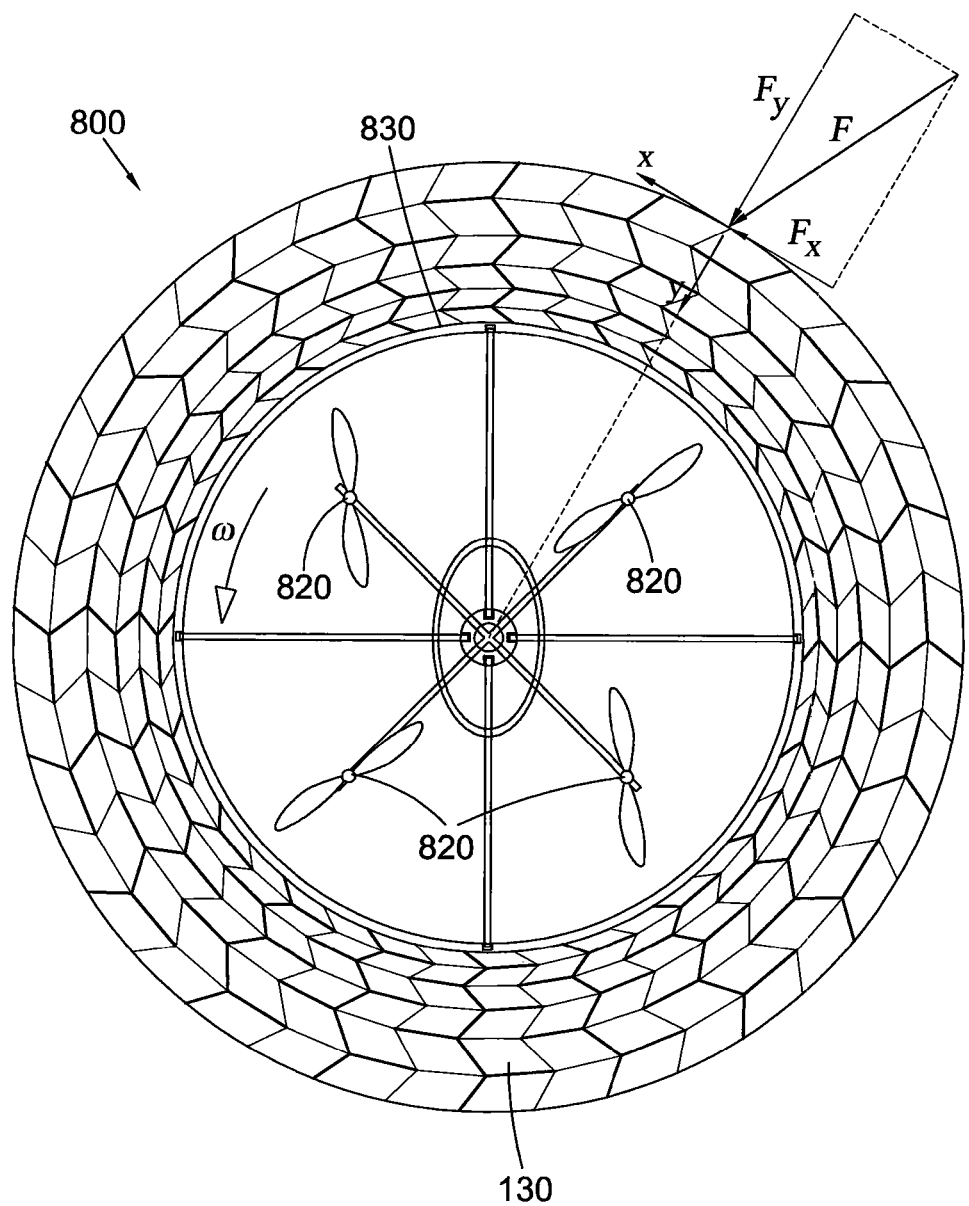
FIG. 13 shows an alternative configuration for a UAV having a rotor guard and a deployable structure.

FIG. 13 shows an alternative configuration for a quadcopter having a passively spinning collective guard. In FIG. 13, the rotor guard 830 of FIG. 26 is combined with a deployable structure 130 folded according to the pattern of FIG. 23.

Figure 14:
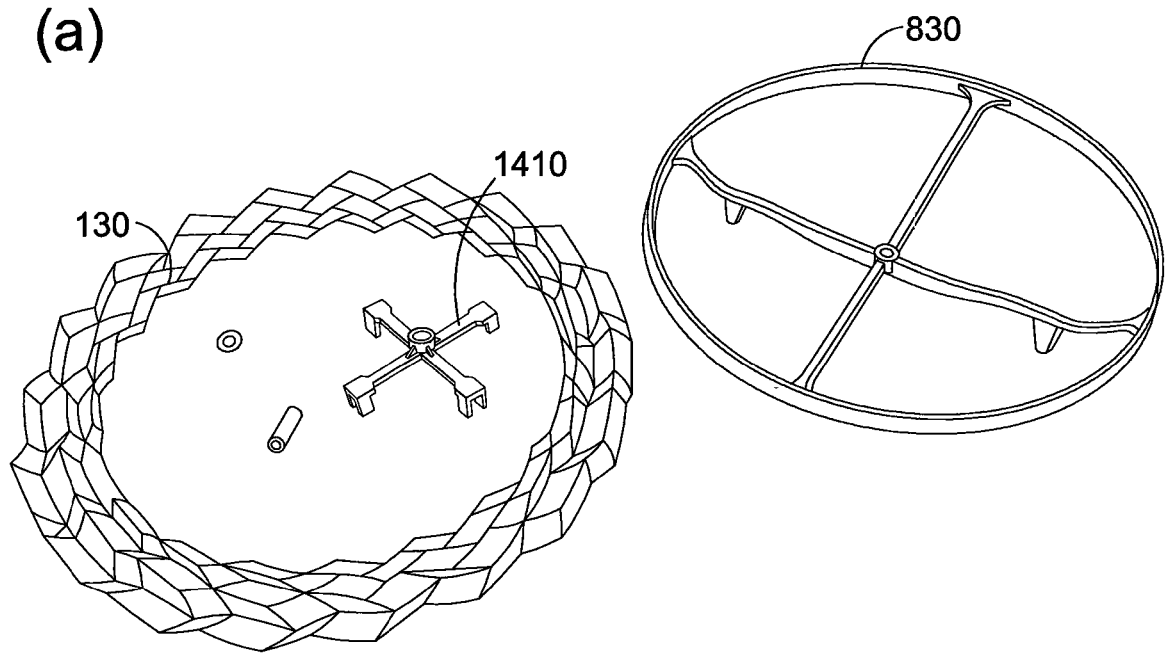
FIG. 14 shows a prototype rotor guard and deployable structure.
Figure 14:
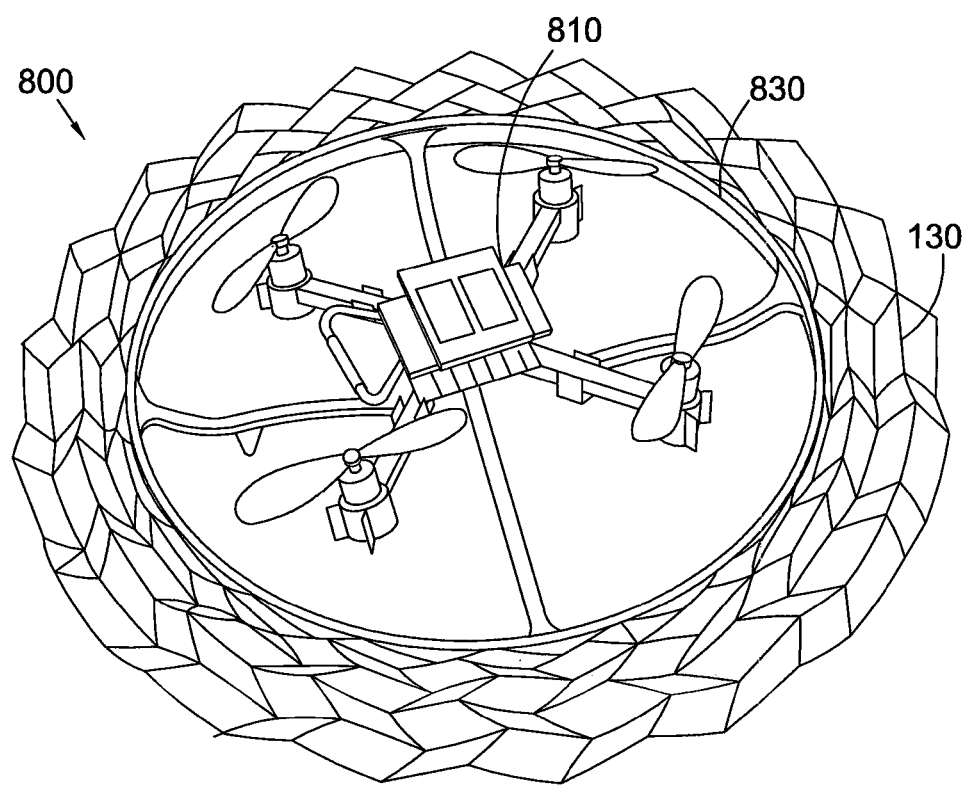

Prototypes of a rotor guard 830 and deployable structure 130 are shown in FIG. 14. The rotor guard 830 is connected to the platform or body 810 of the aerial device 800 using a connector 1410. In this prototype, the deployable sheet or structure 130 is made from polypropylene, is folded according to the folding pattern of FIG. 23, and contains five stacking layers in the radial direction. The exemplary aerial device 800 shown in FIG. 14(*b*) is a Crazyflie 2.0 quadcopter.

Figure 15:
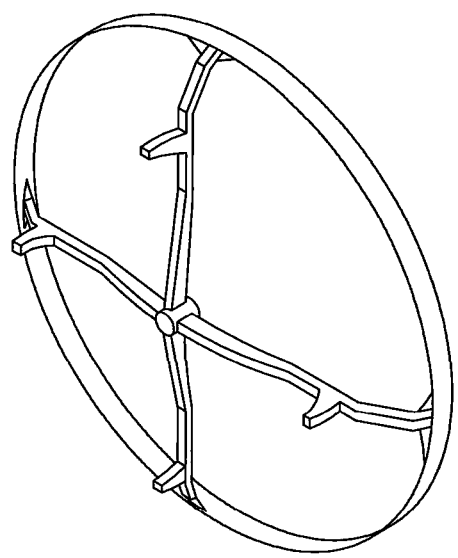
FIG. 15 shows a CAD model of a rotor guard.
Figure 15:
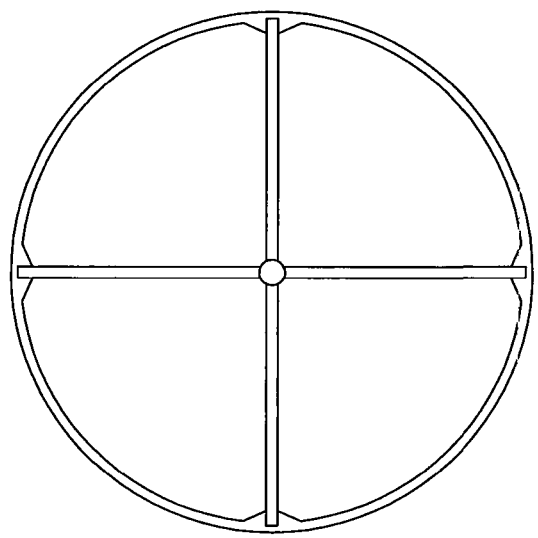
Figure 15:
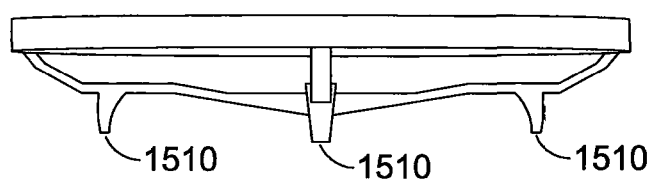

A computer-aided design (CAD) model of a rotor guard 830 is shown in FIG. 15. In particular, FIG. 15(*a*) shows a three-dimensional view of the rotor guard 830; FIG. 15(*b*) shows a top view of the rotor guard 830; and FIG. 15(*c*) shows a side view of the rotor guard 830. The rotor guard 830 includes landing struts 1510 to help the aerial device 800 land in a stable manner.

Figure 16:
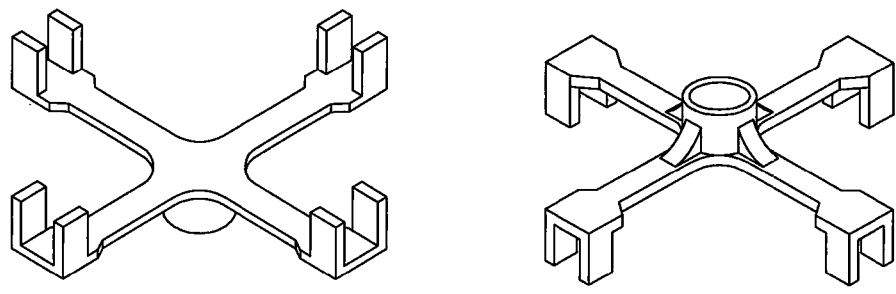
FIG. 16 shows a CAD model of a connector for coupling a rotor guard to a body of a UAV.
Figure 16:
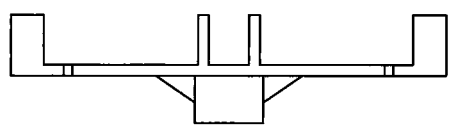
Figure 16:
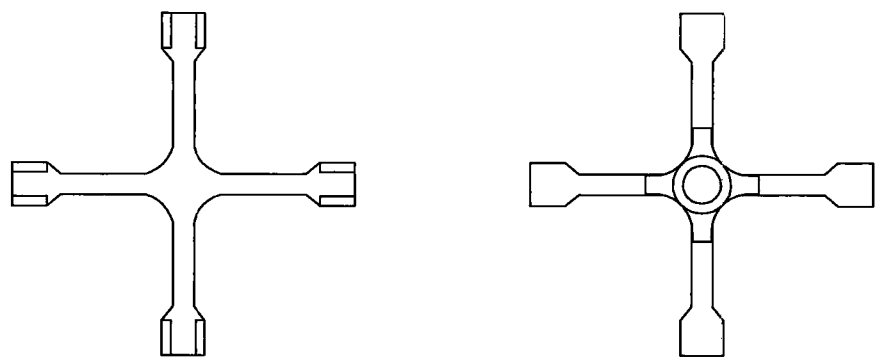

A CAD model of the connector 1410 is shown in FIG. 16. In particular, FIG. 16(*a*) shows a three-dimensional view of the connector 1410; FIG. 16(*b*) shows a side view of the connector 1410; FIG. 16(*c*) shows a top view of the connector 1410; and FIG. 16(*d*) shows a bottom view of the connector 1410.

Figure 17:
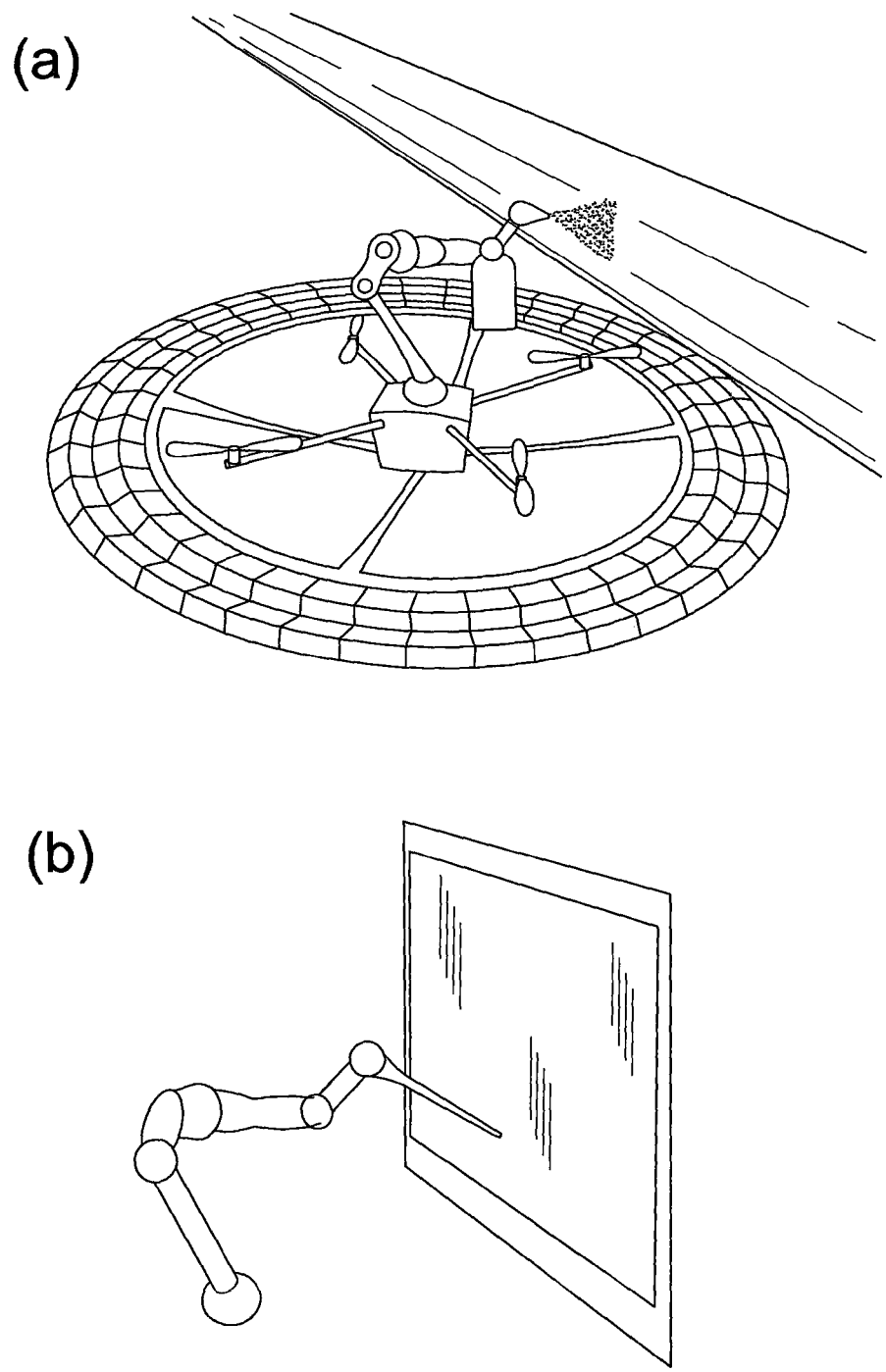
FIG. 17 illustrates applications of a UAV comprising a rotor guard and a deployable structure.

FIG. 17 illustrates applications of an aerial device 800 comprising a rotor guard 830 and a deployable structure 130. In FIG. 17(*a*), the aerial device 800 is equipped with a manipulator arm. Using the rotor guard 830 and deployable structure 130, the aerial device 100 is able to safely and non-destructively inspect/repair pipelines at a high altitude.

The manipulator arm may be suitable for the inspection/repair of artwork, such as large murals or artwork at high altitude, as illustrated in FIG. 17(*b*), or for manipulation of surfaces.

Figure 18:
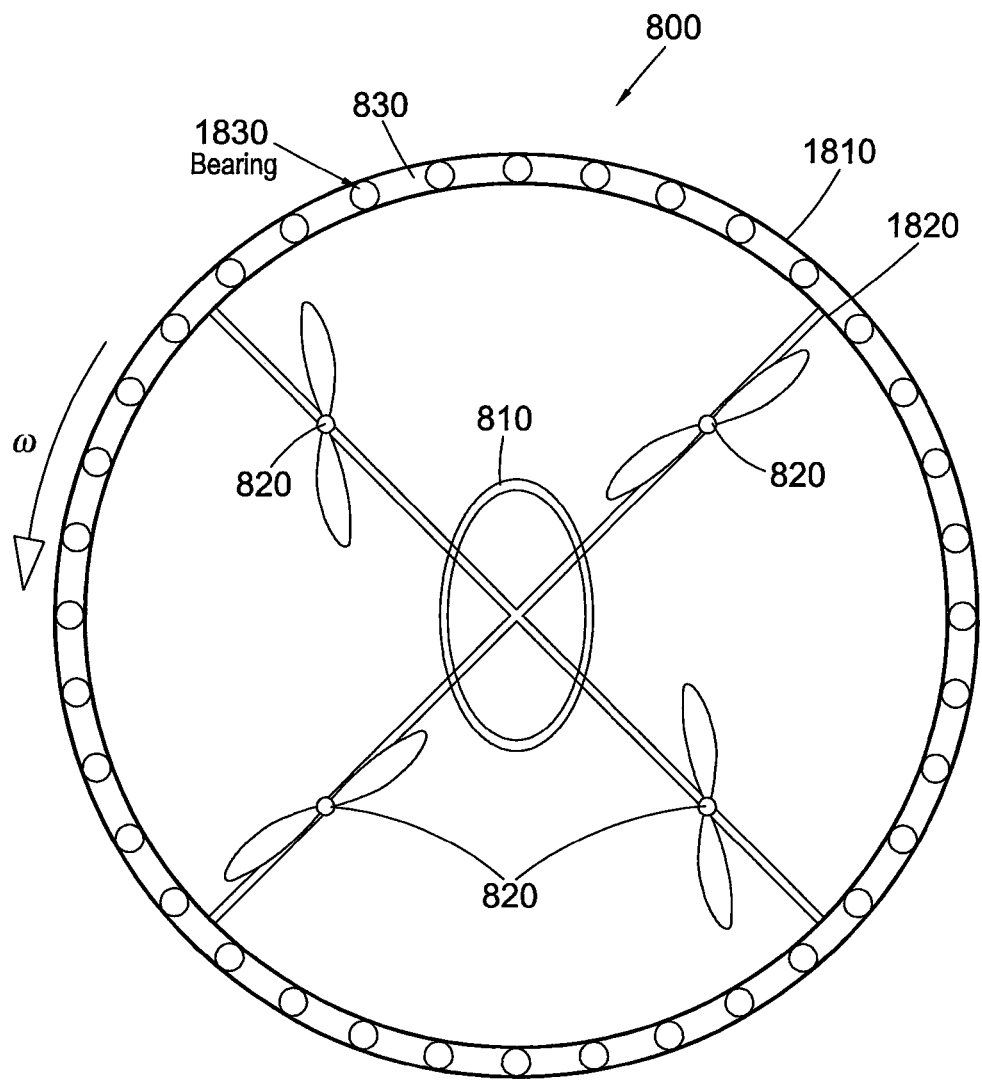
FIG. 18 shows a UAV having a rotor guard comprising ball bearings.

FIG. 18 shows an aerial device 800 comprising a body 810, four rotors or propellers 820, and a rotor guard 830. The rotor guard comprises an inner portion 1820, which is fixed relative to the body 810, and an outer portion 1810, which rotates relative to the body 810 and relative to the rotors 820. In the example of FIG. 18, the inner portion 1820 and outer portion 1810 of the rotor guard 830 are cylindrical or torus shells.

The rotor guard also comprises rotatable elements 1830 between the inner portion 1820 and the outer portion 1810, thereby facilitating the rotation of the outer portion 1810.

In FIG. 18, the rotatable elements 1830 are ball bearings (or 'rolling balls', 'bearing balls', or simply 'balls'), and can rotate in any direction. The rotatable elements 1830 therefore have multiple degrees of freedom. The ball bearings thus not only provide protection from side-on collisions, but also provide protection from collisions from above or below the aerial device 800.

The rotor guard 830 of FIG. 18 may additionally or alternatively include features of the rotor guard 830 of FIG. 10(*b*). For example, the rotatable elements 1830 may be rollers. In this case, the rotatable elements 1830 may only rotate about an axis that is parallel, or substantially parallel, to the axis of rotation of the rotors 820, and therefore have only a single degree of freedom. As another example, the outer portion 1810 of the rotor guard 830 may be a bumper 1020, which may have a toroidal shape.

The outer portion 1810 of the rotor guard 830 may be fabricated from a variety of materials (such as soft materials), may be a flexible, deployable or inflatable structure, or may be omitted entirely.

Figure 19:
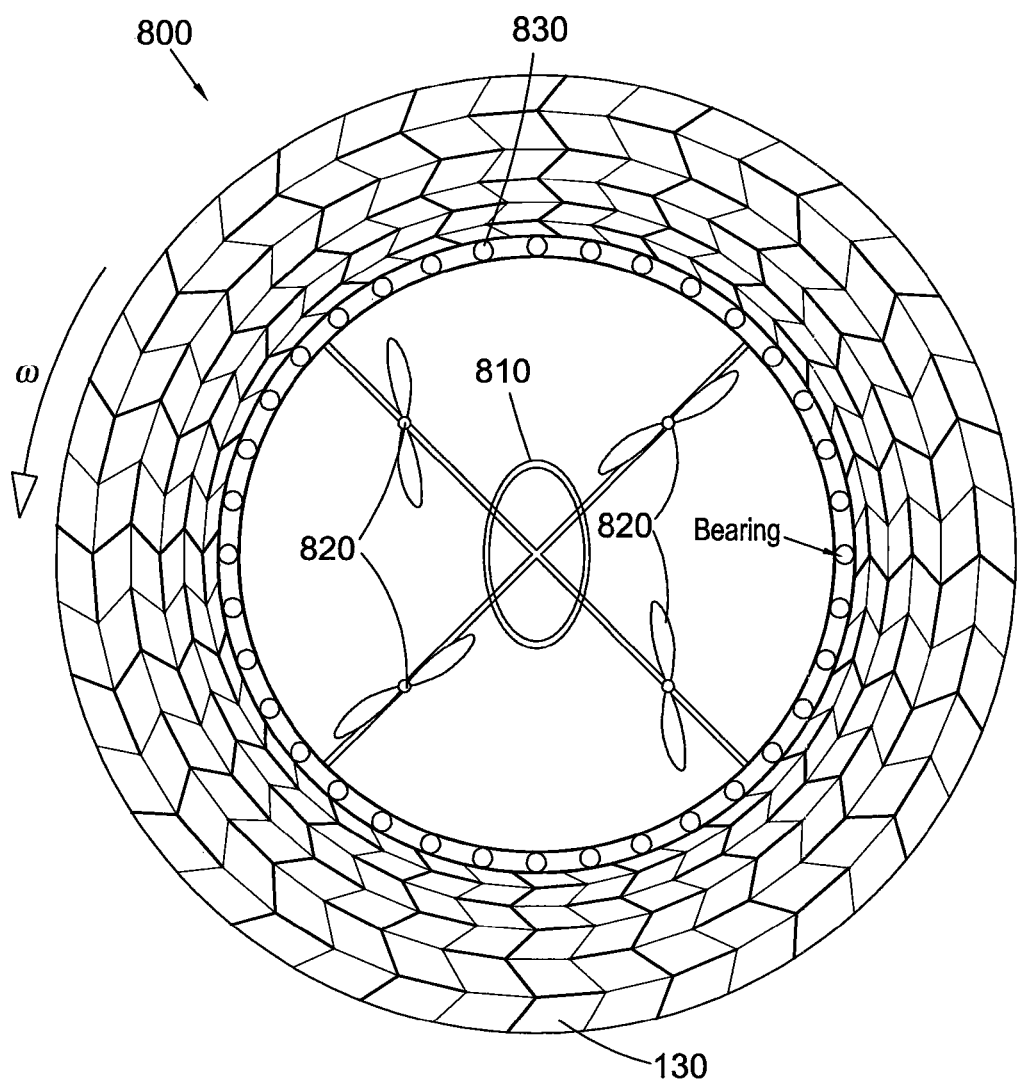
FIG. 19 shows a UAV having a rotor guard comprising ball bearings and a deployable structure.

For example, the rotor guard 830 of FIG. 18 may be combined with the deployable structure 130 as described herein. Such a combination is illustrated in FIG. 19. The deployable structure 130 is mounted to the outer portion 1810 of the rotor guard 830, such that in its undeployed configuration, the deployable structure 130 is compressed against the outer portion 1810 of the rotor guard 830. As one example, the deployable structure 130 may be compressed against the outer portion 1810 by folding the deployable structure 130 against the outer portion 1810 of the rotor guard 830.

Figure 20:
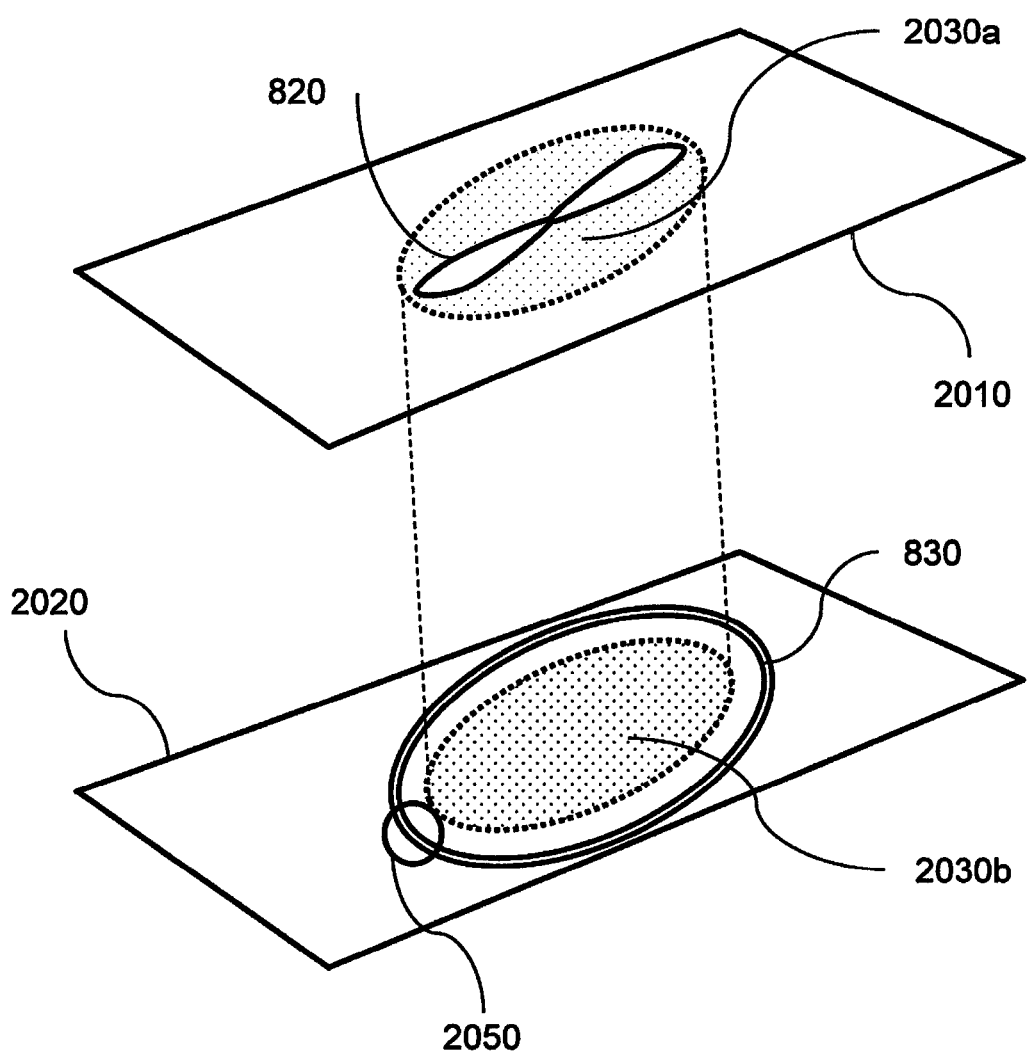
FIG. 20 illustrates a configuration wherein a rotor and a rotor guard rotate in parallel planes.

The rotor 820 and the rotor guard 830 may rotate in spaced, parallel planes, as shown for example in FIG. 60 below. In this case, the aerial device 800 comprises a body, a rotor 820 and a rotor guard 830. As illustrated in FIG. 20, the rotor 820 is arranged to rotate with respect to the body, and the rotor 820 is arranged to rotate in a first plane 2010 so as to describe a first area 2030a therein. At least a portion 2050 of the rotor guard 830 (for example, a roller) is arranged to rotate relative to the body and relative to the rotor 820 in a second plane 2020 so as to describe a second area therein (also shown in the figures by reference sign 2050). The second plane 2020 is parallel to or coincident with the first plane 2010. When the first area 2030a is projected orthogonal to the first plane 2010 into the second plane 2020, at least a portion of the second area lies without the projection 2030b. In this way, the portion 2050 of the rotor guard 820 comes into contact with obstacles before the rotor 820 does.

Figure 21:
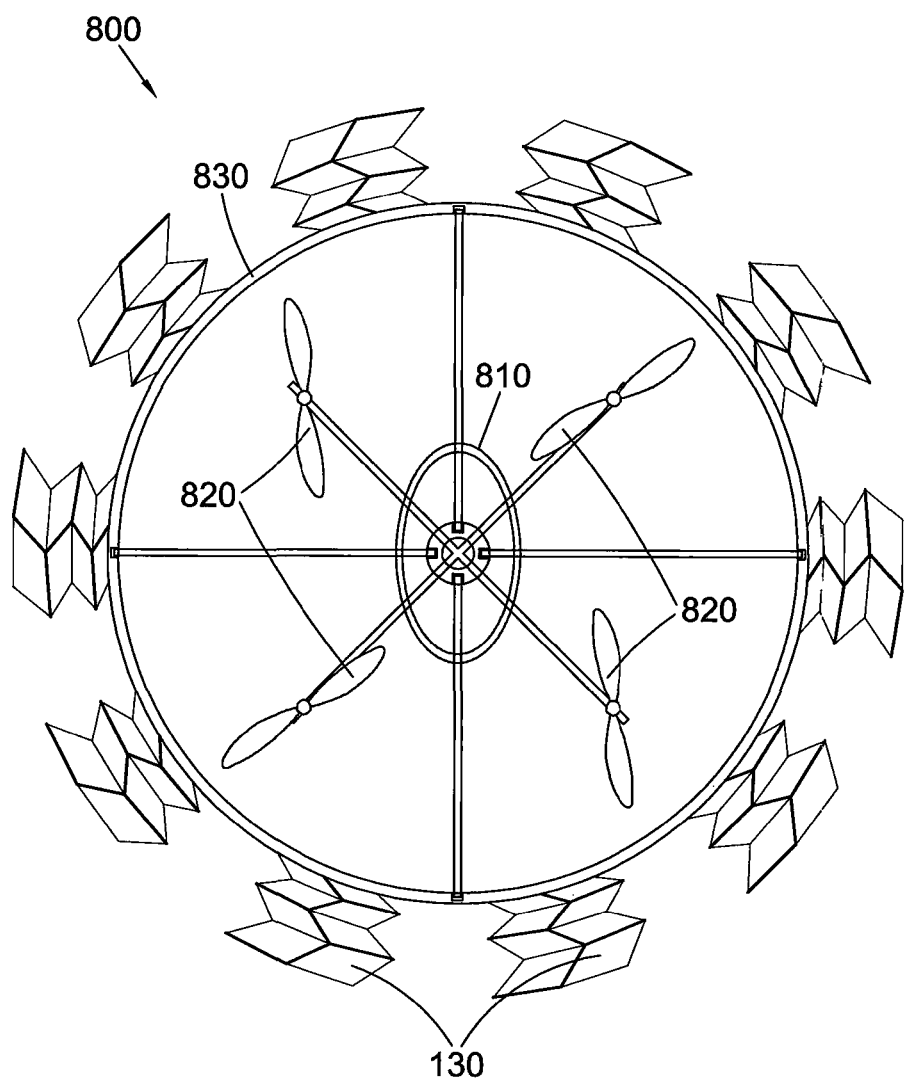
FIG. 21 shows a UAV having a rotor guard and a plurality of deployable structures.

Instead of having a single deployable structure 130, an aerial device 800 may have multiple deployable structures 130. FIG. 21 shows an aerial device 800 having a rotor guard 830 and ten deployable structures 130.

Each deployable structure 130 has an undeployed configuration, in which that structure is folded against the rotor guard 830, and a deployed configuration, in which that structure is at least partially unfolded away from the rotor guard 830. Each deployable structure 130 is fixed to a respective portion of an outer perimeter of the rotor guard 830.

The deployable structures 130 are spaced apart from one another when in their respective deployed configurations, and/or when in their respective undeployed configurations. The structural mass of the aerial device is thereby reduced. Furthermore, a plurality of deployable structures 130 may be easier to fabricate than a single, larger, deployable structure 130.

The deployable structures 130 of the aerial device 800 of FIG. 21 may be the deployable structures 130 of any of the examples described herein. In particular, the deployable structures 130 may comprise creases, as in FIG. 21, where the deployable structures 130 are folded according to a Miura-based folding pattern.

The deployable structure 130 may alternatively be any spring-like structure that is able to deform when colliding with an obstacle, such as a spring (which may be made of metal or glass fibre) or a buckling rod.

The rotor guard 830 of the aerial device 800 of FIG. 21 may be the rotor guards 830 of any of the examples described herein. In particular, the rotor guard 830 may be arranged to rotate relative to the body 810 and relative to the rotors 820. Alternatively, the rotor guard 830 may be fixed relative to the body 810.

The rotor guard 830 of FIG. 21 is annular. The deployable structures 130 are equi-spaced about the outer perimeter of the rotor guard 830.

Figure 22:
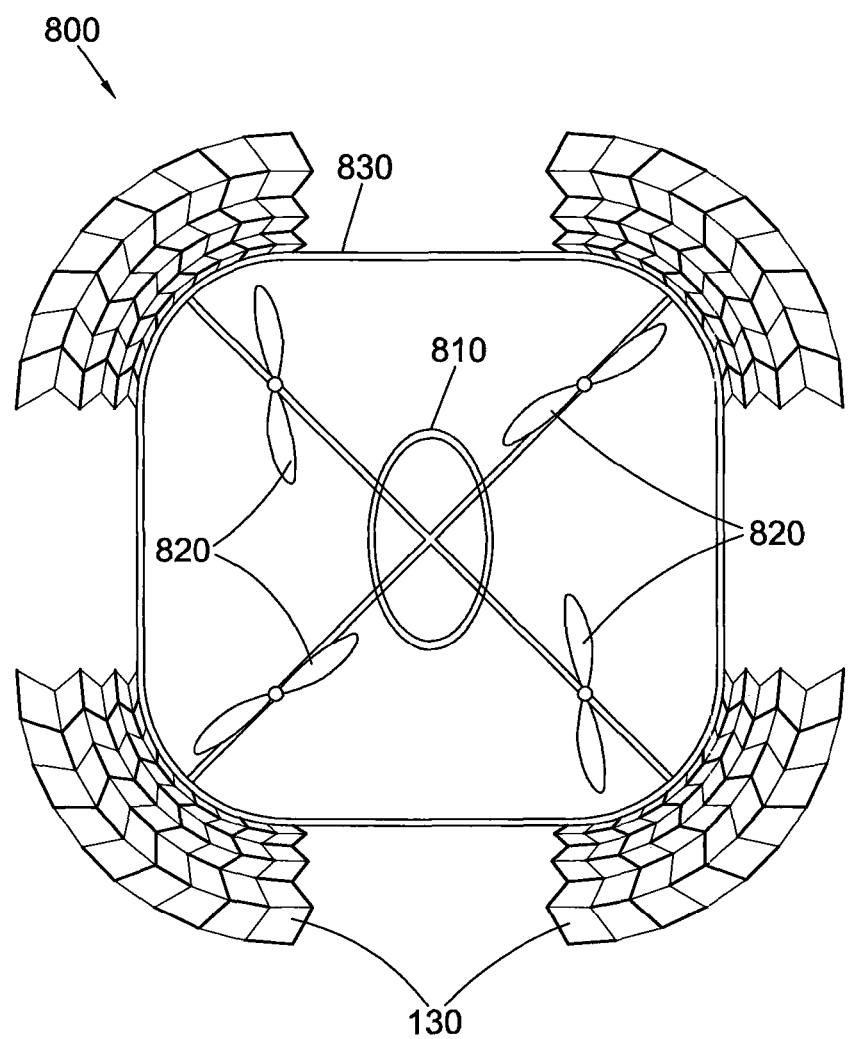
FIG. 22 shows a UAV having a 'squircular' rotor guard and a plurality of deployable structures.

It should be understood that the rotor guard 830 need not have a circular periphery. For example, FIG. 22 shows an aerial device which is similar to the aerial device of FIG. 21; however, in FIG. 22, the outer perimeter of the rotor guard 830 has radiused corners, giving the rotor guard 830 a 'squircular' shape. The deployable structures 830 are fixed to the radiused corners. In FIG. 22, unlike in FIG. 21, the rotor guard 830 is fixed relative to the body 810.

The rotor guard of any of the examples described herein may have a duct portion and, in this case, at least a portion of the duct portion is moveable relative to the body 810 so that, when the rotor 820 rotates relative to the body 810 and the at least a portion of the duct portion is moved, a fluid flow through the duct portion is changed.

Figure 55:
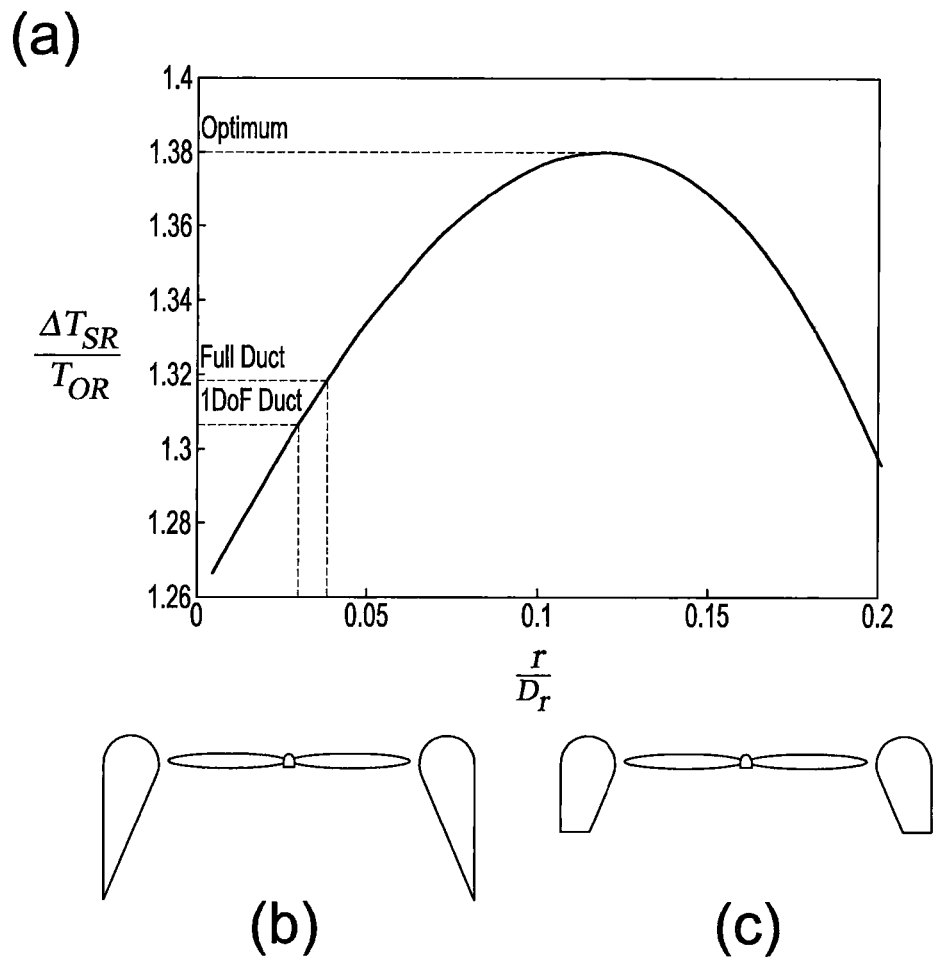
FIG. 55 shows an expected thrust increase at the design point of the 1DoF rotor guard.

An aerial device may comprise a body; a rotor arranged to rotate relative to the body; and a rotor duct arranged to define a space for the rotor to rotate within, wherein at least a portion of the rotor duct is moveable relative to the body so that, when the rotor rotates relative to the body and the at least a portion of the rotor duct is moved, a fluid flow through the duct is changed (see FIG. 55).

Those skilled in the art will recognize that a wide variety of modifications, alterations, and combinations can be made with respect to the above described embodiments without departing from the scope of the disclosed concepts, and that such modifications, alterations, and combinations are to be viewed as being within the ambit of the disclosed concepts. In particular, one or more deployable structures, a rotor guard, and/or a rotor duct may be combined in a single aerial device.

The approaches described herein may be embodied on a computer-readable medium, which may be a non-transitory computer-readable medium. The computer-readable medium carrying computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

As will be appreciated by those skilled in the art, the components of the aerial device can be produced via additive manufacturing, for example via the use of a 3D printer. First, a computer-readable file containing data representative of an aerial device is produced. The data may be representative of the geometry of successive cross-sections of the component. This data is often called 'slice' or 'layer' data. The data can be produced from a Computer Aided Design (CAD) file, or via The use of a 3D scanner. A 3D printer can then successively lay down layers of material in accordance with the cross-section data to produce the aerial device components.

There is described herein an aerial device with improved safety (upon impact with human beings or birds for example), crashworthiness (upon impact with obstacles), and flight performance and efficiency (allowing for gliding flight in case of motor failure).

There is further described herein a lightweight, low cost, mechanically simple and easily tunable, deployable sheet that is scalable to different sizes of aerial devices and can be used for both impact protection and gliding.

There is described herein the provision of a rotor guard which can improve the rotational response of an aerial device to collisions.

There is described herein a rotor guard that is able to rotate relative to the body of the aerial device, which results in the friction force ($F_x$ of FIGS. 11 and 12) not producing a yawing moment around the centre of mass of the aerial device (assuming the aerial device is symmetric about its centre of mass), and the trajectory of the aerial device being less disturbed than in the case where the rotor guard is fixed.

There is described herein a rotor guard defining a space within which multiple rotor rotate, which results in the normal force ($F_y$ of FIGS. 11 and 12) not producing a yawing moment around the centre of mass of the aerial device (assuming the aerial device is symmetric about its centre of mass), and the trajectory of the aerial device being less disturbed than in the case where multiple rotor guards each define a space within which a single rotor rotates.

There is described herein a passively spinning (using for example a rolling bearing at the centre) rotor guard or protector which decouples the moment due to friction force (or the component of friction force parallel to the aerial device plane) from the body or platform of the aerial device.

There is described herein a simple, lightweight, inexpensive, and compact rotor guard, which may be integrated into existing aerial devices.

Examples of the present disclosure are set out in the following numbered clauses.

1. An aerial device capable of controlled flight, the aerial device comprising:
    a body;
    a rotor arranged to rotate relative to the body; and a deployable sheet, the sheet having an undeployed configuration in which the sheet is folded against the body and a deployed configuration in which the sheet is at least partially unfolded away from the body.
2. The aerial device of any preceding clause, wherein the sheet comprises at least one crease.
3. The aerial device of clause 2, wherein at least one crease of the sheet is scored or perforated.
4. The aerial device of any of clause 2 or 3, wherein the sheet comprises a plurality of creases that define a tessellated surface thereof.
5. The aerial device of clause 4, wherein the tessellated surface comprises a plurality of parallelograms defined by the creases.
6. The aerial device of any preceding clause, wherein the rotor is arranged to rotate in a plane and wherein, in the deployed configuration, the sheet is at least partially unfolded away from the body in a direction parallel to the plane.
7. The aerial device of any preceding clause further comprising an actuator operable to deploy the sheet from the undeployed configuration to the deployed configuration and/or to undeploy the sheet from the deployed configuration to the undeployed configuration.
8. The aerial device of clause 7 further comprising a controller arranged to operate the actuator.
9. The aerial device of clause 8, the aerial device further comprising at least one sensor for generating sensor data relating to a surrounding environment in which the aerial device is controllably flown, wherein the controller is arranged to operate the actuator based on the sensor data.
10. The aerial device of clause 9, wherein the sensor data includes data relating to a distance between the aerial device and a potential obstacle and the controller is arranged to operate the actuator based on the data relating to the distance.
11. The aerial device of any of clauses 8 to 10, the aerial device further comprising an energy store, and wherein the controller is arranged to operate the actuator based on an energy level of the energy store.
12. The aerial device of any preceding clause, wherein the body defines a space for the rotor to rotate within.
13. The aerial device of clause 12, wherein the space is defined by a duct portion of the body, and further wherein at least a portion of the duct portion is moveable relative to the body so that, when the rotor rotates relative to the body and the at least a portion of the duct portion is moved, a fluid flow through the duct portion is changed.
14. An aerial device capable of controlled flight, the aerial device comprising:
    a body;
    a rotor arranged to rotate relative to the body; and a rotor guard arranged to define a space for the rotor to rotate within, wherein at least a portion of the rotor guard is arranged to rotate relative to the body and relative to the rotor.
15. The aerial device of clause 14, wherein the rotor and rotor guard are arranged to rotate relative to the body in parallel or coincident planes.
16. The aerial device of any of clauses 14 to 15, wherein the axes about which the rotor and rotor guard are respectively arranged to rotate relative to the body are coincident.
17. The aerial device of any of clauses 14 to 16, wherein all of the rotor guard is arranged to rotate relative to the body and relative to the rotor.
18. The aerial device of any of clauses 14 to 17, wherein the at least a portion of the rotor guard that is arranged to rotate comprises one or more rollers.
19. The aerial device of any of clauses 14 to 16 or 18, wherein the at least a portion of the rotor guard that is arranged to rotate comprises a toroidal bumper.
20. The aerial device of any of clauses 14 to 17, wherein the rotor guard has a toroidal shape.
21. The aerial device of any of clauses 14 to 20, further comprising a deployable sheet, the sheet having an undeployed configuration in which the sheet is folded against the rotor guard and a deployed configuration in which the sheet is at least partially unfolded away from the rotor guard.
22. The aerial device of any of clauses 14 to 21, wherein the aerial device comprises a plurality of rotors arranged to rotate relative to the body, and wherein:
    the rotor guard is arranged to define a space for the plurality of rotors to rotate within, and
    at least a portion of the rotor guard is arranged to rotate relative to the body and relative to each of the plurality of rotors.
23. The aerial device of any of clauses 14 to 22, wherein a cross-section of the rotor guard is aerofoil-shaped.
24. The aerial device of any of clauses 14 to 23, wherein the rotor guard has a duct portion and at least a portion of the duct portion is moveable relative to the body so that, when the rotor rotates relative to the body and the at least a portion of the duct portion is moved, a fluid flow through the duct portion is changed.
25. An aerial device capable of controlled flight, the aerial device comprising:
    a body;
    a rotor arranged to rotate with respect to the body, the rotor being arranged to rotate in a first plane so as to describe a first area therein; and
    a rotor guard, at least a portion of which is arranged to rotate relative to the body and relative to the rotor in a second plane so as to describe a second area therein, wherein the second plane is parallel to or coincident with the first plane, wherein, when the first area is projected orthogonal to the first plane into the second plane, at least a portion of the second area lies without the projection.

26. An aerial device capable of controlled flight, the aerial device comprising:
   a body;
   a rotor arranged to rotate relative to the body; and
   a rotor duct arranged to define a space for the rotor to rotate within, wherein at least a portion of the rotor duct is moveable relative to the body so that, when the rotor rotates relative to the body and the at least a portion of the rotor duct is moved, a fluid flow through the duct is changed.

27. A computer-readable medium having data stored thereon representative of the aerial device according to any of clauses 1 to 26, the data being such that it can be relayed to an additive manufacturing device to enable the additive manufacturing device to fabricate the aerial device based on the data.

B1. An aerial device capable of controlled flight, the aerial device comprising:
   a body;
   a rotor arranged to rotate relative to the body;
   a rotor guard arranged to define a space for the rotor to rotate within; and
   one or more deployable structures, each structure having an undeployed configuration in which that structure is compressed against the rotor guard and a deployed configuration in which that structure extends away from the rotor guard.

B2. The aerial device of clause B1, wherein at least a portion of the rotor guard is arranged to rotate relative to the body and relative to the rotor.

B3. The aerial device of any of clauses B1 to B2, wherein the rotor is a first rotor, the aerial device further comprising a second rotor arranged to rotate relative to the body, wherein the rotor guard is arranged to define a space for both the first and second rotors to rotate within.

B4. The aerial device of any of clauses B1 to B3, wherein an outer perimeter of the rotor guard has one or more radiused corners and at least one of the one or more deployable structures is fixed to one of the radiused corners.

B5. The aerial device of any of clauses B1 to B4, wherein the deployable structure is a sheet and wherein, in the undeployed configuration, the sheet is folded against the rotor guard and, in the deployed configuration, the sheet is at least partially unfolded away from the rotor guard.

B6. The aerial device of clause B5, wherein at least one of the one or more deployable sheets comprises at least one crease.

B7. The aerial device of clause B6, wherein the at least one crease is scored or perforated.

B8. The aerial device of any of clauses B6 or B7, wherein at least one of the deployable sheets comprises a plurality of creases that define a tessellated surface thereof.

B9. The aerial device of clause B8, wherein the tessellated surface comprises a plurality of parallelograms defined by the creases.

B10. The aerial device of any of clauses B1 to B9, wherein the one or more deployable structures comprises a plurality of deployable structures, and wherein each deployable structure is fixed to a respective portion of an outer perimeter of the rotor guard.

B11. The aerial device of clause B10, wherein the deployable structures are spaced apart from one another when in their respective undeployed configurations.

B12. The aerial device of any of clauses B10 to B11, wherein the deployable structures are spaced apart from one another when in their respective deployed configurations.

B13. The aerial device of any of clauses B10 to B12, wherein the rotor guard is annular and the plurality of deployable structures are equi-spaced about the outer perimeter of the rotor guard.

B14. An aerial device capable of controlled flight, the aerial device comprising:
   a body;
   a rotor arranged to rotate relative to the body; and
   a deployable structure, the deployable structure being a sheet having an undeployed configuration in which the sheet is folded against the body and a deployed configuration in which the sheet is at least partially unfolded away from the body,
   wherein the sheet comprises a plurality of creases that define a tessellated surface thereof, the surface being tessellated substantially according to the pattern of any of FIG. 4(a), 4(b), 4(c), 4(d), 4(e), 4(f), 4(g), 4(h), 4(i), 4(j) or 23.

B15. The aerial device of any of clauses B5 to B9 and B14, wherein the rotor is arranged to rotate in a plane and wherein, in the deployed configuration, the sheet is at least partially unfolded away from the body in a direction parallel to the plane.

B16. The aerial device of any of clauses B1 to B15 further comprising an actuator operable to deploy the structure from the undeployed configuration to the deployed configuration and/or to undeploy the structure from the deployed configuration to the undeployed configuration.

B17. The aerial device of clause B16, the aerial device further comprising:
   at least one sensor for generating sensor data relating to a surrounding environment in which the aerial device is controllably flown; and
   a controller arranged to operate the actuator based on the sensor data.

B18. The aerial device of clause B17, wherein the sensor data includes data relating to a distance between the aerial device and a potential obstacle and the controller is arranged to operate the actuator based on the data relating to the distance.

B19. The aerial device of any of clauses B17 to B18, the aerial device further comprising an energy store, and wherein the controller is arranged to operate the actuator based on an energy level of the energy store.

B20. The aerial device of any of clauses B1 to B19, wherein the body defines a space for the rotor to rotate within.

B21. The aerial device of clause B20, wherein the space is defined by a duct portion of the body, and further wherein at least a portion of the duct portion is moveable relative to the body so that, when the rotor rotates relative to the body and the at least a portion of the duct portion is moved, a fluid flow through the duct portion is changed.

B22. An aerial device capable of controlled flight, the aerial device comprising:
   a body;
   one or more rotors arranged to rotate relative to the body; and
   a rotor guard arranged to define a space for the one or more rotors to rotate within, the rotor guard comprising:
      an inner portion arranged to be fixed relative to the body; and one or more rotatable elements arranged about an outer periphery of the inner portion, each rotatable element being arranged to rotate about one or more axes.

B23. The aerial device of clause B22, wherein the one or more rotatable elements are rollers arranged to rotate about an axis substantially parallel to an axis of rotation of the one or more rotors.

B24. The aerial device of clause B22, wherein the one or more rotatable elements are ball bearings arranged to rotate in any direction.

B25. The aerial device of any of clauses B22 to B24, wherein the inner portion of the rotor guard comprises a cylindrical shell.

B26. The aerial device of any of clauses B22 to B25, wherein the rotor guard further comprises an outer portion arranged to rotate relative to the body and the one or more rotors, and wherein the rotatable elements are between the inner portion and the outer portion.

B27. The aerial device of clause B26, wherein the outer portion of the rotor guard comprises a cylindrical shell.

B28. The aerial device of clause B26, wherein the outer portion of the rotor guard comprises a bumper.

B29. The aerial device of clause B28, wherein the bumper has a toroidal shape.

B30. The aerial device of any of clauses B22 to B29, further comprising:
   one or more deployable structures, each structure having an undeployed configuration in which that structure is compressed against the rotor guard and a deployed configuration in which that structure extends away from the rotor guard.

B31. The aerial device of clause B30, wherein the one or more deployable structures are one or more deployable sheets, each sheet having an undeployed configuration in which that sheet is folded against the rotor guard and a deployed configuration in which that sheet is at least partially unfolded away from the rotor guard.

B32. The aerial device of any of clauses B29 to B31, wherein, in the undeployed configuration, each of the one or more deployable structures is compressed against the outer portion of the rotor guard.

B33. A computer-readable medium having data stored thereon representative of the aerial device according to any of clauses B1 to B32, the data being such that it can be relayed to an additive manufacturing device to enable the additive manufacturing device to fabricate the aerial device based on the data.

B34. A method, system, or apparatus substantially as described herein and with reference to the appended figures.

There will now be described several further embodiments relating to aerial devices capable of controlled flight.

The below outlines the motivation and theory behind novel methods of protection for multirotor Miniature Unmanned Aerial Vehicles (MAVs). The aim was to achieve better crash-robustness, but with less of an impact on the weight, cost, performance and functionality of the robot. Rotor guards with freedom to rotate horizontally around each rotor blade were proposed and discussed. By giving the system this degree of freedom, the moments imposed on the MAV frame in impact can be decoupled from the moments on the rotor guard, thus reducing the MAVs spinning response to deflective impacts. Also discussed is the effectiveness of surrounding each rotor blade with an aerodynamically shaped duct. It was found that with an optimally sized duct, the net thrust (corrected for the weight of the duct) could be up to 50% greater than that of an open rotor.

1.1 Background to the Project

In recent years, multirotor Micro Aerial Vehicles (MAVs) have become an area of great interest within the research & development, commercial and hobbyist sectors. The Vertical Take-off and Landing (VTOL) and hover capabilities of this type of aircraft make it suitable for a wide range of applications, from search and rescue right through to delivery and environmental research.

Currently, this type of rotorcraft relies heavily on see and avoid techniques to prevent impacts with human beings, animals, and its environment. However some applications place these MAVs in close-quarter environments in which there are too many obstacles to rely on sight or sensing alone to prevent collisions. It is in these situations that there is a requirement for the implementation of extra measures to prevent damage to the environment and damage to the rotorcraft itself upon impact.

The primary hazard caused by this type of MAV is impacts involving the rotor blades. The speed at which the rotor blades rotate and the sharp nature of their geometries has been the cause of injuries to humans and damage to property on several occasions since 2013. Attempts to reduce this hazard, by enclosing the rotor blades in a protective casing, have resulted in a decrease in performance of the MAV (endurance, range, payload capability etc.) and have therefore not experienced wide scale uptake.

The aim of this project is to assess the capabilities of current rotor protection schemes and to ultimately develop a novel way to increase the crash robustness of multirotor MAVs, whilst reducing the performance penalty caused by the protection scheme.

1.1.1 Drones for Ecological Research

The rainforest is an extremely cluttered and hostile environment (rain, heat, low light, trees etc.) and many of the machines used for data collection and research elsewhere in the world are not suitable there. Quadcopters could provide a versatile platform for ecological research in rainforests as they are small, agile and can navigate around difficult obstacles. However it is challenging to enable a quadcopter to operate in such an environment due to the sensitive nature of their rotor blades and the equipment they carry. Avoiding all collisions in the rainforest is impossible, therefore a quadcopter designed for this environment has to be crash robust. The requirements for a quadcopter designed for flying in a rainforest will be similar to those required for a cluttered urban or indoor environment as well.

The primary focus of this project is therefore to design a rotor protection system for a quadcopter, but the methods and techniques used should also be adaptable and scalable to different quadcopters or other UAVs and different applications in the future.

1.2 Rotor Protection Schemes

Rotor protection schemes can be broken down into two broad categories: static and mechanical.

Static Rotor Protection

The simplest method of rotor protection is obtained by creating an immobile barrier between the rotors and the regions of potential contact with external obstacles. There is currently a wide range of commercially available static rotor protection systems available with varying cost, weight, strength and impact qualities. The advantages of this type of structure is that they are simple to design, cheap to manufacture and usually lightweight in comparison to their mechanical counterparts. The downside is that they are not capable of reacting to impacts and therefore have no way of damping the force and moments imposed on the MAV during a collision, which can become a problem, especially when impacts are frequent.

Mechanical Rotor Protection

An extremely effective way of enhancing the collision resilience of multirotor MAVs is by decoupling the rotor guard from the main body of the MAV. This changes the way that impacts with external obstacles affect the force and moment resultant on the MAV. This system approaches the problem in a novel and interesting way, however there are several issues with this design which could be improved upon:

- There is a significant amount of unused space around the quadcopter, making it larger and less agile. The resulting structure is therefore heavier than necessary. [Note: if a quadcopter is used instead of a tail-sitting twin-rotor, then the structure will be much larger]
- The camera and other sensors are likely to be obscured by the cage. For example the quadcopter being used for ecological research in this project has an extending arm, which holds a temperature sensor. With complete enclosure of the MAV, the sensor arm cannot extend far enough away from the MAV to take an accurate temperature reading.
- The structure cannot hold and deliver a payload (e.g. sensor or package) as it would not easily be able to be released from inside the cage.
- The extra material around the quadcopter will also affect the flow through the rotor blades and therefore reduce endurance, range and payload carrying capabilities.

By identifying the areas of sub-optimal design in current MAV rotor protection systems, we can decide upon the criteria with which to rate the designs considered in this project. The areas we can improve on are as follows:

Protection—The primary function of the structure will be to protect the MAV from damage and prevent damage to external objects in collisions. The degree to which the structure achieves this will be a direct indicator of the effectiveness of the design.

Weight—Minimising weight is crucial in the design of MAVs. A weight saving over conventional rotor protection schemes will increase all the parameters used to measure performance. Alternatively a reduced structural weight will allow for an increased payload weight in applications such as drone delivery.

Cost—The cost of the structure has to be minimised. This will include the cost of materials used, the cost of processing the materials, the cost of the electronics in the mechanism (if applicable) and the cost of assembling it into a structure and fitting it to the MAV.

Performance—A main driver in the design will be to preserve the performance of the MAV. Possible parameters used to measure the performance of the aircraft involve range, endurance and top-speed of the MAV.

Functionality—Due to the diversity of MAV designs and applications, the structure designed should be able to be integrated into an MAV design with minimal or no loss of functionality to that MAV. The product should be scalable and adaptable and able to be retrofitted to current MAVs as well.

2. 1DoF Rotor Protection
2.1 Introduction

The drawbacks of a fully enclosed protection system were discussed in section 1.2. The primary disadvantage with this configuration is that surrounding the entire MAV increases weight, structural complexity and cost and also reduces performance and functionality. It was therefore necessary to look into different ways of protecting the rotor blades in order to improve these characteristics. As the entire MAV does not need to be surrounded, it is possible to use a configuration that protects each rotor individually as opposed to the structure as a whole. Even with this limitation, it is still possible to create static, 1 Degree of Freedom (DoF) or 2DoF protection systems.

The analysis in section 2.2 compares the collision properties of a static rotor guard to a novel 1DoF rotor guard design. The 1DoF system proposed would have a freedom of rotation around each rotor blade as shown in FIG. 8. The vast majority of collisions occur from the side of the quadcopter. Therefore enabling a decoupling of moments between the rotor guard and the MAV in the horizontal plane should improve the impact response of the system to these side-on collisions.

2.2 Mechanics of Collisions

A simplified model of a side-on collision between the quadcopter and a hard external object, in this case a wall, can be seen in FIGS. 9a and 9b. Here a quadcopter, with initial speed, U, incident to a surface at angle $\beta$, comes into contact with it in the image on the right hand side of the figure. The forces that arise at the interface between the quadcopter cylindrical rotor guard and the surface are the normal force, N, and the tangential friction force, F.

FIGS. 9a AND 9b: Force and Moment Response of a Fixed and a 1DoF Quadcopter System to a Side-on Collision—(a) Fixed Rotor Guard; (b) 1DoF Rotor Guard With a fixed rotor guard, the moment caused by the friction force, F, causes the entire quadcopter to yaw, as can be seen in FIG. 9c. The yawing motion of the quadcopter is undesirable for several reasons: The camera will be attached to the body of the quadcopter, so if it is being remotely piloted, the camera disruption caused by the sudden, unforeseen spinning of the rotorcraft might cause the pilot to lose control. Furthermore, if the object extends far enough in the x-direction (e.g. a wall), the rotation of the quadcopter may cause the rotor guard on the right hand side of the image to impact with the object as well, further destabilising the rotorcraft.

If the rotor guard is able to rotate independently of the quadcopter frame, then the friction force component in the impact will cause the rotor guard to rotate, instead of the entire quadcopter, as can be seen in FIG. 9d. This simple mechanical alteration will drastically improve the quadcopters impact performance in side-on impacts, where the majority of impacts will occur.

2.3 Design of a 1DoF Rotor Guard

There are two possible ways of making a static rotor guard into a 1 DoF, collision responsive rotor guard, with freedom to rotate in the horizontal plane.

1. Rotation Around a Central Bearing—

This configuration (see FIG. 10a) would provide a less damped rotational response to impact, but a smaller area of connection between the rotor guard and the quadcopter frame makes it more vulnerable to damage. For instance the moments caused by impacts from above and below could dislodge the frame from its central bearing.

2. Rotation of a Separate Bumper Around Outer Perimeter Rollers—

A cylindrical bumper would sit around the circumference of a static guard and rotate on rollers on the perimeter of the guard (See FIG. 10b). This would provide a larger area of connection between the quadcopter frame and the rotor guard. The downside of this configuration would be that it involves an extra component—the bumper—which is likely to significantly increase weight. Also the friction between the bumper and the rollers is likely to reduce the rotational responsiveness of the bumper to a deflective impact.

The fully rotational guard with central bearing was selected initially because it would weigh less and it allows for a less damped rotational response to impact. This freedom of rotation only completely decouples the moment on the guard, $M_g$, from the moment on the quadcopter, Mf, in the ideal case that the guard can rotate completely freely. The friction experienced by the bearing in FIG. 10*a* and the friction between the rollers and the bumper in FIG. 10*b* will cause a coupling between rotor guard moment and the moment experienced by the quadcopter body. It is for that reason that is preferable to select the configuration which provides the least rotational resistance, which is the central bearing configuration due to the smaller area of contact. When the full scale prototype is manufactured and tested, it will be possible to ascertain whether this configuration is resistant enough to impacts from above and below.

2.4 Damping of the Normal Force

The two components of the impact force in FIGS. 9*a* and 9*b* are the tangential friction force, F, and the normal force, N. By allowing 1DoF rotation, we have decoupled the moment on the rotor guard, $M_g$, from the moment experienced by the quadcopter frame Mf.

The second way in which we can increase the impact performance of the quadcopter is by damping the normal force, N, such that the lateral position of the quadcopter is less affected by impacts as well. A cheap, lightweight and novel way in which the radial (or normal) acceleration could be reduced is by utilising external structures made with origami tessellations. By actuating the origami tessellations it is possible to vary the effective stiffness of the structure in impact, k. To achieve this, we can either extend or retract the origami tessellations as shown in FIG. 27, where $k_r > k_0$.

Figure 27:
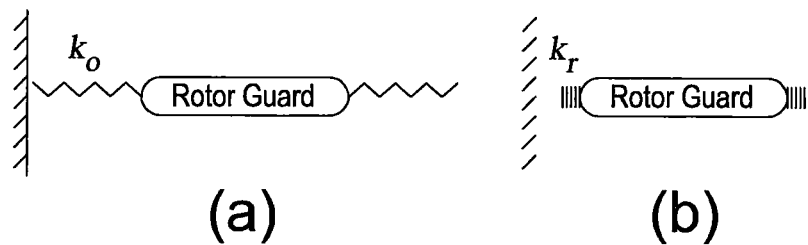
FIG. 27 shows a simplified model of impact damping using origami tessellations.

FIG. 27: Simplified Model of Impact Damping Using Origami Tessellations—(a) Origami Structure Extended, (b) Origami Structure Retracted 3. Aerodynamic Modelling of a Rotor Duct 3.1 Introduction It is possible to increase the efficiency of a propeller or rotor blade by placing it an aerodynamically shaped rotor duct. The design choices made so far in the project have meant that a protector is likely to surround each rotor blade. The following analysis will therefore assess whether it would be advantageous to use an aerodynamically shaped rotor duct for a rotor blade of the size being used by the lab group.

3.2 Momentum Theory Applied to a Rotor Blade in Hover

The following analysis was used to determine the magnitude of the potential aerodynamic benefits of a shrouded rotor blade (i.e. a rotor blade enclosed by an aerodynamically shaped duct). This analysis is based on conservation laws and assumes inviscid, incompressible and steady, quasi-one-dimensional flow. We therefore also assume that the rotor affects only axial momentum in the flow and does not impart swirl into the wake. The simplest analysis can be undertaken when the rotorcraft is assumed to be in a stationary hover. In this condition, we assume that upstream, at ⓪ in FIGS. 28 and 29, the flow is stationary (V0=0). Also we assume that ⓔ is far enough downstream that the pressure has been restored to atmospheric. Or in the case of the shrouded rotor blade, the flow has been expanded back to atmospheric pressure ($P_0 = P_e = P_{atm}$).

3.2.1 Open Rotor

Figure 28:
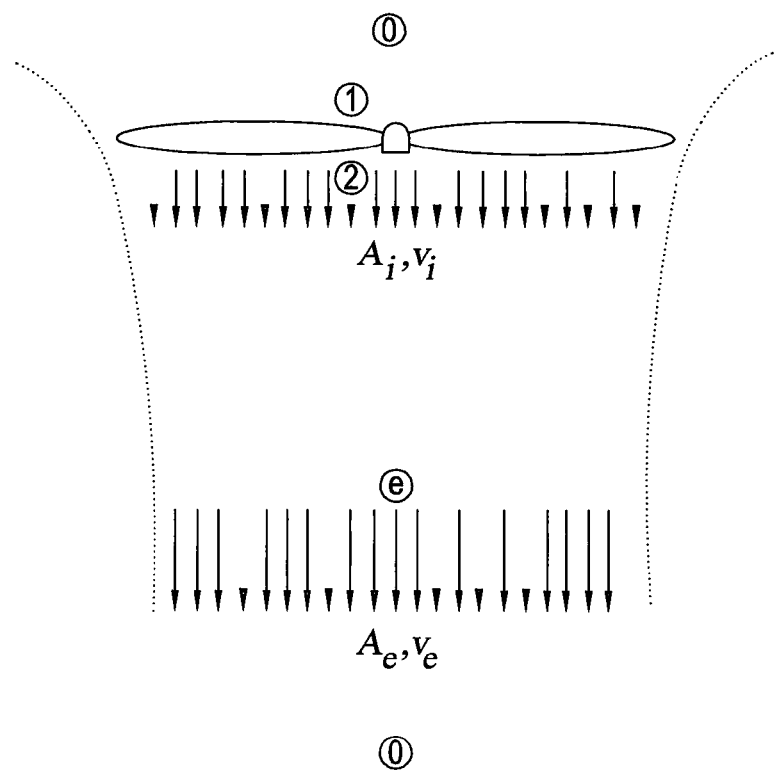
FIG. 28 shows a streamtube applied to the flow through an open rotor blade.

FIG. 28: Streamtube Applied to the Flow Through an Open Rotor Blade

Using conservation laws on FIG. 28, the following result is obtained:

Conservation of Mass: $\dot{m} = \rho A v_i = \rho A_e v_e$ (3.1)

Conservation of Momentum: $T = \dot{m}(v_e - v_0)$ (3.2)
$= \dot{m} v_e$

Conservation of Energy: $P_i = KE_e - KE_0$ (3.3)
$= \frac{1}{2} \dot{m} v_e^2$

Bernoulli's Equation can be used to get pressures at ① ($p_1$) and ② ($p_2$) and therefore the pressure difference across the disk ($\Delta p = p_2 - p_1$).

$$p_0 + \frac{1}{2}\rho v_0^2 = p_1 + \frac{1}{2}\rho v_1^2$$ (3.4)

$$p_2 + \frac{1}{2}\rho v_2^2 = p_e + \frac{1}{2}\rho v_e^2$$

$$\Delta p = p_2 - p_1$$

$$= (p_e - p_0) + \frac{1}{2}\rho v_e^2$$

$$= \frac{1}{2}\rho v_e^2$$

The actuator disk model of the rotor can therefore be used as an alternate method to calculate the thrust, T, produced by the rotor and the ideal power requirement, $P_i$, using the following relations:

$T = \Delta p A$ (3.5)

$P_i = T v_i$ (3.6)

Combining equations 3.1, 3.2, 3.4 and 3.5 we can obtain the relationship between the velocity of the flow at the rotor blade ($v_i$) and at the exit ($v_e$):

$\rho A v_i v_e = \Delta p A$ $\rho v_i v_e = \frac{1}{2}\rho v_e^2$ $v_e = 2 v_i$ (3.7)

Now substituting this result back into the conservation equations gives velocity and ideal power requirement in terms of thrust and actuator disk area:

$$v_i = \sqrt{\frac{T}{2\rho A}}$$ (3.8)

$$P_i = \frac{T^{\frac{3}{2}}}{\sqrt{2\rho A}}$$ (3.9)

3.2.2 Shrouded Rotor

Figure 29:
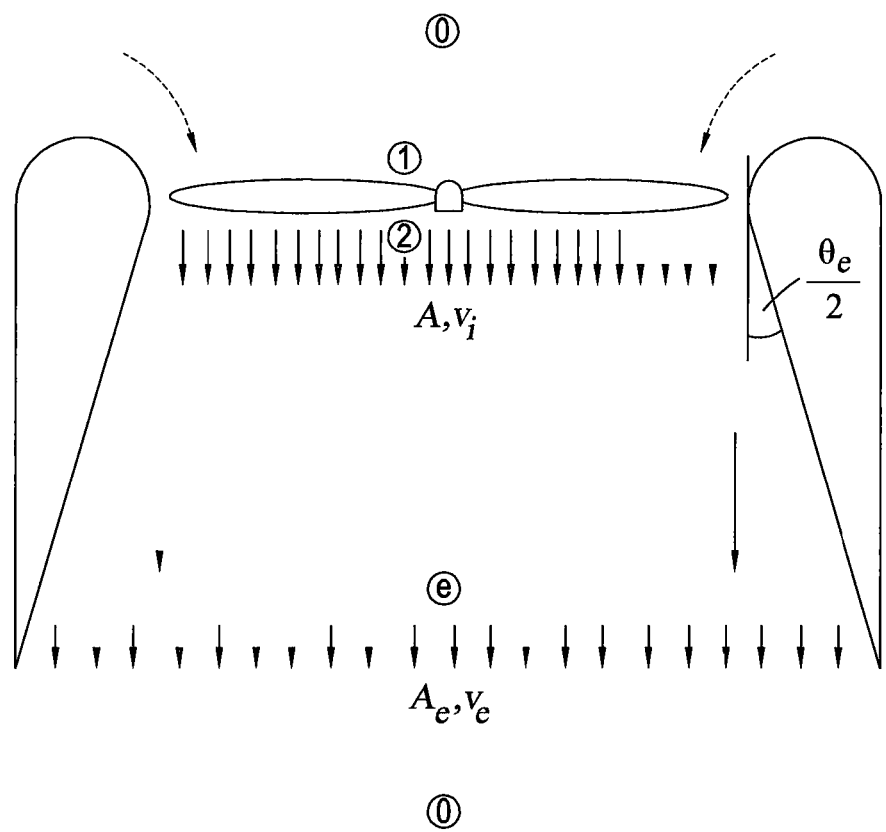
FIG. 29 shows a model of the flow through a shrouded rotor blade.

A model of the flow through the rotor when it is surrounded by a converging and diverging duct (shrouded rotor) can be seen in FIG. 29. The flow is expanded by the presence of the duct, which changes the velocity profile and thus affects the thrust output of the rotor.

The ratio between the area at the diffuser exit ($A_e$) and the area at the propeller (A) is the diffuser expansion coefficient, $\sigma_e$:

$$\sigma_e = \frac{A_e}{A}$$

As the diffuser exit area is now known, the conservation of mass equation gives the relationship between rotor velocity and exit velocity.

Conservation of Mass: $\dot{m} = \rho A v_i = \rho A_e v_e \rightarrow$ (3.10)

$$v_e = \frac{A}{A_e} v_i = \frac{v_i}{\sigma_e} \quad (3.11)$$

FIG. 29: Model of the Flow Through a Shrouded Rotor Blade

Using the conservation of momentum and energy equations we can also derive the following relations, where the subscript 'SR' denotes shrouded rotor. The thrust and power values below are the total values, made up of thrust from the rotor and thrust from the duct ($T_{SR} = T_{rotor} + T_{duct}$).

Conservation of Momentum: $T_{SR} = \dot{m} v_e = \rho A \frac{v_i^2}{\sigma_e} \rightarrow$ (3.12)

$$v_i = \sqrt{\frac{\sigma_e T_S R}{\rho A}}$$

Conservation of Energy: $P_{i,SR} = \frac{1}{2} m v_e^2$ (3.13)

$$= \frac{1}{2} \rho A \frac{v_e^3}{\sigma_e^2}$$

$$= \frac{T^{\frac{3}{2}}}{\sqrt{4 \sigma_e \rho A}}$$

The actuator disk model is only required to derive the expression for the thrust produced by the rotor alone:

$$T_{rotor} = \Delta p A \rightarrow \quad (3.14)$$

$$\frac{T_{rotor}}{T_{total}} = \frac{\frac{1}{2} \rho A v_e^2}{(\rho A v_i) v_e} \quad (3.15)$$

$$= \frac{1}{2\sigma_e}$$

Note that we can recover the open rotor result by setting $T_{rotor} = T_{total}$ giving an open rotor expansion coefficient of σe=½.

3.2.3 Open Rotor Vs. Shrouded Rotor

We can compare the performance of a shrouded rotor against an open rotor using equations 3.9 and 3.13. We can derive a relationship between the four main parameters of the open and shrouded flows: thrust, power requirement, rotor disk area and diffuser expansion ratio. Taking a ratio of these expressions and denoting open rotor parameters with a subscript OR and shrouded rotor parameters with subscript SR, we get:

$$\frac{P_{i,SR}}{P_{i,OR}} = \frac{1}{\sqrt{2\sigma_e}} \left(\frac{T_{SR}}{T_{OR}}\right)^{\frac{3}{2}} \left(\frac{A_{OR}}{A_{SR}}\right)^{\frac{1}{2}} \quad (3.16)$$

There are several analyses we can perform by manipulating equation 3.16. For instance, if we assume that the disk areas are the same (AOR=ASR) and that the rotor blades are given the same amount of power (Pi,OR=Pi,SR), then we get the following relationship for thrust produced by the shrouded and open rotors as a function of the diffuser expansion ratio:

$$\frac{T_{SR}}{T_{OR}} = (2\sigma_e)^{\frac{1}{3}} \quad (3.17)$$

3.3 Optimum Sizing

From equation 3.17 we can see that by increasing the diffuser expansion ratio, $\sigma_e$, the thrust produced by the shrouded rotor increases proportional to $\sigma_e^{1/3}$. However to increase $\sigma_e$, the diffuser has to either be lengthened, which incurs a weight penalty, or the angle of the diffuser wall ($\theta_e$ in FIG. 29) has to be increased. The limit on $\theta_e$ is the angle at which the flow separates from the wall. A study of similarly sized diffusers, gives an optimum diffuser angle of $\theta_e$=20°. Using this diffuser angle, in combination with a semi-circular leading edge and a straight outside wall (as shown in Appendix FIG. 31), we can calculate an optimum leading edge radius (r) and the accompanying optimum diffuser length (L).

Figure 30:
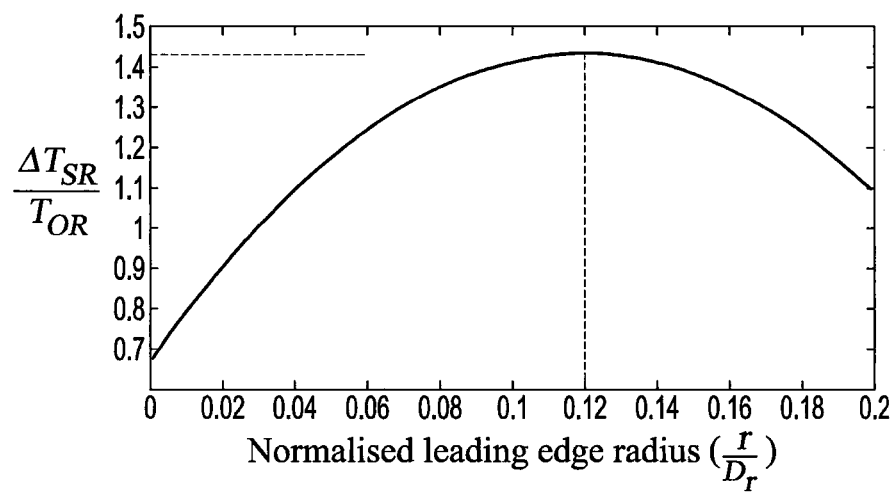
FIG. 30 shows extra thrust produced by shrouded rotor against normalised leading edge radius of the duct.

FIG. 30 shows the shrouded to open rotor thrust ratio, with the weight of the duct taken into account against the normalised leading edge radius $$\left(\frac{r}{D_r}\right)$$

where $D_r$ is the diameter of the rotor blade. From the graph, we can ascertain that the optimum LE radius for the duct is r=0.12$D_r$.

FIG. 30: Extra Thrust Produced by Shrouded Rotor Against Normalised Leading Edge Radius of the Duct The quadcopter being used by the lab for ecological research is fitted with 26.5 cm diameter rotor blades. This gives a duct LE radius of 3.12 cm and a duct length of 9.7 cm. The potential net thrust produced by this configuration duct can be seen in the figure to be in the region of 1.4-1.5 times greater than that of an open rotor, or in other words, 40%-50% more efficient. It has also been observed in experiments on ducts of a similar size that the efficiency of ducted rotors can actually be greater than expected if the distance between the duct and the edge of the rotor blade is kept small, due to a reduction in tip vortex losses.

Overall it has been seen that a duct for a rotor blade of the size being used by the Imperial College team could not only offset the weight penalty of having a surrounding structure, but actually improve the net thrust vector in a hovering condition. Experimental work will be needed to validate this conclusion later in the project as well as analyses of different flight phases; namely forward motion and climb.

3.4 Conclusions and Future Work

In Section 1 of the project, we established a requirement for novel ways to protect multirotor MAVs for use in cluttered environments, such as rainforests, indoors, or in close proximity to humans. There is currently a lot of interest in this area due to the potential to vastly increase the range of applications that quadcopters can be used for. The downfalls with existing rotor protection methods are that they incur too great a penalty in the following areas: weight, cost, size, performance and functionality.

By looking at new ways in which we can adapt the structure of a multicopter, we can provide protection and better collision resistance, with a reduced penalty in these critical areas. A novel 1DoF platform was proposed in Section 2, designed to increase the impact properties of a quadcopter in side-on collisions. The rotor guard would be given freedom to rotate independently of the main body of the MAV. It was shown that as a result of this modification, the moment caused by a deflective impact with an external obstacle could be decoupled from the structure, such that the orientation of the quadcopter would not change during such an impact. This would be greatly beneficial for environments in which collisions are likely, especially if the MAV is being piloted using the camera feed.

In Section 3, the implementation of an aerodynamically shaped duct is discussed and estimates for the performance effects of such a rotor casing were calculated. It was found that by using a shrouded rotor, it is possible to offset the weight penalty of having complete circumferential rotor coverage. It was shown that with an optimally designed duct, we can expect up to 50% net thrust increase (taking into account the weight of the duct).

4. Optimising the Geometry of the Duct

Figure 31:
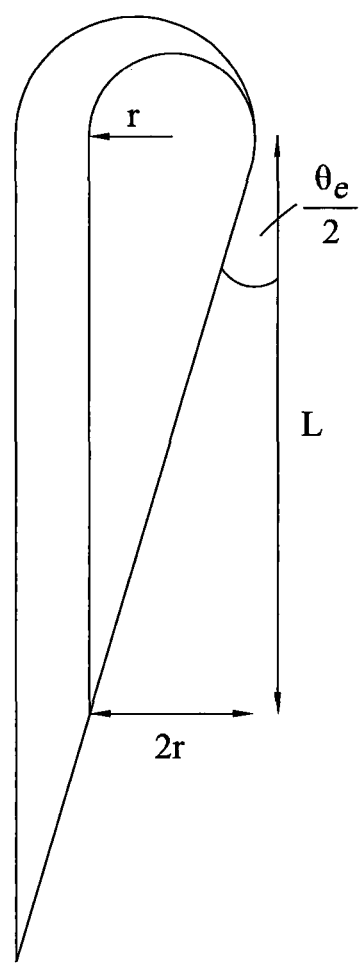
FIG. 31 shows a cross-section of duct, with varying leading edge radius (r)

FIG. 31 shows the geometry of the duct and how it varies with the radius of the leading edge, r.

FIG. 31: Cross-Section of Duct, with Varying Leading Edge Radius (r)

The following code details the analysis used to calculate the optimum size of the duct. The extra thrust produced by increasing the diffuser expansion coefficient $\sigma_e$ is offset by the increase in mass of the structure. The graph in FIG. 30 shows the result of the optimisation code.

reconfigurable UAVs using deployable structures. As a possible and novel deployable structure, we develop origami-based reconfigurable structures to design and fabricate multi-functional structures which can be integrated into conventional UAVs such as multicopters. UAVs with integrated deployable structures are inherently safe and crash robust; they can be used for close inspection of structures, as well as for operations close to humans which would not be possible with conventional multi-rotor platforms. Industrial applications include inspection and repair, conservation and restoration of cultural and architectural heritage with difficult accessibility. We present a novel design concept for multicopters equipped with deployable structures.

The main contributions of this work include:
1) Aerial Device using deploying structures to adaptively damp is impact to the environment. Using Origami based light-weight structures the damping characteristics can be easily adapted to suit various applications.
2) Novel Origami structure that is particularly well suited for this application as it is light weight and scalable to different sizes of vehicles.
3) The deploying structures can be used for both, impact protection and gliding by using it as a parachute system. This combination offers a novel approach to inherent safety for aerial devices.

These contributions can have major impact to Aerial Robot technologies, in particular because the next wave of applications for aerial devices will be close inspection of structures (bridges, pipelines, buildings, artwork) and close interaction with humans.

The emergence of Unmanned Aerial Vehicles (UAVs) offers huge opportunities for peaceful applications in various areas such as visual and structural sensing, e.g. inspection of industrial facilities such as pipelines for leakage, and it allows for inspection of artwork and architectural heritage.

```
%% Inputs
D_r = 0.265              % Diameter of the rotor blade (m)
rho = 600                % Density of the foam used for the duct (kg/m^3)
W_d = 1.5*9.81           % Weight of the quadcopter (N)
%% Optimisation Loop
i = 1
while i < 200
r_div_Dr(i)=i/1000;                                % Normalised leading edge radius
L_div_Dr(i) = 2*r_div_Dr(i)/tand(20);              % Normalised length of duct
area_tri_div_Dr_2(i) = r_div_Dr(i)*L_div_Dr(i);
                                                    % Normalised area of LE section
area_circ_div_Dr_2(i) = pi*r_div_Dr(i)^2;
                                                    % Normalised area of difuser section
mass_div_Dr_4(i) = rho*(area_tri_div_Dr_2(i) + area_circ_div_Dr_2(i))*pi;
                                                    % Normalised Mass
mass = mass_div_Dr_4(i)*D_r^4;                     % Mass of duct (kg)
disk_area = pi*D_r^2/4;                            % Actuator disk area (m^2)
sigma_e(i) = 1 + 4*(r_div_Dr(i))*(D_r/disk_area);
                                                    % Diffuser Expansion Coefficient
T_SR_div_T_OR(i) = (2*sigma_e(i))^1/3;              % Ratio of thrust from SR to OR
delta_T(i) = T_SR_div_T_OR(i) - mass*9.81/W_d;
                                                    % Difference in net thrust between SR and OR (N)
i=i+1;
end
%% Figures
figure
plot(r_div_Dr,delta_T)
```

This work is focussed on the design of deployable structures for Unmanned Aerial Vehicles (UAVs) in order to improve their safety (upon impact with human beings or birds), crashworthiness (upon impact with obstacles), and flight performance and efficiency (allowing for gliding flight in case of motor failure). Inspired by natural folding structures such as insect wings to develop novel concepts for However, current designs are not sufficiently safe and can injure people and animals and they are likely to damage objects on impact; reports on accidents and injuries by drones are common and are stressed as an area where innovation is needed. Perhaps the most famous reported case is the triathlete who was hit on the head by a drone when it crashed to the ground during the Endure Batavia Triathlon in Australia. Furthermore, the robustness, flight endurance and range of UAVs are not in a desirable level with a realistic flight times of only about 10-20 min allowing for only very limited application areas.

While gimbal-based "crash-happy" robots have received attention recently including the $1m "Drones for Good" UAE prize, the technologies are not suitable for applications such as safe and non-destructive inspection of heritage buildings. Novel multi-functional structures are needed to improve the safety, robustness and performance of drones. These structures need to be lightweight, low cost, impact-resistant, mechanically simple and easily tunable. Origami Engineering offers a wide scope of solutions which meet these design requirements. We focus on deployable structures and soft robotic tools, and integrate recently developed technologies into UAVs. The main challenges in the design and development of multi-functional structures for drones can be categorised under the following topics:

1. Geometry: to design optimal fold patterns based on origami or insects wing;
2. Actuation: to develop efficient and reliable actuation mechanisms for the deployment of the folding structure;
3. Materials: to utilise robust and lightweight materials;
4. Integration: to integrate the deployable structure into the UAV;
5. Testing: to use the drones to monitor and inspect heritage buildings.

Origami—the traditional Japanese art of paper folding—is an inspiring subject that mathematicians have studied over the last few decades. Moreover, engineers and designers have applied the rules and the functional properties of origami patterns to their designs, in most cases to reduce the size of structures for storage or transportation purposes. These include a wide range of structures such as deployable shelters and adaptive facades. Perhaps the most well-known origami pattern which has been used in engineering design is the 'Miura-ori'. The pattern was used in the design and simulation of the solar panel arrays for the Japanese space satellites in 1995. Based on the Miura-ori, a novel and extensive family of flat-foldable structures with more complex geometries have been recently designed and we intend to use the recently developed knowledge in this area to address main challenges in the design of UAVs: safety, flight performance, compactness, and costs.

Various researchers have studied natural fold patterns to apply them to the design and development of aerial robots. A number of studies have been conducted on the folding of different insect wings in order to produce folding mechanisms based on them. We will study insect wings to extract origami fold patterns which can be applied to the design of novel UAV concepts. Furthermore, we will study flying squirrels and flying lizards in order to develop and integrate novel gliding membranes into UAVs. A tricopter concept with a deployable gliding membrane is illustrated in FIG. 3.

Figure 32:
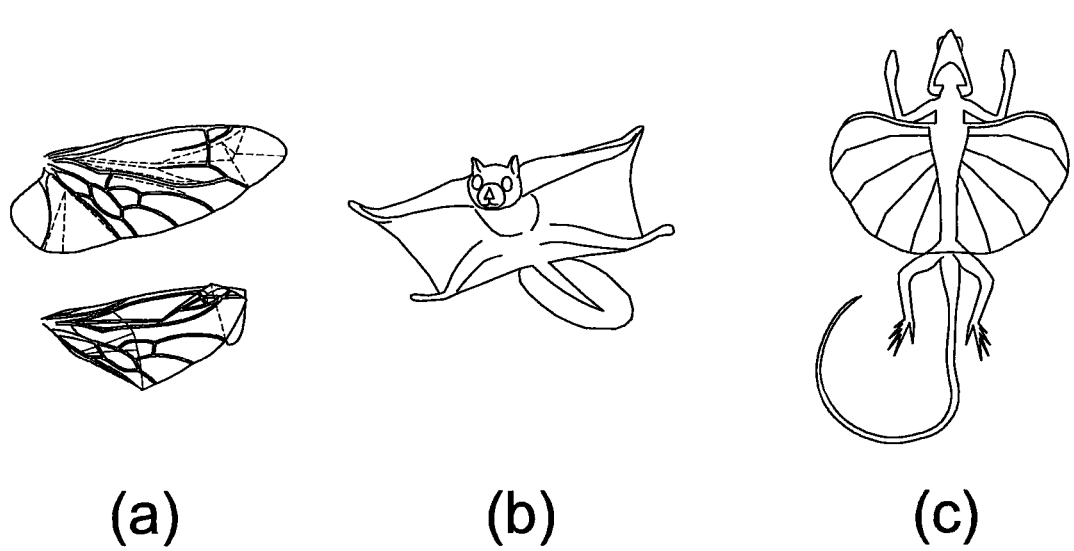
FIG. 32 shows (a) the unfolded and folded hindwing of *Zophobas rugipes*, (b) a Southern flying squirrel, (c) a flying lizard.

FIG. 32 (a) the Unfolded and Folded Hindwing of *Zophobas rugipes*; (b) a Southern Flying Squirrel; (c) a Flying Lizard.

FIG. 3 a Tricopter Concept with a Deployable Gliding Membrane in the (a) Folded and (b) Unfolded Configurations.

We apply the recent advances in Origami Engineering to the mechanical and structural design of aerial robots in order to have safer, more robust and more efficient flying vehicles. Specifically, we intend to integrate the novel family of Miura-based flat-foldable structures (mentioned earlier) into the design of conventional quadcopters. The initial project goals are:

1. To improve the safety of the drone by covering it in a protective shell which will improve the environmental friendliness of the vehicle. For example, design improvements must be made on the current generation of delivery drones (such as commercial product delivery or blood delivery quadcopters) to prevent potential injuries to humans and birds.
2. To improve the control on the collision behaviour of the drone by developing a smart origami-inspired flexible protecting shell for it (see FIG. 1). For example, in a region containing soft obstacles such as curtains or trees, the reconfigurable structure is in a configuration that provides the drone with a protector with a high level of stiffness, whereas in a region containing hard obstacles such as building facades or concrete walls, the reconfigurable structure is in a configuration that provides the drone with a protector with a low level of stiffness (see FIG. 2b).
3. To design a multi-functional reconfigurable shell which can contribute to the aerial locomotion of the drone (such as gliding) in a deployed configuration (FIG. 2c). In particular, multicopter platforms can hover but not fly effectively; origami-based wings can help to increase their flight range and endurance.

FIG. 1: A Miura-Based Reconfigurable Structure in a Partially Folded Configuration Around One of the Propellers of a Typical Quadcopter.

FIG. 2: The Side View of a Fully Protected Quadcopter in: (a) Compact Mode; (b) Impact Protecting Mode; (c) Lift-Generating Mode.

Origami patterns with cyclic or dihedral symmetry can be utilised in the development of deployable structures attached to the frames of the propellers of multicopters. Potential patterns can be Robert Lang's patterns (available on http://www.langorigami.com/) with (or with close to) cyclic symmetry.

FIG. 4: Examples of Robert Lang's Origami Patterns Applicable to the Design of UAVs: (a) Ring8; (b) Ring8; (c) Oval Tessellation.

FIGS. 4d to 4f show the folding simulation of a fragment of Lang's Ring4 origami pattern which can be attached to the propellers of a typical multicopter to improve impact resistance or flight performance.

FIG. 4. (d) a Fragment of Lang's Ring4 Origami Pattern in a Partially Folded Configuration which can be Attached to the Propellers of a Typical Multicopter; (e) the Fold Pattern of the Fragment; (f) the Top-View of the Flat-Folded Fragment.

Wrapping membranes can be used to improve the flight performance or impact resistance of UAVs. FIGS. 4g and 4h show an example for a wrapping membrane which can be wrapped around the propeller frames of multicopters.

FIG. 4: (g)/(h) a Membrane Wrapping Around a Central Hub

We also propose a 1-DOF rotating guard for the propellers of a multicopter, which is a simplification of the idea of using a Gimbal to protect the drone. The rotation of the guard decouples the moments between the guard and the drone which can improve the response of the drone to impacts. Please see the attached report for more information.

Design Concept: Tailored Cyclic Derivatives of the Miura-Ori for Multicopters

A Miura-based cyclic origami pattern tailored to fit into propeller frames of a typical quadcopter is illustrated in FIG. 5. The origami structure around each propeller folds onto the external surface of the cylindrical frame. The origami structures may be deployed partially for impact protection or shock absorption purposes, or may be fully unfolded to provide appropriate surfaces for gliding.

FIG. 5: Top View of a Typical Quadcopter Equipped with a Tailored Cyclic Derivative of the Miura-Ori It is possible to design folding structures with desired stiffness levels by perforating or scoring the polylines of the fold pattern appropriately. An example depicted in FIG. 6.

FIG. 6: An Origami Shield with Two Different Types of Perforation/Scoring

```
clear all
close all
% Friction Force Estimation – wall in x plane
U_Velocity = 4;           % m/s
mass_quad = 1.5;          % weight of quad in kg
impact_time = 0.1;        % impact time in seconds
length_arm = 0.35;
angle_arm = 45;           % Angle between the arm and the plane of
symmetry
outer_diameter_guard = 0.8*length_arm;
%% Values for whole coverage analysis
diamter_rotor = 0.27;
radius_outer_large = 1.05*(length_arm + diamter_rotor/2);
%% Inputs for mu range
sampling_points_mu = 50;
bottom_range_mu = 0.5;
top_range_mu = 1.5;
%% Code
for k = 1:sampling_points_mu:
   if sampling_points_mu == 1
      step = (top_range_mu)/(sampling_points_mu);
   else
      step = (top_range_mu-bottom_range_mu)/(sampling_points_mu-
1);
   end
   coeff_static_friction(1,k) = bottom_range_mu + (k-1)*step;
   formatSpec = 'Fixed (mu = %0.2f)';
   A1 = coeff_static_friction(1,k);
   lenged_entry{1,k} = sprintf(formatSpec,A1);
for i = 1:91
beta_rad(i,1) = (i-1)*pi/180;
beta_deg(i,1) = (i-1);
u_Velocity(i,1) = U_Velocity*cosd(beta_deg(i,1));            %   x
velocity in m/s
v_Velocity(i,1) = U_Velocity*sind(beta_deg(i,1));            %   y
velocity in m/s
Normal_Force(i,1)    =    mass_quad*(2*v_Velocity(i,1))/impact_time;
% Assumptions: only y velocity is affected and collision is
elastic
Moment_Arm_Normal_Force(i,1)                                 =
length_arm*sind(angle_arm)*sind(beta_deg(i,1))-
length_arm*cosd(angle_arm)*cosd(beta_deg(i,1)));
Moment_ Normal_Force(i,1)                                    =
Moment_Arm_Normal_Force(i,1)*Normal_Force(i,1);
Frictional_Force(i,k)                                        =
coeff_static_friction(1,k_*Normal_Force(i,1);
Moment_Arm_Frictional_Force(i,1)                             =
cosd(beta_deg(i,1))*(length_arm*sind(angle_arm)+(outer_diameter_gu
ard/2)*cosd(beta_deg(i,1)))+sind(beta_deg(i,1))*(length_arm*cosd(a
ngle_arm)+(outer_diameter_guard/2)*sind(beta_deg(i,1)));
Moment_ Frictional_Force(i,k)                                =
Frictional_Force(i,k)*Moment_Arm_Frictional_Force(i,1);
Degrading_Frictional_Force(i,k)                              =
coeff_static_friction(1,k)*Normal_Force(i,1)*cosd(beta_deg(i,1));
Degrading_Frictional_Moment(i,k)                             =
Degrading_Frictional_Force(i, k)*Moment_Arm_Frictional_Force(i,1);
Degrading_Moment_Frictional_Large(i,k)                       =
Degrading_Frictional_Force(i,k)*radius_outer_large;
Net_Moment(i,k)          =         Moment_Normal_Force(i,1)    +
Moment_ Frictional_Force(i,k);
Net_Moment_Degraded(i,k)    =      Moment_Normal_Force(i,1)    +
Degrading_Frictional_Moment(i,k);
Resultant_Force(i,k)     =         (Normal_Force(i,1)^2        +
Degrading_Frictional_Force(i,k)^2)^0.5;
max_resultant_force = max(Resultant_Force);
Fixed_Moment(i,k) = absNet_Moment_Degraded(i,k));
DoF_Moment(i,k) = abs(Moment_Normal_Force(i,1));
Large_Moment(i,k) = abs(Degrading_Moment_Frictional_Large(i,k));
end
for j = 1:91
Normalised_Fixed_Moment(j,k)                                 =
Fixed_Moment(j,k)/Fixed_Moment(i,k);
Normalised_DoF_Moment(j,k) = DoF_Moment(j,1)/DoF_Moment(i,1);
Normalised_Large_Moment(j,k)                                 =
Large_Moment(j,k)/Fixed_Moment(i,k);
Percentage_difference(j,k)      =      (Normalised_Fixed_Moment(j,k)-
Normalised_DoF_Moment(j,1))*100;
end
max_perc_diff(k) = max(Percentage_difference(:,k));
min_perc_diff(k) = min(Percentage_difference(:,k));
end
```

```
lenged_entry{1,k+1} = '1DoF';
coeff_sf_min                                                      =
length_arm*cosd(angle_arm)/(length_arm*sind(angle_arm)+outer_diame
ter_guard/2);
% prompt = 'What Static Friction Coefficient would you like to see
a moment plot for? ';
% mu = input(prompt);
% n = mu*100-49;
%% Moment Breakdown Figure
figure
plot(beta_deg,Degrading_Frictional_Moment,beta_deg,Net_Moment_Degr
aded,beta_deg,Moment_Normal_Force)
legend('Frictional','Net','Normal')
xlabel('Angle of quadcopter from the plane of collision, \beta
(degrees)') % x-axis label
ylabel('Moment experienced by the quadcopter (Nm)') % y-axis label
%% Normalised Moment Figure
figure
plot(beta_deg,Normalised_Fixed_Moment,beta_deg,Normalised_DoF_Mome
nt)
legend(lenged_entry)
xlabel('\beta (degrees)') % x-axis label
ylabel('$\frac{M}{M_{N}}$','interpreter','latex','Fontsize',12,'Ro
tation',0,'HorizontalAlignment','right') % y-axis label
%% Normalised Moment Figure (For Report)
figure
plot(beta_deg,Normalised_Fixed_Moment,':k',beta_deg,Normalised_DoF
_Moment,'k')
legend('Fixed (\mu = 0.5)','Fixed (\mu = 0.75)','Fixed (\mu       =
1)','1DoF')
xlabel('\beta (degrees)') % x-axis label
ylabel('$\frac{M}{M_{N}}$','interpreter','latex','Fontsize',12,'Ro
tation',0,'HorizontalAlignment','right') % y-axis label
%% Fixed Moment Surface
figure
surf(Normalised_Fixed_Moment);
%hold on
%surf(Normalised_DoF_Moment,'EdgeColor','blue',       'FaceColor',
'blue');
set(gca,'XTickLabel', [0.5 0.7 0.9 1.1 1.3 1.5])
set(gca,'YTick', [0 30 60 90])
%zlim([0 1.7])
ylim([0 90])
xlabel('\mu')
ylabel('\beta (degrees)')
zlabel('$\frac{M}{M_{N}}$','interpreter','latex','Fontsize',12,'Ro
tation',0,'HorizontalAlignment','right')
%% 1DoF Moment Surface
figure
surf(Normalised_DoF_Moment);
set(gca,'XTickLabel', [0.5 0.7 0.9 1.1 1.3 1.5])
set(gca,'YTick', [0 30 60 90])
ylim([0 90])
zlim([-0.5 2])
xlabel('\mu')
ylabel('\beta (degrees)')
zlabel('$\frac{M}{M_{N}}$','interpreter','latex','Fontsize',12,'Ro
tation',0,'HorizontalAlignment','right')
%% Figure including large
figure
plot(beta_deg,Normalised_DoF_Moment,'k',beta_deg,Normalised_Large_
Moment,'--k')
legend('1DoF', 'Large (\mu = 0.5)','Large (\mu = 0.75)','Large
(\mu = 1)')
xlabel('\beta (degrees)') % x-axis label
ylabel('$\frac{M}{M_{N}}$','interpreter','latex','Fontsize',12,'Ro
tation',0,'HorizontalAlignment','right') % y-axis label
%% large Moment Surface
figure
surf(Normalised_Large_Moment);
set(gca,'XTickLabel', [0.5 0.7 0.9 1.1 1.3 1.5])
set(gca,'YTick', [0 30 60 90])
ylim([0 90])
%zlim([-0.5 2])
xlabel('\mu')
ylabel('\beta (degrees)')
zlabel('$\frac{M}{M_{N}}$','interpreter','latex','Fontsize',12,'Ro
tation',0,'HorizontalAlignment','right')
```

We propose free-to-spin circular bumpers for multicopter UAVs which are able to decouple the moment due to friction force (or the component of friction force parallel to the UAV plane) from the UAV's platform. We also propose origami bumpers with cyclic symmetry capable of reducing the peak normal force experienced by the UAV, or capable of absorbing some kinetic energy of the impact by the plastic deformation of the origami structure as the 'Crumple Zone' of the vehicle. The origami structure can also improve the crashworthiness of the vehicle by decreasing the impact force onto the ground—through providing a relatively large gliding surface—when the propulsion or control systems fail. Furthermore, it can improve the aerodynamic performance of the UAV by increasing the lift to drag ratio through reducing the intensity of vortices as a result of its corrugated surface. Moreover, the softness of the origami structure will make the UAV safer when it flies around people and animals or in an area with delicate and vulnerable obstacles. The structure could also be actuated to modulate the impact properties or the gliding behaviour.

The 'spinning' and 'origami' protectors, used on their own or in combination, can enhance the impact protection, safety and aerodynamic performance of UAVs.

Modelling and Design

1. Free-to-Spin Protector

With the assumption that most impacts occur in the hovering plane of the UAV, a passively spinning (using a rolling bearing at the centre) protector enables us to decouple the moment due to friction force (or the component of friction force parallel to the UAV plane) from the UAV's platform (see FIG. 26). In comparison to a Gimball, this structure is considerably simpler, lighter, cheaper and more compact, and can be integrated into existing flying platforms.

FIG. 26. Passively Spinning Collective (Protecting all Propellers) Protector Mounted on a Quadcopter.

The advantage of a collective (protecting all propellers) guard over four individual guards for a multicopter is that in the case of a collective guard the normal force, $F_y$, does not produce any yawing moment around the centre of mass of the multicopter (assuming the multicopter is symmetric around its centre of mass). In contrast, in the case of spinning individual rotor protectors, as illustrated in FIG. 25, the normal component of the impact force, $F_y$, generates a yawing moment $M_{Fy}$ around the centre of mass of the vehicle. This yawing moment can lead to significant disturbances in the trajectory of the UAV.

FIG. 25. Passively Spinning Individual Rotor Protectors Mounted on a Quadcopter. The Normal Component of the Impact Force Generates a Moment MFy Around the Centre of Mass of the Vehicle.

2. Origami Bumper, Gliding Surface and Aerodynamic Performance Enhancer

We propose an origami bumper with cyclic symmetry which is capable of reducing the peak normal force experienced by the UAV. It is a cyclic variation of the Miura-ori. The cyclic variation depicted in FIG. 23 is customised for minimal radial size while keeping the maximum number of circumferential fold lines. The reduction of the internal radius upon complete folding is less than 6% for this design. FIG. 24 shows the folding simulation of this fold pattern. Other origami patterns such as variations of Yoshimura pattern can be used as the origami bumper, as well as patterns with dihedral symmetry. Also other types of deployable or morphing structures can be used for this purpose.

This bumper can be fabricated with different levels of stiffness for different applications, giving us a range of softness levels appropriate for various missions and environments. For example, for flying around people and animals or in an area with delicate and vulnerable obstacles such as artwork, industrial facilities or historical structures, the origami structure must be scored or perforated to provide us with a soft structure safe to fly around people, animals and objects.

FIG. 23. A Cyclic Origami Bumper

FIG. 24. The Folding Process of the Miura-Based Cyclic Origami Ring Shown in the Previous Figure In addition to impact protection, the origami deployable structure can be used as a gliding surface for increasing the lift. Specifically, in the case of motor/propeller failure, the origami surface can act as a parachute to decrease the impact velocity onto the ground which can save the UAV by reducing the crash severity. Furthermore, the corrugated surface of the origami structure can reduce the intensity of vortices which increase the lift to drag ratio, providing us with enhanced flight performance.

3. Spinning Cyclic Origami Bumper (SCOB)

The Spinning Cyclic Origami Bumper (SCOB), illustrated in FIG. 13, is the combination of the ideas in Sections 1 and 2, providing us with a protector capable of decoupling the friction force from the platform, as well as reducing the peak normal force experienced by the platform (in the case of plastic deformation of the origami structure, increasing the dissipation of kinetic energy). We call this version of SCOB the 'Single Bearing' SCOB, as the spinning freedom is provided by a single rolling bearing. In section 4 we will introduce an alternative design configuration for a spinning protector, called the 'Multiple Bearing' spinning protector, which contains multiple rolling bearings.

FIG. 13. Spinning Cyclic Origami Bumper (SCOB) which Consists of a Passively Spinning Collective (Protecting all Propellers) Guard with a Cyclic Origami Bumper/Gliding Surface Mounted on a Quadcopter.

FIG. 17(a) depicts a conceptual design of a quadcopter with a manipulator arm equipped with SCOB for the safe and non-destructive inspection/repair work of pipelines in a high altitude. The manipulator arm may be replaced with another one suitable for the inspection/repair of artwork (such as huge murals or artwork in a high altitude) or for the manipulation of surfaces.

FIG. 17(a). Conceptual Design of a Quadcopter with SCOB (Example Application in the Inspection/Repair Work of Pipelines in a High Altitude).

FIG. 17(b). Manipulator Arm Suitable for the Inspection/Repair of Artwork

FIG. 14(a) shows different parts of SCOB before assembly. FIG. 15 and FIG. 16 depict the CAD models for the circular frame and the connector, respectively. FIG. 14(b) shows a quadcopter equipped with SCOB. The origami structure is made from polypropylene and contains five stacking layers in the radial direction.

FIG. 14(a). Different Parts of a Spinning Cyclic Origami Bumper (SCOB)

FIG. 15. Circular Frame with Landing Struts (a) 3D View; (b) Side View; (c) Top View.

FIG. 16. Connector (Platform to Frame) (a) 3D View; (b) Side View; (c) Top View; (d) Bottom View.

FIG. 14(b). A Quadcopter (Crazyflie 2.0) Equipped with a Spinning Cyclic Origami Bumper (SCOB)

4. Multiple Bearing Design Configuration

We suggest an alternative design configuration for the spinning protector as depicted in FIG. 18. This protector consists of two cylindrical or torus shells—the inner shell and the outer shell. The inner shell is static relative to the vehicle platform, but the outer shell can rotate over the inner shell using the 'rolling bearings' between the two shells. This protector is called a 'Multiple Bearing' spinning protector, as the spinning freedom is provided by multiple rolling bearings. FIG. 19 shows a multiple bearing version of SCOB. Depending on the mission requirement the outer shell could be made of various materials, such as soft materials, flexible or inflatable structures and/or be omitted completely.

FIG. 18. 'Multiple Bearing' Passively Spinning Protector Mounted on a Quadcopter FIG. 19. 'Multiple Bearing' Spinning Cyclic Origami Bumper (SCOB) which Consists of a Passively Spinning Protector with a Cyclic Origami Bumper/Gliding Surface, Mounted on a Quadcopter.

5. Modular Bumpers

In addition to full-circumference origami bumpers, we propose 'Modular' protectors which can decrease the structural mass of the vehicle significantly. These protectors can be designed for different shapes of protecting frames. Two Miura-based modular bumpers for circular and squircular frames are shown in FIG. 21 and FIG. 22, respectively. The bumper modules can be of different types such as conventional metal springs, glass fiber springs, buckling rods or other deployable structures.

FIG. 21. Miura-Based Modular Origami Bumpers for a Circular Frame which can be Fixed or Spinning FIG. 22. Modular Origami Bumpers for a Squircular Protecting Frame of a Typical Quadcopter The advantage of a collective (protecting all propellers) guard over four individual guards for a multicopter is that in the case of a collective guard the normal force, $F_y$, does not produce any yawing moment around the centre of mass of the multicopter (assuming the multicopter is symmetric around its centre of mass). In contrast, in the case of spinning individual rotor protectors, as illustrated in FIG. 25, the normal component of the impact force, $F_y$, generates a yawing moment $M_{F_y}$ around the centre of mass of the vehicle. This yawing moment can lead to significant disturbances in the trajectory of the UAV.

The proposed origami bumpers, which are light weight and cheap, are capable of reducing the peak normal force experienced by the UAV, or capable of absorbing some kinetic energy of the impact by the plastic deformation of the origami structure as the 'Crumple Zone' of the vehicle. The origami structure can also improve the crashworthiness of the vehicle by decreasing the impact force onto the ground—through providing a relatively large gliding surface—when the propulsion or control systems fail. This bumper can be fabricated with different levels of stiffness for different applications, giving us a range of softness levels appropriate for various missions and environments. Furthermore, it can improve the aerodynamic performance of the UAV by increasing the lift to drag ratio through reducing the intensity of vortices as a result of its corrugated surface. Moreover, the softness of the origami structure will make the UAV safer when it flies around people and animals or in an area with delicate and vulnerable obstacles (e.g. operations around artwork in heritage protection and restoration and around fragile industrial facilities and infrastructure).

Novel Methods for Enhanced MAV Crash Robustness

This report outlines the requirement for, and theory behind, novel methods of protection for multirotor Miniature Unmanned Aerial Vehicles (MAVs). The aim was to achieve better crash-robustness, but with less of an impact on the weight, cost, performance and functionality of the robot. Rotor guards with freedom to rotate horizontally around each rotor blade were designed and manufactured. By giving the system this degree of freedom, the moments imposed on the MAV frame in impact were decoupled from the moments on the rotor guard, thus reducing the MAVs yaw response to deflective impacts. Also discussed in the report is the effectiveness of surrounding each rotor blade with an aerodynamically shaped duct. A ducted rotor guard was manufactured and tested using a load cell to ascertain the effect of the duct on the thrust produced by the rotor. It was found that the ducted rotor produced between 5-10% more thrust than the open rotor, however this increase did not completely offset the weight penalty of the rotor guard, as was suggested by the theory. Finally the use of the rotor guards as a buoyancy device was discussed and a mechanism proposed to allow the MAV to land and take-off of water.

Nomenclature

Chapter 2

| | |
|---|---|
| $\alpha$ | angle between the arm of the MAV and the velocity vector |
| $\beta$ | angle between plane of contact and incident velocity vector of a MAV in impact |
| $\mu_S$ | static coefficient of friction |
| $F_R$ | resultant force on MAV in collision |
| $F_S$ | frictional force on MAV in collision |
| $D_G$ | diameter of the rotor guard |
| $D_R$ | diameter of the rotor blade |
| $L_A$ | length between the centre of gravity of the MAV and the centre of rotation of the rotor guard |
| $M_F$ | moment experienced by MAV frame in collision |
| $M_G$ | moment experienced by rotor guard in collision |
| $M_{1DoF}$ | moment experienced by rotor frame in collision with a 1DoF rotor guard |
| $M_N$ | moment induced on MAV by completely normal contact between rotor guard and object |
| $m_q$ | mass of the MAV |
| $N$ | normal force on MAV in collision |
| $r_G$ | radius of the outer surface of the protective structure |
| $\Delta t$ | impact time |
| $U$ | incident velocity of MAV in a collision |
| $\Delta U$ | change in velocity of MAV in a collision |

Chapter 3

| | |
|---|---|
| $\rho$ | air density |
| $\rho_m$ | density of material used for duct |
| $\sigma_e$ | diffuser expansion coefficient |
| $\theta_e$ | angle between diffuser wall and rotor central axis |
| $A$ | area of the duct |
| $D_r$ | rotor diameter |
| $KE$ | kinetic energy |
| $L$ | diffuser height |
| $\dot{m}$ | mass flow rate |
| $p$ | air pressure |
| $\Delta p$ | pressure difference across the rotor |
| $P_i$ | ideal power |
| $r$ | duct leading edge radius |
| $T$ | rotor thrust |
| $v$ | air velocity |
| $W_d$ | weight of the duct |
| $W_q$ | weight of the MAV |

Chapter 3 Supscripts

| | |
|---|---|
| OR | Open Rotor |
| SR | Shrouded Rotor |

Chapter 1

Introduction

1.1 Background to the Project

In recent years, multirotor Micro Aerial Vehicles (MAVs) have become an area of great interest within the research & development, commercial and hobbyist sectors. The Vertical Take-off and Landing (VTOL) and hover capabilities of this type of aircraft make it suitable for a wide range of applications, from search and rescue right through to delivery and environmental research (see 1.1).

Currently, this type of rotorcraft relies heavily on see and avoid techniques to prevent impacts with human beings, animals, and its environment. However some applications place these MAVs in close-quarter environments in which there are too many obstacles to rely on sight or sensing alone to prevent collisions. It is in these situations that there is a requirement for the implementation of extra measures to prevent damage to the environment and damage to the rotorcraft itself upon impact.

The primary hazard caused by this type of MAV is impacts involving the rotor blades. The speed at which the rotor blades rotate and the sharp nature of their geometries has been the cause of injuries to humans and damage to property on several occasions since 2013. Current attempts to reduce this hazard, by enclosing the rotor blades in a protective casing, have resulted in a decrease in performance of the MAV (endurance, range, payload capability etc.) and have therefore not experienced wide scale uptake.

The aim of this project is to assess the capabilities of current rotor protection schemes and to ultimately develop a novel way to increase the crash robustness of multirotor MAVs, whilst reducing the performance penalty caused by the protection scheme.

Figure 33:
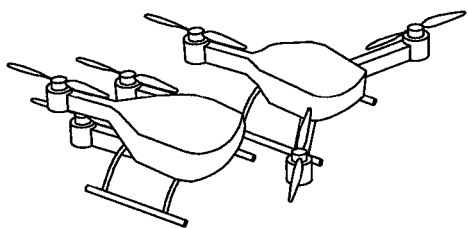
FIG. 33 shows different applications and configurations of multirotor Miniature Unmanned Aerial Vehicles (MAVs)
Figure 33:
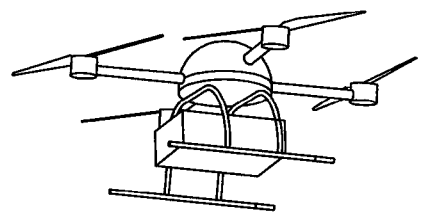
Figure 33:
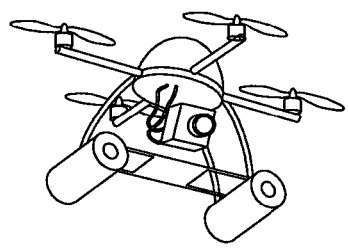
Figure 33:
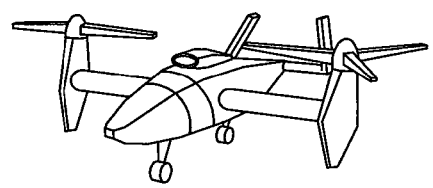
Figure 34:
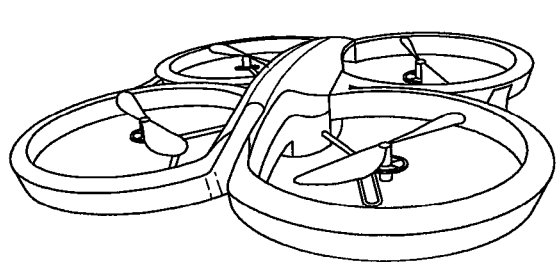
FIG. 34 shows rotor protection schemes.
Figure 34:
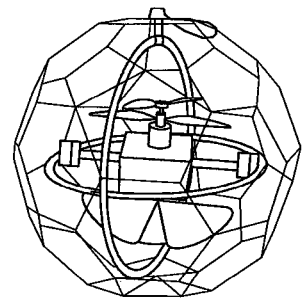

Figure 33 : Different applications and configurations of multirotor MAVs: Ambulance Drone, Delivery Drone, Research Drone, Search and Rescue Drone

1.1.1 Drones for Ecological Research

Imperial College London Aerial Robotics Lab is currently taking part in a project to utilise quadcopters to collect sensitive information from otherwise inaccessible regions of the rainforest.

The rainforest is an extremely cluttered and hostile environment (rain, heat, low light, trees etc.) and many of the machines used for data collection and research elsewhere in the world are not suitable there. Quadcopters could provide a versatile platform for ecological research in rainforests as they are small, agile and can navigate around difficult obstacles. However it is challenging to enable a quadcopter to operate in such an environment due to the sensitive nature of their rotor blades and the equipment they carry. Avoiding all collisions in the rainforest is impossible, therefore a quadcopter designed for this environment has to be crash robust. The requirements for a quadcopter designed for flying in a rainforest will be similar to those required for a cluttered urban or indoor environment as well.

The primary focus of this project is therefore to design a rotor protection system for the quadcopter being developed by the team, but the methods and techniques used should also be adaptable and scalable to different quadcopters and different applications in the future.

Rotor protection schemes can be broken down into two broad categories: static and mechanical ).

(a) Static Rotor Protection (Parrot Drone)    (b) Mechanical Rotor Protection (GimBall)

Figure 34

Static Rotor Protection  The simplest method of rotor protection is obtained by creating an immobile barrier between the rotors and the regions of potential contact with external obstacles. There is currently a wide range of static rotor protection systems available with varying cost, weight, strength and impact qualities. The advantages of this type of structure are that they are simple to design, cheap to manufacture and usually lightweight in comparison to their mechanical counterparts. The downside is that they are not capable of reacting to impacts and therefore have no way of damping the force and moments imposed on the MAV during a collision, which can become a problem, especially when impacts are frequent.

Mechanical Rotor Protection  More recently, engineers have begun to look into ways of enhancing the collision resilience of multirotor MAVs. An extremely effective way of doing so is by decoupling the protective outer frame from the main body of the MAV ). This changes the way that impacts with external obstacles affect the force and moment resultant on the MAV. This system approaches the problem in a novel and interesting way, however there are several issues with this design which could be improved upon:

- There is a significant amount of unused space around the MAV, making it larger and less agile. The resulting structure is therefore also heavier than necessary.

[Note: if a quadcopter is used instead of a tail-sitting twin-rotor then the structure will be much larger]

- The camera and other sensors are likely to be obscured by the cage.

- The structure cannot hold and deliver a payload (e.g. sensor or package) as it would not easily be able to be released from inside the cage.

- The extra material around the quadcopter will also affect the flow through the rotor blades and therefore reduce endurance, range and payload carrying capabilities.

1.3 Objectives and Requirements for the Project

By identifying the areas of sub-optimal design in current MAV rotor protection systems, we can decide the criteria on which to base the designs in this project. The five key areas to consider in the design of the protection system are:

1. Protection - The primary function of the structure will be to protect the MAV from damage and prevent damage to external objects in collisions. The degree to which the structure achieves this will be a direct indicator of the effectiveness of the design.

2. Weight - Minimising weight is crucial in the design of MAVs. A weight saving over conventional rotor protection schemes will increase all the parameters used to measure performance. Alternatively a reduced structural weight will allow for an increased payload weight in applications such as drone delivery.

3. Performance - A main driver in the design will be to preserve the performance of the MAV. Possible parameters used to measure the performance of the aircraft involve range, endurance and top-speed of the MAV.

4. Functionality - Due to the diversity of MAV designs and applications, the structure designed should be able to be integrated into an MAV design with minimal or no loss of functionality to that MAV. The product should be scalable and adaptable and able to be retrofitted to existing MAVs if possible.

5. Cost - The cost of the structure has to be minimised. This will include the cost of the materials used, the cost of processing the materials, the cost of the electronics in the mechanism (if applicable) and the cost of assembling it into a structure and fitting it to the MAV.

Figure 35:
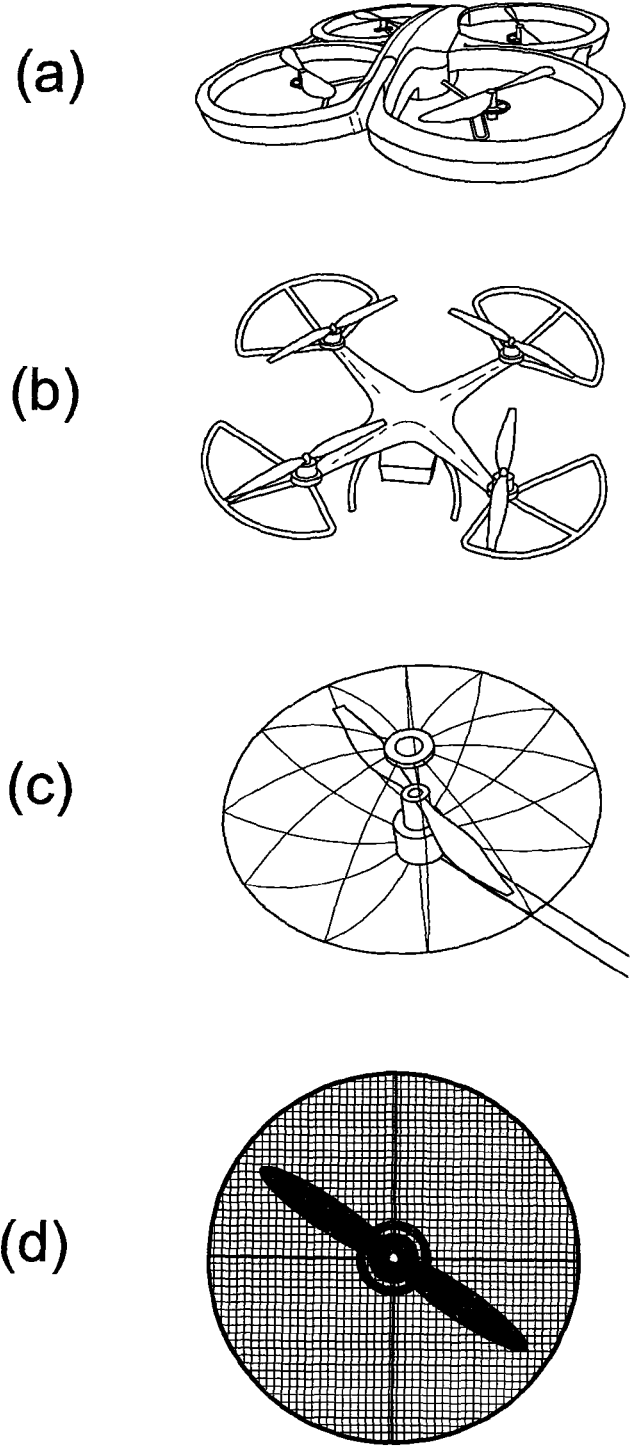
FIG. 35 shows static rotor protection schemes.

| Rotor Protection Device | Image | Comments |
| --- | --- | --- |
| Foam Rotor Guards | Figure 35(a) | Several quadcopters, especially those designed for indoor use, utilise lightweight foams to provide protection from horizontal impacts. The strength, elasticity and weight of this type of design varies depending on the type of foam used. |
| Rigid Propeller Guards | Figure 35(b) | Usually comprised of four separate rigid plastic or carbon fibre sections mounted under each rotor. Each rotor is protected by horizontally by a rigid guard. The weight and strength of the design will also vary with the material selected and thickness of the section. The guard provides little to no protection from impacts from above. |
| Full Blade Propeller Guard | Figure 35(c) | Full rotor coverage with carbon fibre or plastic rods. Minimal protection from narrow objects such as branches. Rotor flow obstructed both above and below. Usually heavier than the above solutions. |
| Mesh Covered Propeller Guards | Figure 35(d) | Some designs utilise mesh structures above and/or below the rotor blade. The mesh provides a level of protection from impacts from above and below, but again its structural properties and weight will vary with material selection. As well as a weight penalty, the mesh will also cause some blockage effects - i.e. the structure will affect the flow through the rotor causing a reduction in thrust. The trade-off of this design is therefore between full blade coverage and overall net thrust produced by the rotor. |

TABLE 1.1: Static Rotor Protection Schemes

Figure 36:
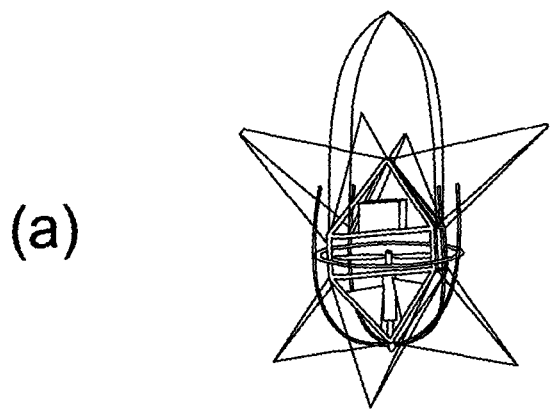
FIG. 36 shows mechanical rotor protection schemes.
Figure 36:
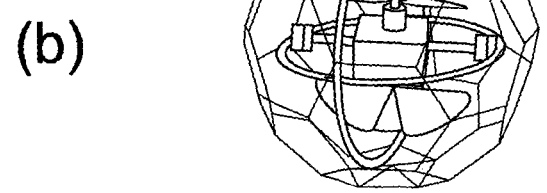
Figure 36:
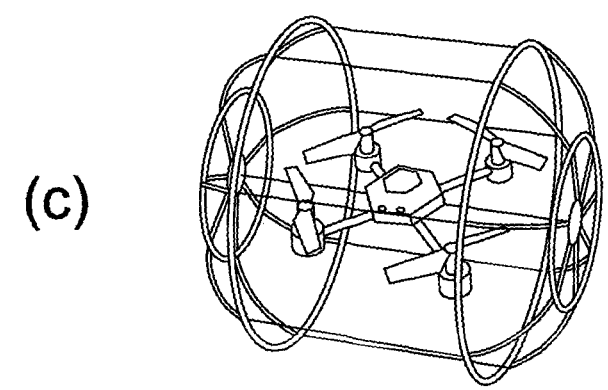

| Rotor Protection Device | Image | Comments |
|---|---|---|
| AirBurr Self-recovering Mechanism | Figure 36(a) | This mechanical frame encompasses the entire MAV. In this case a tail-sitting twinrotor is used to reduce the size of the overall system. The self-recovering or mechanism comprises of four arms attached to servos that return the platform to an upright state in the eventuality of it toppling over. The result of surrounding the whole structure is a heavy frame with potentially significant blockage effects. |
| GimBall | Figure 36(b) | GimBall is another full coverage guard with the added advantage that it uses the mechanics of its structural protection to its advantage. By allowing the outer 'shell' to rotate independently from the tail sitting twinrotor MAV inside, the GimBall decouples the moments on the guard from the moments experienced by the MAV. The resulting full MAV coverage again incurs a significant weight penalty, which is drastically increased if a quadcopter is used. |
| Rolling Quadcopter Frame | Figure 36(c) | Some MAVs, such as the SkyWalker and Parrot Rolling Spider utilise cages that have the ability to roll along the ground and up walls. This additional feature can be used to conserve energy as the amount of thrust the MAV requires to roll along the ground will be less than that required for forward flight. |

TABLE 1.2: Mechanical Rotor Protection Schemes

1.4 Configurations used in Rotor Protection

The first major assumption that we will make that will impact upon the design of our rotor protection scheme will be the following: *The majority of collisions occur in the horizontal plane*

By means of making this assumption, we can focus our protection scheme primarily at the rotor plane, thus saving the extra volume of material needed to protect from above and below the rotors. There are several cases in which this assumption may not be valid. For example if the quadcopter is in close proximity to humans or animals on a frequent basis, then some level of protection may be required above and below to prevent injury. However additive structures, such as a mesh, could be considered for these applications.

Figure 37:
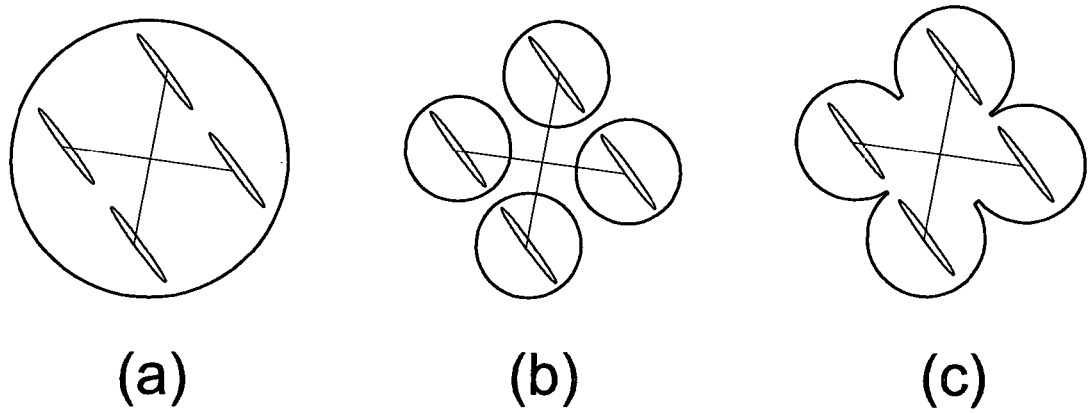
FIG. 37 illustrates types of rotor protection.

Reducing the problem then to protection in the plane of the rotor, there are several configurations to choose from, see Fig. 37.

(a) Whole MAV protection  (b) Individual rotor protection  (c) Hybrid protection Figure 37 : Types of rotor protection

Whole MAV Protection - In impacts with external objects, the normal force acts towards the centre of the MAV, thus does not cause the MAV to yaw. However the large outer structure will most likely be heavy and require strong supports to withstand the bending moments in collisions. The outer structure will also have a large moment of inertia which will amplify yaw perturbations.

Individual Rotor Protection - More scalable and adaptable to different size quadcopters as attachment methods will be simpler. Most likely lighter than whole MAV protection. Easily reduces to smaller components for transportation.

Hybrid Protection - Less adaptable as it depends strongly on the geometry of the individual quadcopter. Could be easier to add and remove from the quadcopter. Less attachment points required than individual rotor coverage.

Chapter 2

1DoF Rotor Protection

2.1 Introduction

The drawbacks of a fully enclosed protection system were discussed in Section 1.2. The primary disadvantage with this configuration is that surrounding the entire MAV increases weight, structural complexity and cost whilst also reducing performance and functionality. It was therefore necessary to look into different ways of protecting the rotor blades in order to improve these characteristics. As the entire MAV does not need to be surrounded, as discussed in 1.4, it was decided that the design would use a configuration that protects each rotor individually as it is the most adaptable and scalable to different types of MAVs and lighter than whole MAV coverage (see 2.13).

The analysis in the following chapter compares the collision properties of a static rotor guard to a novel single degree of freedom (DoF) rotor guard design. The 1DoF system proposed would have a freedom of rotation around each rotor blade, as shown in Fig. 8  With the assumption that the vast majority of collisions occur from the side of the MAV, enabling a decoupling of moments between the rotor guard and the MAV frame in the horizontal plane should improve the impact response of the system to these side-on collisions.

Figure 8  : CAD model showing a 1DoF rotation rotor guard

2.2 Mechanics of Collisions

By making some assumptions about the collision between the MAV and an object, we can develop a simplified model to estimate the moment reduction achieved by allowing the rotor guard to rotate freely in the horizontal axis. The simplifying assumptions are as follows:

- The object (tree, wall etc.) is completely rigid and it does not yield at all in impact.

- The collision is elastic and the MAV rebounds with an equal and opposite normal velocity.

- The collision is assumed to occur at a single point, through which the normal force acts.

- The rotor guards are assumed to be perfectly cylindrical, thus the normal force acts through the centre of the rotor guard.

Figure 38:
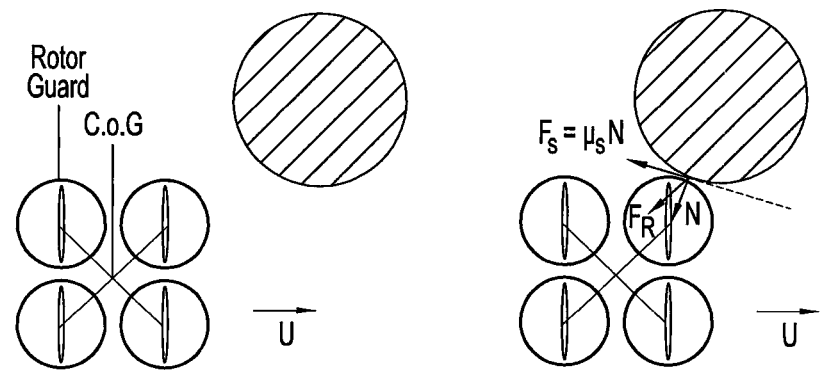
FIG. 38 shows a simplified model of an MAV in impact.

A simplified model of a collision between the MAV and a hard external object can be seen in Figure 38. Here a quadcopter, with initial speed, U, comes into contact with the tree in the right hand side of the figure. The forces that arise at the interface between the MAV's cylindrical rotor guard and the surface of the tree are the normal force, N, which acts through the centre of the rotor guard and the frictional force, $F_S$, which acts tangentially to the object and the rotor guard at the point of the collision. The resultant of these two forces is denoted as $F_r$ in the figure.

Figure 38 : Simplified model of an MAV in impact

Figure 39:
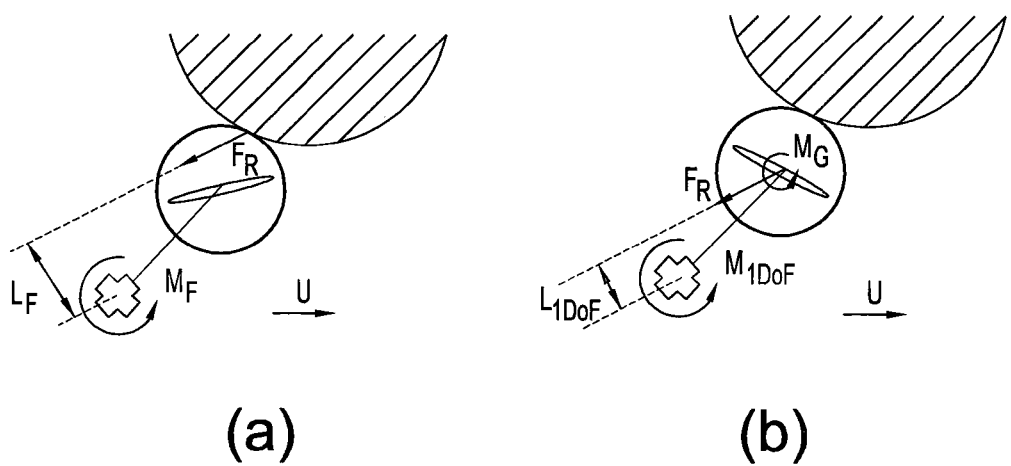
FIG. 39 shows a force and moment response of a fixed and a 1DoF MAV to a side-on collision.

With a fixed rotor guard, the moment caused by the friction force, $F_S$, and the normal force, N, both contribute to a yaw inducing moment around the centre of the MAV, (a) Fixed rotor guard (b) 1DoF rotor guard Figure 39 : Force and Moment response of a fixed and a 1DoF MAV to a side-on collision $M_F$, as can be seen in Figure 39(a). If we allow the rotor guard to rotate freely from the MAV frame, no moment can be transmitted through the guard connector to the frame. The resulting moment on the MAV frame is reduced:

$$M_{1DoF} = M_F - M_G \qquad (2.1)$$

A large yawing motion of the MAV is undesirable for several reasons: If the MAV is being piloted remotely, by use of an on-board camera, the camera disturbance caused by a large yawing motion may cause the pilot to lose control of the rotorcraft. Furthermore, a large yawing motion may cause additional impact points between the MAV and the object, further destabilising the rotorcraft.

2.2.1 Inputs to the Simplified Collision Model

Using the simplified model above, we can estimate the impact of introducing a rotational degree of freedom on the magnitude of the moment experienced by the MAV.

Figure 40:
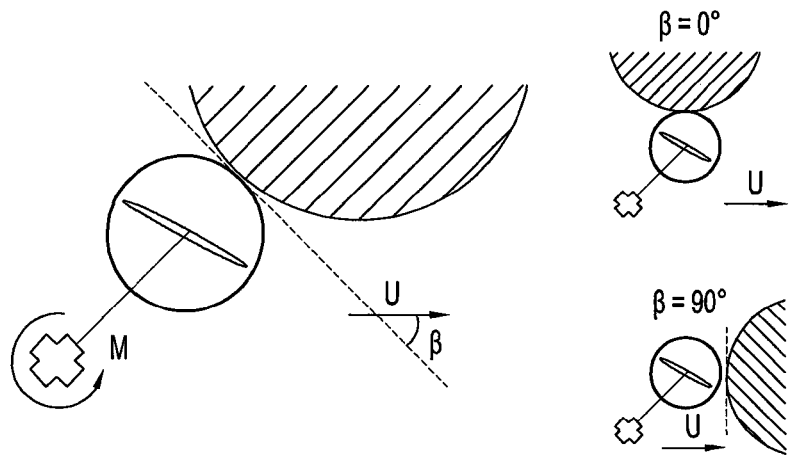
FIG. 40 shows a visualisation of the angle $\beta$ in the context of the model.

First we define the angle between the plane of contact and the incident velocity vector as $\beta$ as can be seen in Fig. 40. Note that by this definition, $\beta = 0°$ refers to a deflective impact in which the rotor guard grazes the object with an infinitesimally small contact point and no normal or frictional forces are exerted and $\beta = 90°$ is a collision in which the rotor guard rebounds in the opposite direction to its incident velocity and there is only normal force and the frictional force is zero.

The moment experienced by the frame, $M_F$, is a function of $\beta$, the coefficient of friction between the guard and the object, $\mu_S$, the geometry of the MAV and rotor guard and the normal force on the MAV, $N$. $N$ depends on the change of velocity of the MAV in Figure 40 : Visualisation of the angle $\beta$ in the context of the model impact $\Delta U$, the mass of the MAV, $m_q$, and the impact time, $\Delta t$. As it is preferable to keep the analysis as general as possible, it was necessary to normalise the calculated moments. For every combination of $\beta$ and $\mu_S$, the moments were normalised by the moment induced on the MAV frame by a completely normal impact between the rotor guard and the object, $M_N$, (i.e. $\beta = 90°$), thus making the normalised moment value, $\frac{M}{M_N}$, independent of N. As collisions could occur at any angle $\beta$, it will be neccessary to analyse the effect of rotational freedom over the whole range $0° \leq \beta \leq 90°$.

The normalised moments can then be analysed with only three inputs, which themselves are dependent upon the decisions made in the design of the rotor guard:

1. Coefficient of Friction, $\mu_S$ - This depends on the surface roughness of the object and the rotor guard. The former cannot be selected in the design, only categorised and estimated based on typical objects that an MAV will come into contact with (trees, glass window panes, metal structures etc.). The latter will be a function of the material chosen for the rotor guards.

2. Ratio of rotor guard diameter to arm length, $\frac{D_G}{L_A}$ - See Fig. 41 for a pictorial definition of $D_G$ and $L_A$. The centre of rotation (C.o.R.) of the rotor guard is likely to be at the centre of each rotor blade to minimise the size of the guard itself (and thus minimise weight). Therefore $L_A$ - The length between the centre of gravity (C.o.G.) of the MAV and the C.o.R. of the guard - will be dictated by the geometry of the MAV. The outer diameter of the rotor guard, $D_G$, will be a function of the design of the rotor guard that will also be limited by the geometry of the MAV itself. The upper limit is defined by obstruction between the guard and the central hub and the lower limit will tend towards the ratio $\frac{D_R}{L_A}$, where $D_R$ is the diameter of the rotor blade. By analysing multiple MAVs we were able to determine that the length ratio usually lies in the range $0.7 \leq \frac{D_G}{L_A} \leq 0.9$.

Figure 41:
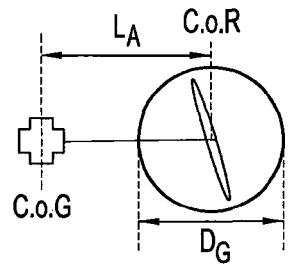
FIG. 41 shows a visualisation of the arm length, $L_A$, and the outer diameter of the rotor guard $D_G$.
Figure 42:
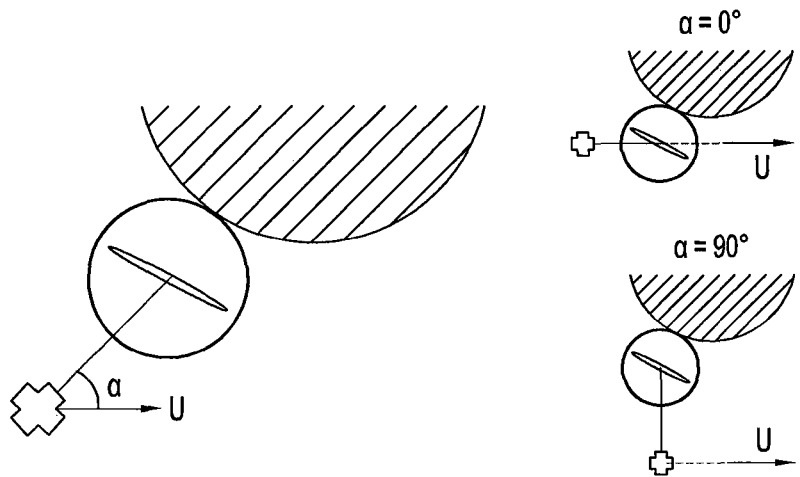
FIG. 42 shows a definition of the angle $\alpha$.

Figure 41 : Visualisation of the arm length, $L_A$, and the outer diamter of the rotor guard $D_G$ 3. Angle between the arm and the velocity vector, $\alpha$ - We define the angle between the velocity vector and the arm as $\alpha$, as can be seen in Fig. 42. $\alpha$ is determined by the orientation of the MAV during flight as well as some external factors such as wind direction and magnitude. We can make some simplifying assumptions about the value for $\alpha$ based on the standard configuration in which the MAV is flown. Assuming that the majority of collisions occur when the MAV is in forward flight, we can discretise $\alpha$ and assign each rotor guard with their most common $\alpha$ angle, as can be seen in Fig. 43, thus simplifying the model to a two variable problem.

Figure 42 : Definition of the angle $\alpha$

We now have a generalised model from which we can estimate the reduction in yawing moment achieved by introducing a rotational degree of freedom into the rotor guard design. The inputs to the system are $\frac{D_G}{L_A}$ and $\alpha$ and the output is the normalised moment $\frac{M}{M_N}$ as a function of $\mu_S$ and $\beta$.

Figure 43:
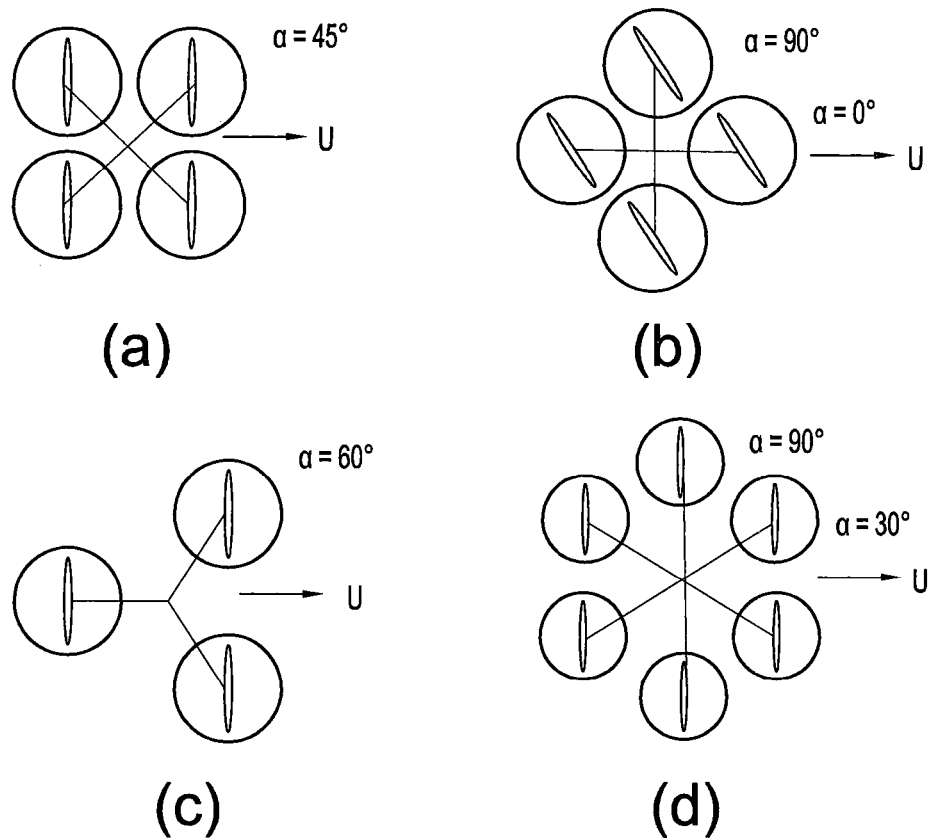
FIG. 43 shows assumed angles for different configuration MAVs.

Figure 43 : Assumed $\alpha$ angles for different configuration MAVs

2.2.2 Estimating the Moment Reduction of a 1DoF Rotor Guard

The MAV being used to test the designed rotor guard is an X configuration quadcopter, as in 43(a), thus an $\alpha = 45°$ assumption will be applied to the model. A mid-range $\frac{D_G}{L_A} = 0.8$ value was also chosen as it fit within the geometric constraints of the test quadcopter.

Figure 44:
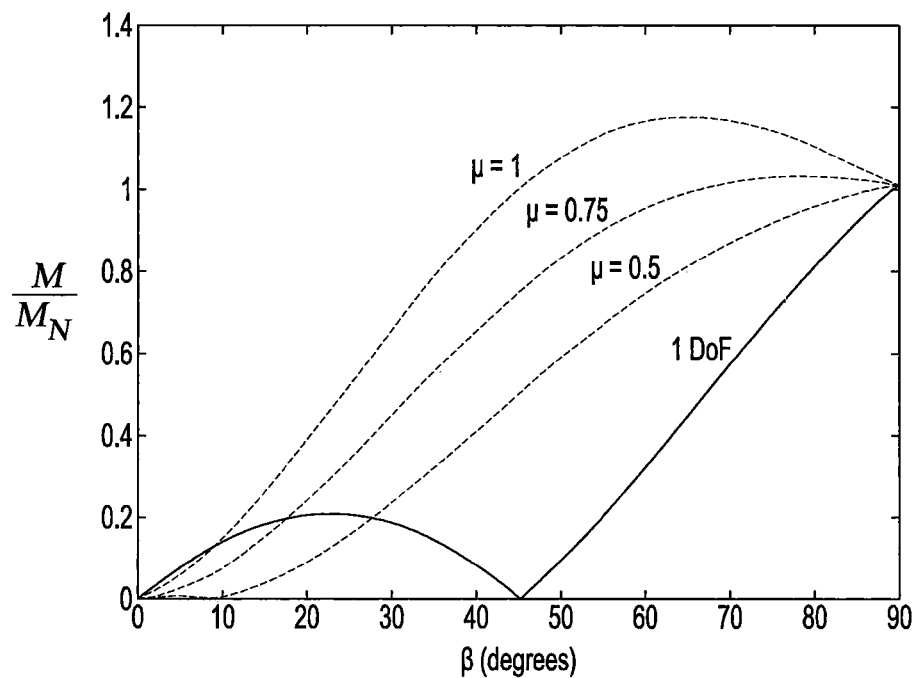
FIG. 44 shows normalised yawing moment as a function of $\beta$, for fixed rotor guards with $\mu_s$=0.5, 0.75 and 1 and the comparative 1DoF yawing moment (for all values of $\mu_s$)

Using the model it was then possible to compare the normalised moment distribution of fixed and 1DoF rotor guard collisions in the range $0° \leq \beta \leq 90°$, for different coefficients of static friction, $\mu_S$. The result of the analysis is displayed in Fig. 44.

An obvious, but important feature to note about the plot is that the 1DoF rotor guard is independent of the coefficient of static friction $\mu_S$. This is due to the fact that the yawing moment due to frictional force has been decoupled from the frame of the quadcopter and is dissipated in the rotation of the rotor guard. We can see however that as $\mu_S$ increases between a fixed rotor guard and the object, so to does the normalised moment, over the whole range of $\beta$ (except 0° and 90°). The values of $\mu_S = 0.5$, 0.75 and 1 were selected as representative values in this plot, but align with the static friction coefficients one might find when using standard materials for the rotor guard and hard external object. If the rotor guard were to be made of plastic or carbon-fibre-reinforced polymer (CFRP) and the object it was in contact with was a glass pane or metal surface then we would Figure 44 : Normalised yawing moment as a function of $\beta$, for fixed rotor guards with $\mu_S = 0.5$, 0.75 and 1 and the comparative 1DoF yawing moment (for all values of $\mu_S$)

expect a $\mu_S \approx 0.5$. If the object was instead a tree, we would expect a $\mu_S \approx 0.75$ and if the rotor guard was made of foam and the object was a tree, we would expect a $\mu_S \gtrsim 1$.

The second feature to point out on the graph is the crossover points between the fixed lines ($\mu_S = 0.5$, 0.75 and 1) and the 1DoF line. The reason for the crossover is that at small angles of $\beta$, which correspond to more deflective impacts, the frictional force acts as a restorative moment that counteracts the moment produced by the normal force. As $\mu_S$ increases the $\beta$ angle of this crossover point reduces due to the increasing magnitude of the frictional component in the resultant force vector. As mentioned before, the crossover point is also a function of the geometrical factors $\alpha$ and $\frac{D_G}{L_A}$ held constant here.

This graph can be used directly to analyse the potential benefit of a 1DoF rotor guard for a given material. For instance, if we were to chose foam for the rotor guard and determined that our average $\mu_S \approx 1$, then we could expect a reduction in yawing moment almost across the entire spectrum of impacts. If on the other hand we were to choose to use a plastic rotor guard and assume $\mu_S \approx 0.5$, then we can only expect a reduced yawing moment above impact angles of $\beta = 28°$. Other than the region of benefit, we must also take into account the magnitude of the potential benefit. We can see that in the region before the crossover for $\mu_S = 0.5$, the increase in moment is $\frac{\Delta M}{M_N} \leq 0.15$ where as in the region after the crossover point, the reduction in moment is $\frac{\Delta M}{M_N} \leq 0.5$. The magnitude of the benefit also scales with $\mu_S$.

Figure 45:
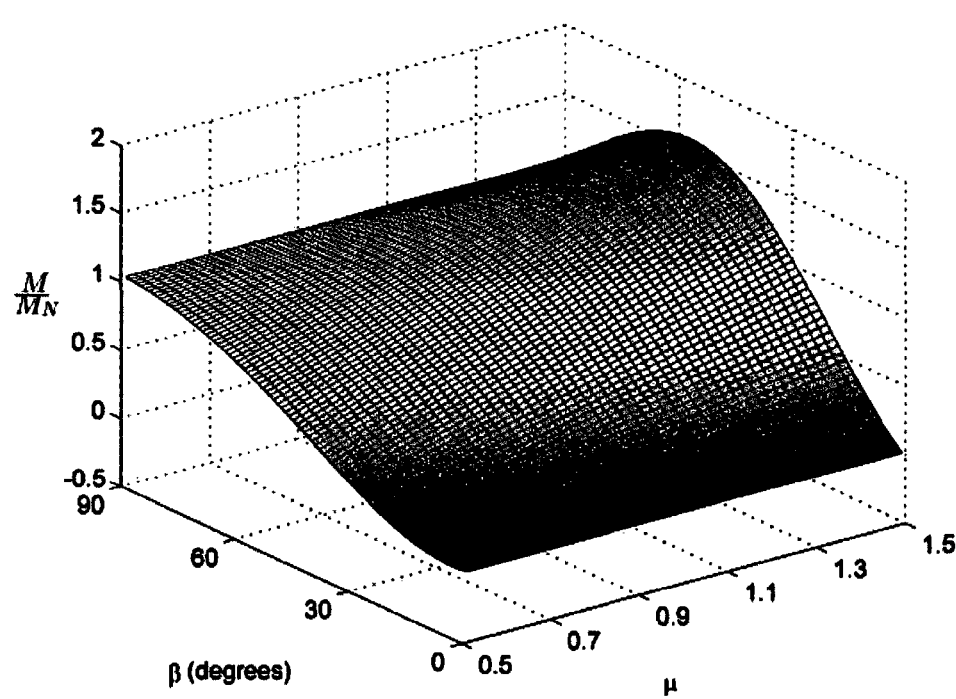
FIG. 45 shows the variation of $M/M_N$ with $\beta$ and $\mu_s$.
Figure 45:
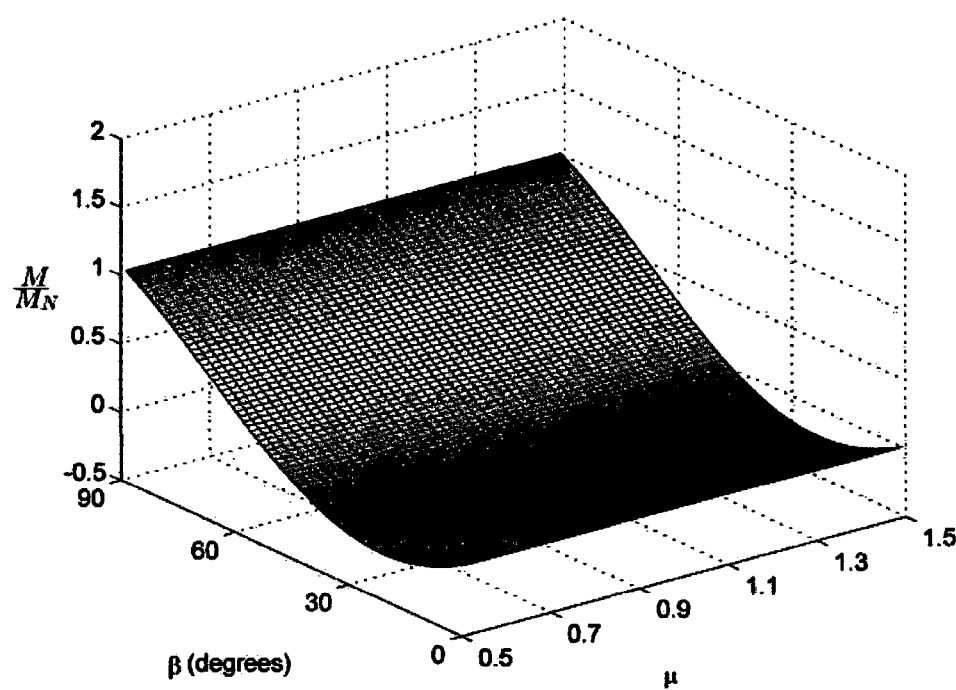

We can further visualise the effect of both $\mu_S$ and $\beta$ changing by using a 3-dimensional surface plot as can be seen in Fig. 45. Note that here we can see that the cross-section of the surface remains constant in the 1DoF case (Fig. 45(b) ), but increases in curvature and the peak value increases with $\mu_S$ for the fixed rotor guard case (Fig. 45(a) ).

(a) Fixed rotor guard (b) 1DoF rotor guard

Figure 45 : Variation of $\frac{M}{M_N}$ with $\beta$ and $\mu_S$

2.2.3 Special Case: Single Ring Whole MAV Protection

Figure 46:
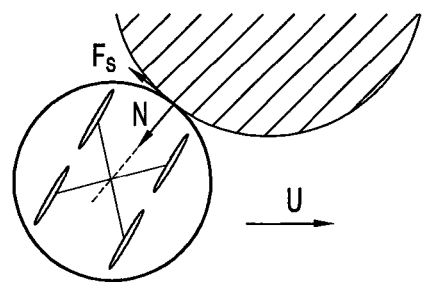
FIG. 46 shows normal and frictional force components in a collision involving an MAV with whole body protection.

As discussed briefly in Section 1.4, if the whole MAV is surrounded by a continuous structure with a circular outer cross section, then the normal force in impact will always pass through the centre of the MAV, regardless of contact angles $\alpha$ and $\beta$, as can be seen in Fig. 46. Assuming that the centre of gravity of the MAV is at the centre of the circle, this configuration will experience no yawing moment from the normal force component, $N$ and will only yaw as a result of the frictional force component, $F_S$. The moment arm of $F_S$ is a constant equal to the radius of the outer surface of the protective ring, $r_G$. For the following analysis we use $r_G = 1.05(L_A + \frac{D_R}{2})$.

Figure 46 : Normal and Frictional Force components in a collision involving an MAV with whole body protection Using a similar method of analysis as Section 2.2.2, but for this special case, it was possible to analyse the moment reduction by using such a system and compare it to the moment reduction caused by the 1DoF individual rotor guards. The results are plotted in Fig. 47 .

Figure 47:
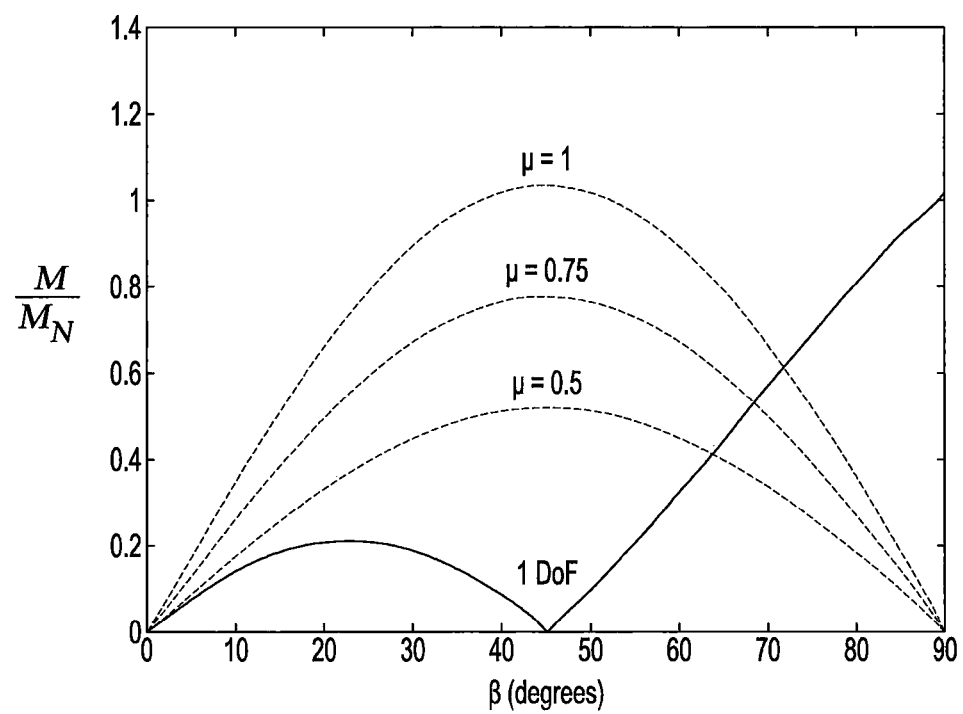
FIG. 47 shows normalised yawing moment as a function of $\beta$, for whole MAV protective rotor guards with $\mu_s$=0.5, 0.75 and 1 and the comparative 1DoF yawing moment.
Figure 48:
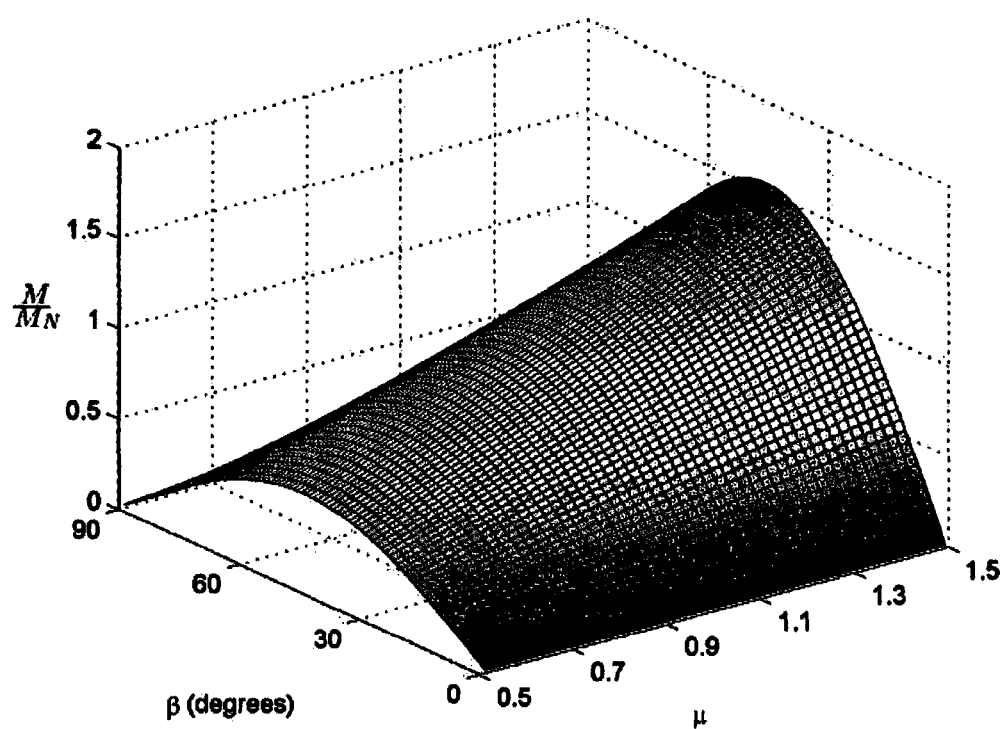
FIG. 48 the variation of $M/M_N$ with $\beta$ and $\mu_s$ for a fixed protective ring around the whole MAV.

We can see from Fig. 47 that the yawing moments produced by the whole MAV coverage are greater than those produced by the 1DoF system over most of the range of $\beta$. As we would expect, the magnitude of the difference between the whole fixed protective structure and the 1DoF individual rotor guard increases with $\mu_S$, as does the value of $\beta$ at which the lines cross over. For $\mu_S = 1$, the 1DoF is preferable in the range $\beta < 72°$. To better visualise the effect of $\mu_S$ and $\beta$ on $\frac{M}{M_N}$ we can map a surface plot, as can be seen in Fig. 48.

The final observation to make is that if we add a rotational degree of freedom to the protective ring surrounding the entire MAV, then we completely decouple the yawing moments from the MAV frame. In this case the normal force acts through the C.o.G. of the MAV and the moment from the frictional component is transferred to the rotating guard. While this is the optimum solution in terms of reduction of the yawing moment, the large free-rotating structure is likely to incur a greater weight penalty and would almost certainly be less easily scalable and adaptable than the individual rotor design.

Figure 47 : Normalised yawing moment as a function of $\beta$, for whole MAV protective rotor guards with $\mu_S = 0.5$, 0.75 and 1 and the comparative 1DoF yawing moment Figure 48 : Variation of $\frac{M}{M_N}$ with $\beta$ and $\mu_S$ for a fixed protective ring around the whole MAV

2.3 Configurations for a 1DoF Rotor Guard

There are two possible ways of introducing a rotational degree of freedom into the rotor guard:

1. Rotation around a central bearing - This configuration (see Fig. 49(a) ) would provide a less damped rotational response to impact, but a smaller area of connection between the rotor guard and the quadcopter frame makes it more vulnerable to damage. In particular, the moments caused by impacts from above and below are more likely to dislodge the frame from its central bearing.

2. Rotation of a separate bumper around outer perimeter rollers - A cylindrical bumper would sit around the circumference of a static guard and rotate on rollers on the perimeter of the guard (See Fig. 49(b) ). This would provide a larger area of connection between the quadcopter frame and the rotor guard. The downside of this configuration would be that it involves an extra component - the bumper - which is likely to significantly increase weight. Also the friction between the bumper and the rollers is likely to reduce the rotational responsiveness of the bumper to a deflective impact.

(a) Fully rotational guard with central bearing (b) Static guard and free rotational bumper (red)

Figure 49:
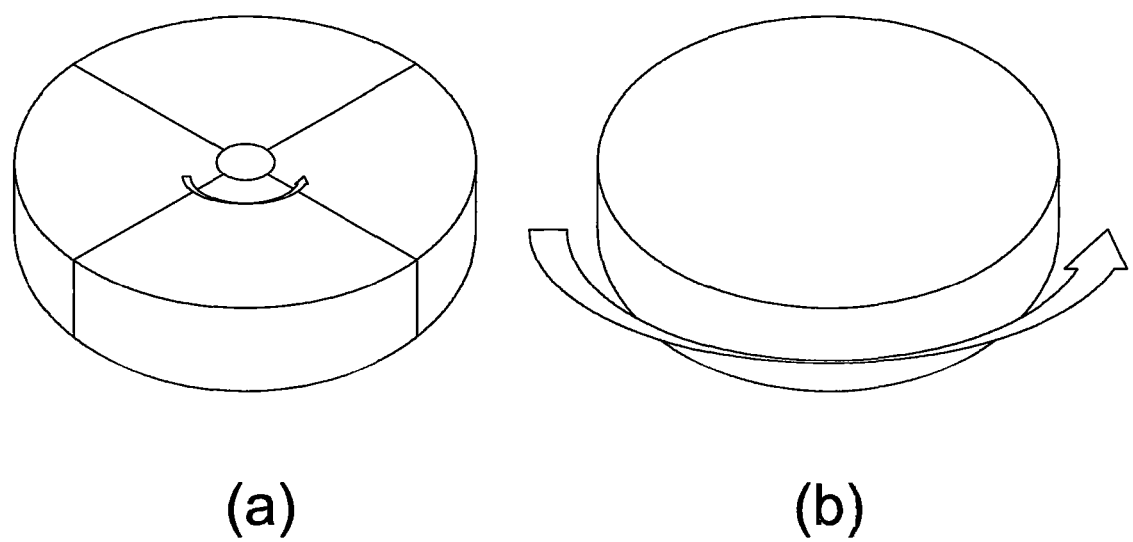
FIG. 49 shows a possible configuration for a rotor guard with rotational freedom.

Figure 49 : Possible configuration for a rotor guard with rotational freedom

The rotational degree of freedom only completely decouples the frictional moment on the guard, $M_G$, from the moment on the quadcopter, $M_F$, in the ideal case that the guard can rotate completely freely. The friction experienced by the bearing in Fig. 49(a) and the friction between the rollers and the bumper in Fig. 49(b) will cause a coupling between rotor guard moment and the moment experienced by the quadcopter body. It is therefore preferable to select a configuration which provides the least rotational resistance, which would be the central bearing configuration due to the smaller area of contact.

Chapter 3

Aerodynamic Modelling of a Rotor Duct

3.1 Introduction

It is possible to increase the efficiency of a propeller or rotor blade by placing it an aerodynamically shaped duct. The design choices made so far in the project have meant that a protector is likely to surround each rotor blade. The momentum theory analysis of an open and shrouded rotor in Appendix A was used to assess whether it would be advantageous to use an aerodynamically shaped duct for a rotor blade of the size being used by the lab group.

3.1.1 Open Rotor vs. Shrouded Rotor

We can compare the performance of a shrouded rotor against an open rotor using equations A.9 and A.13. We can derive a relationship between the four main parameters of the open and shrouded flows: thrust, power requirement, rotor disk area and diffuser expansion ratio. Taking a ratio of these expressions and denoting open rotor parameters with a subscript $OR$ and shrouded rotor parameters with subscript $SR$, we get:

$$\frac{P_{i,SR}}{P_{i,OR}} = \frac{1}{\sqrt{2\sigma_e}} \left(\frac{T_{SR}}{T_{OR}}\right)^{\frac{3}{2}} \left(\frac{A_{OR}}{A_{SR}}\right)^{\frac{1}{2}} \quad (3.1)$$

There are several analyses we can perform by manipulating equation 3.1. For instance, if we assume that the disk areas are the same ($A_{OR} = A_{SR}$) and that the rotor blades are given the same amount of power ($P_{i,OR} = P_{i,SR}$), then we get the following relationship for thrust produced by the shrouded and open rotors as a function of the diffuser expansion ratio:

$$\frac{T_{SR}}{T_{OR}} = (2\sigma_e)^{\frac{1}{3}} \tag{3.2}$$

3.2 Optimum Sizing

From equation 3.2 we can see that by increasing the diffuser expansion ratio, $\sigma_e$, the thrust produced by the shrouded rotor increases proportional to $\sigma_e^{\frac{1}{3}}$. However to increase $\sigma_e$, the diffuser has to either be lengthened, which incurs a weight penalty, or the angle of the diffuser wall ($\theta_e$ in Figure 67 ) has to be increased. The limit on $\theta_e$ is the angle at which the flow separates from the wall. A study of similarly sized diffusers , gives a maximum permissible diffuser angle of $\theta_e = 20^o$. Using this diffuser angle to ensure minimum height (due to space constraints) in combination with a semi-circular leading edge and a straight outside wall (as shown in Appendix Figure 102 ), we can calculate an optimum leading edge radius, $r$, and the accompanying optimum diffuser length, $L$.

The normalised increase in thrust $\frac{\Delta T_{SR}}{T_{OR}}$ accounts for the weight of the duct, $W_d$ by way of subtracting it from the pure thrust increase produced by the duct:

$$\frac{\Delta T_{SR}}{T_{OR}} = \frac{T_{SR} - W_d}{T_{OR}} \tag{3.3}$$

$W_d$ is a function of two independent parameters, the density of the material being used for the duct, $\rho_m$, and the volume of the material used in the duct, $V_d$. By keeping the cross-section of the duct constant, $V_d$ becomes directly proportional to the normalised LE radius of the duct $\frac{r}{D_r}$. We can visualise the effect on $\frac{\Delta T_{SR}}{T_{OR}}$ with varying $\rho_m$ and $\frac{r}{D_r}$ using the surface plot in Fig. 50.

We can see from this graph that the beneficial effects of the duct are reduced quite rapidly as the density of the material is increased.

Figure 50:
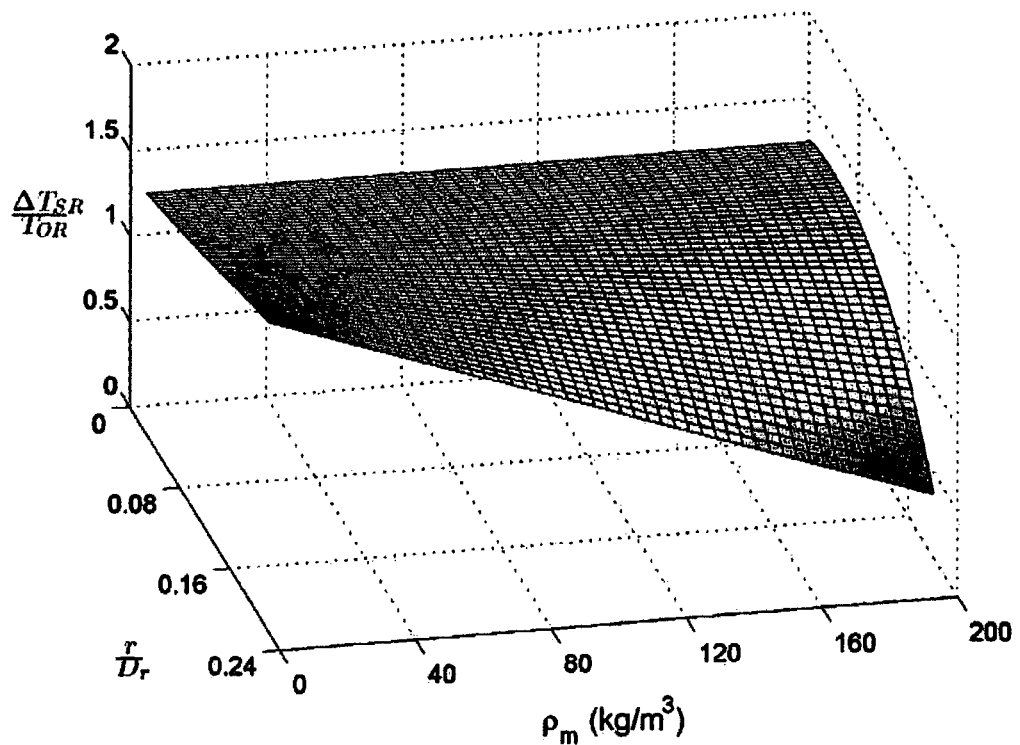
FIG. 50 shows a normalised thrust increase of a ducted rotor with varying $r/D_r$ and $\mu_m$.
Figure 51:
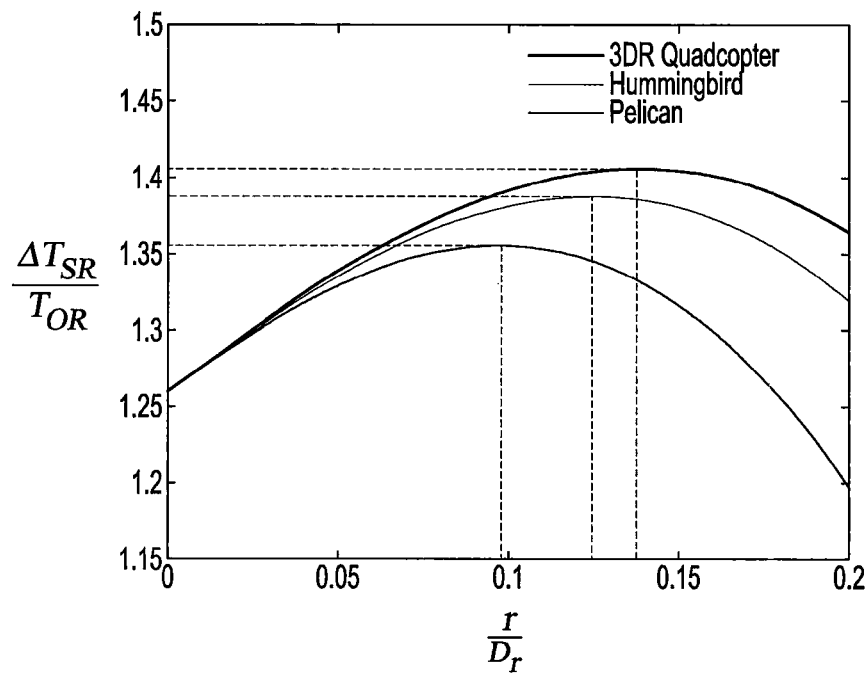
FIG. 51 shows extra thrust produced by shrouded rotor against normalised leading edge radius of the duct.

Figure 51 shows a cross section of Fig. 50 for a material density of $\rho_m = 50 kg/m^3$ and includes plots for 3DR, Pelican and Hummingbird quadcopters. The plot depends on the weight of the MAV, $W_q$, and the diameter of the rotor blade $D_r$, and therefore the curve differs slightly between these different MAVs.

The quadcopter being used by the lab for ecological research is a 3DR quadcopter fitted with 26.5 cm diameter rotor blades. From Fig. 51 we can see that for a quadcopter Figure 50 : Normalised thrust increase of a ducted rotor with varying $\frac{r}{D_r}$ and $\rho_m$ Figure 51 : Extra thrust produced by shrouded rotor against normalised leading edge radius of the Duct of this weight and rotor size, the optimum $\frac{r}{D_r} \approx 0.14$. This translates to a LE radius of $r = 3.17cm$ and a diffuser height of $L = 20cm$. Note however that the size of the duct is likely to be limited by the geometry of the quadcopter. The potential net thrust produced by this configuration duct can be seen in the figure to be in the region of 1.4 times greater than that of an open rotor. It has also been observed in experiments on ducts of a similar size that the efficiency of ducted rotors can actually be greater than expected if the distance between the duct and the edge of the rotor blade is kept small, due to a reduction in tip vortex losses |.

Overall it has been seen that a duct for a rotor blade of the size being used by the Imperial College team could not only offset the weight penalty of having a surrounding structure, but actually improve the net thrust vector in a hovering condition. Experimental work will be used to validate this conclusion later in the report.

Chapter 4

Design of a 1DoF Rotor Guard

4.1 Introduction

The benefits of introducing a rotational degree of freedom into the rotor guards was discussed in Chapter 2. Furthermore, in sections 1.4 and 2.2.3, we discussed the merits of having a structure that surrounds the entire quadcopter or each rotor individually. It was decided that individual rotor guards would be designed for the following reasons:

- The sum weight of the four individual rotor guards is likely to be less than that of whole MAV coverage due to the reduction in support material required to counteract the bending moments.

- The resulting rotor guards would be more easily adaptable to different MAVs as only the attachment points would need to be redesigned as opposed to the entire structure.

- Aerodynamically shaped ducts can be used when there is individual rotor coverage.

- Increased levels of protection (mesh, additional protective structures etc.) can more easily be introduced with individual rotor guards.

The following chapter outlines the design and manufacturing techniques used to produce effective 1DoF rotor guards.

4.1.1 Size and Payload Restrictions

Figure 52:
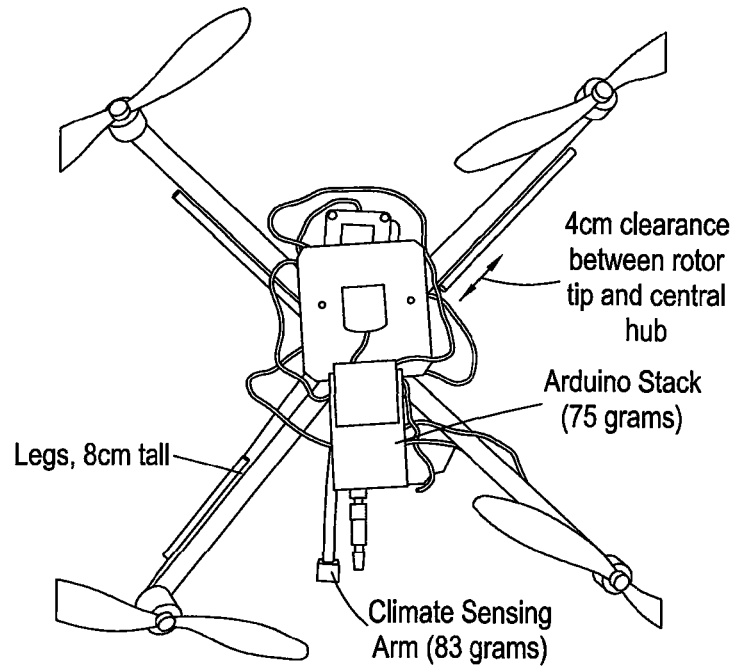
FIG. 52 shows a picture of the test quadcopter from above with annotations.

As mentioned previously, the test quadcopter is a 3DR quadcopter that has been specially modified to incorporate sensing equipment for rainforest canopy research. This equipment introduced payload and geometry restrictions on the rotor guard design. Figure 52 shows an annotated picture of the test quadcopter with some of the restrictive features pointed out.

Using flight tests, it was determined that the maximum payload mass for the quadcopter was 400 grams. The climate sensing equipment (climate sensing arm and arduino stack) had a mass of 160 grams, leaving 240 grams maximum for all the rotor guards combined, i.e. 60 grams per rotor.

Figure 52 : Picture of the test quadcopter from above with annotations

4.2  $1^{st}$ Iteration Design

The first iteration design followed the bumper configuration as outlined in Fig. 49(b). An image of the design, without the bumper can be seen in Fig. 53 and the weight breakdown can be seen in Table C.1. The carbon fibre rollers on the outside of this central static guard were designed to allow the bumper to rotate independently around the quadcopter. The total weight per rotor for this design was 210 grams without the bumper, which is clearly far too high given the payload restriction is 250 grams for all 4 guards. The upper and lower plates were made of 5mm thick delrin, which could have been reduced to 2.5 - 3mm thickness to reduce weight, but the design would still have been way above the weight restrictions, especially when the weight of the bumper was factored in.

Figure 53:
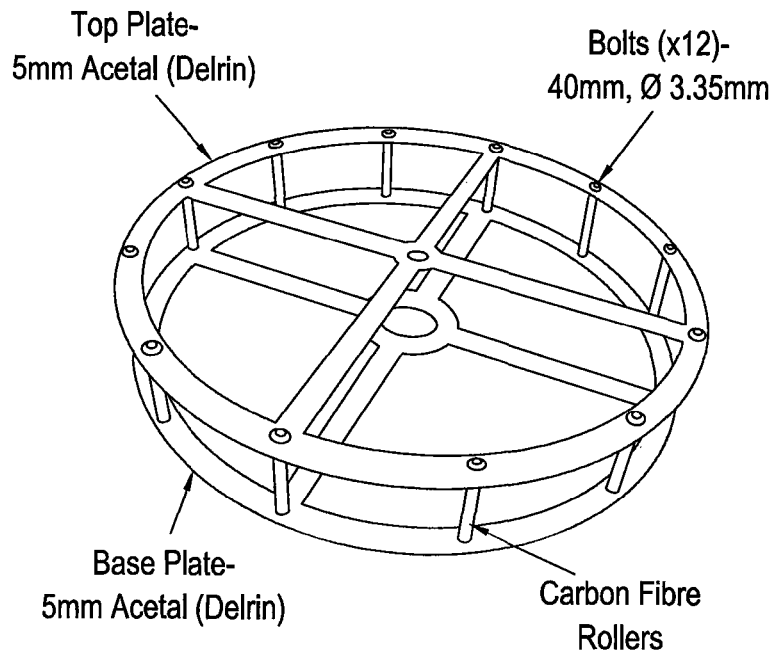
FIG. 53 shows an annotated picture of the 1st iteration design.

Figure 53 : Annotated picture of the $1^{st}$ iteration design

4.3 $2^{nd}$ Iteration Design

To drastically reduce the weight in the second iteration of design, two features were incorporated:

- Change of configuration to the central bearing design, see Fig. 49(a)

- Ducted shape to be used to potentially increase the thrust produced by each rotor The benefits of a shrouded rotor were discussed in Chapter 3. Using the $\frac{\Delta T_{SR}}{T_{OR}}$ vs $\frac{r}{D_r}$ graph, Fig. 50 , it was possible to choose a design point on the '3DR Quadcopter' curve that would meet the constraints from the geometry of the quadcopter, whilst also being aerodynamically beneficial.

4.3.1 Material Selection

Figure 67:
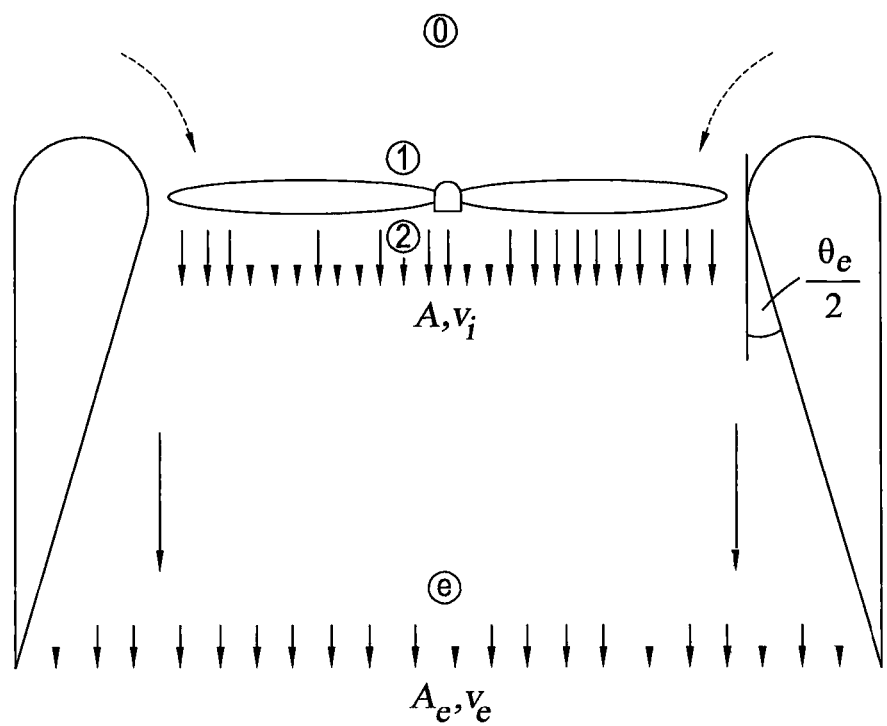
FIG. 67 shows a model of the flow through a shrouded rotor blade.

As mentioned in Section 3.2, it is aerodynamically preferable to have as minimal clearance between the rotor tip and the duct as possible and no blockage from the duct above the rotor. It is therefore best to place the rotor plane in the narrowest section of the guard, as can be seen in Fig. 67 . However, as tip clearance is reduced, the stiffness of the duct needs to be increased to prevent the duct from deforming into the rotor blade during impacts. It is therefore preferable to choose the material of the duct to maximise the Young's Modulus of the structure, $E$. However the general trend with materials is that an increase in $E$ will usually be accompanied by an increase in material density, $\rho_m$, which negatively affects the net thrust produced by the rotor as shown in Fig. 50 .

We therefore have a trade off between tip clearance and density that depends on the material selected for the duct.

It is not possible to analytically solve the force-displacement problem due to the complexity of the structure, which will be made up of the duct, support rods and potentially other materials (e.g. vacuum formed plastic). For this reason a tip clearance of 0.8cm was chosen based upon tip clearances of other rotor guard designs. It will be possible to experimentally calculate the Young's modulus of the complete structures when they are assembled and thus determine the maximum impact forces/velocities of each of the designs.

Figure 68:
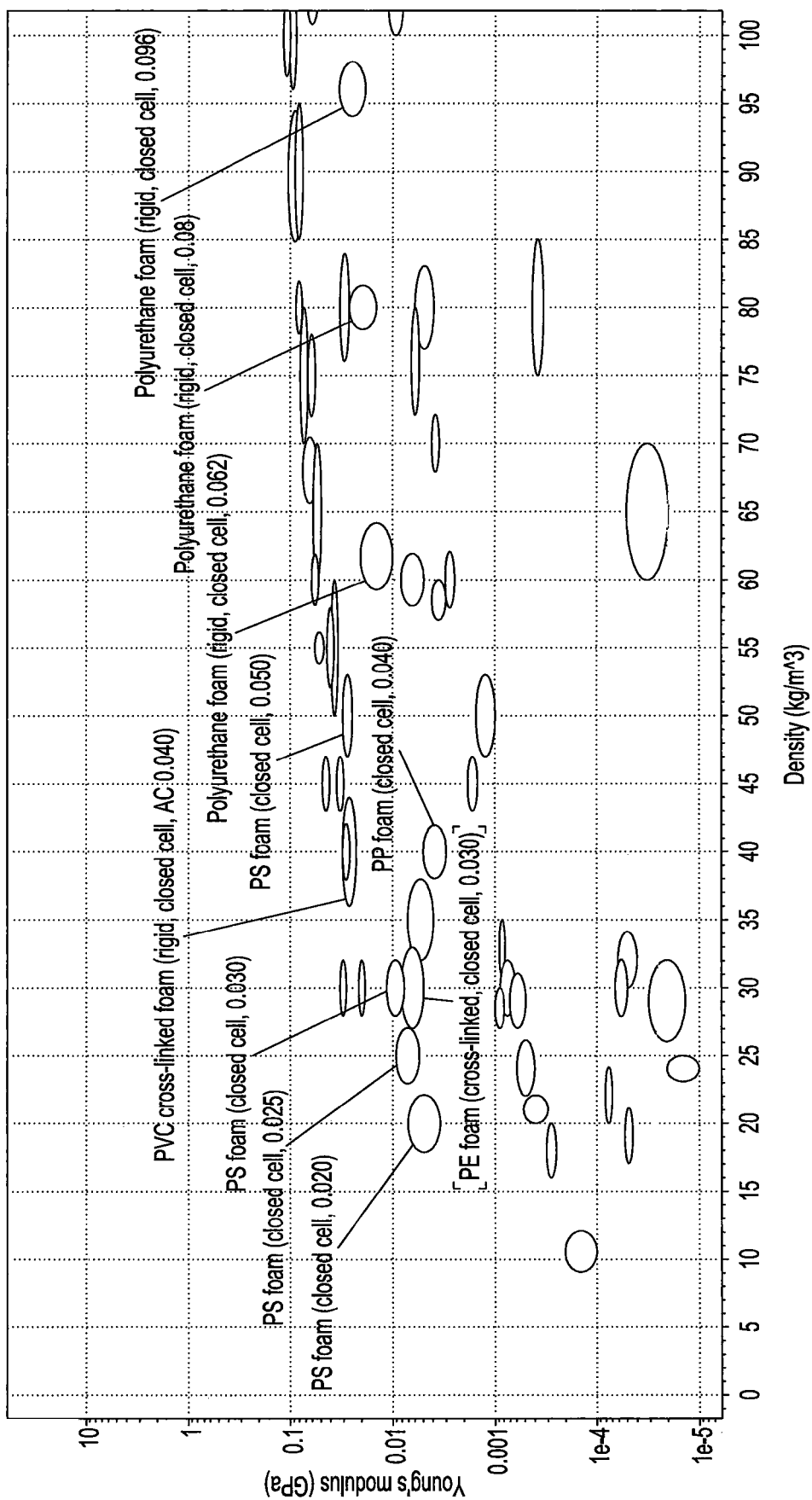
FIG. 68 shows a strength vs density graph for material selection.

An analysis of possible materials in the range $0 < \rho_m < 100 kg/m^3$ is given in Fig. 68. With a tip clearance of 0.8cm, a LE radius of $r = 10mm$ was chosen as it was the maximum sized duct that would freely rotate around each rotor without being impeded by other equipment on the quadcopter. The length of the duct was calculated to be $L = 55mm$ with a diffuser angle $\theta_e = 20°$. The chosen material for the ducts was foam, due to its low density, mouldability, low cost and adequate strength and toughness. Within the broad category of foam there is also a diverse range of the above parameters from which to choose the ideal material for the rotor guard. Some different types of foam have been highlighted in Figure 68 that were considered in the design.

4.3.2 Manufacture of a 1DoF ducted rotor guard

As the cross-sectional shape of the duct is integral to its effectiveness at expanding the flow, it was necessary to develop a method by which the ducted shape could be made accurately, but also efficiently to produce enough guards to test the design properly within the time constraints of the project. It was decided that the easiest means of producing multiple ducted guards would be to make a mould of the negative of the required shape and then use an expanding polyurethane foam ($\rho = 60 kg/m^3$) to fill the mould to get the required shape. A schematic of the manufacturing process is included in Fig. 54. This made it relatively straight forward to mass produce ducted foam rotor guards for the test quadcopter. While the geometry of the mould was designed specifically for 26.5cm (10") rotor blades, it is easy to see how the mould could be scaled to produce rotor guards for different sized propellers.

To ensure that the rotor was placed in this optimal plane, whilst also being able to rotate, it was necessary to reduce the length of the duct by trimming 1.5cm off of the trailing edge. This reduced the diffuser expansion ratio and thus the potential thrust increase as can be seen in Fig. 55(a).

Figure 54:
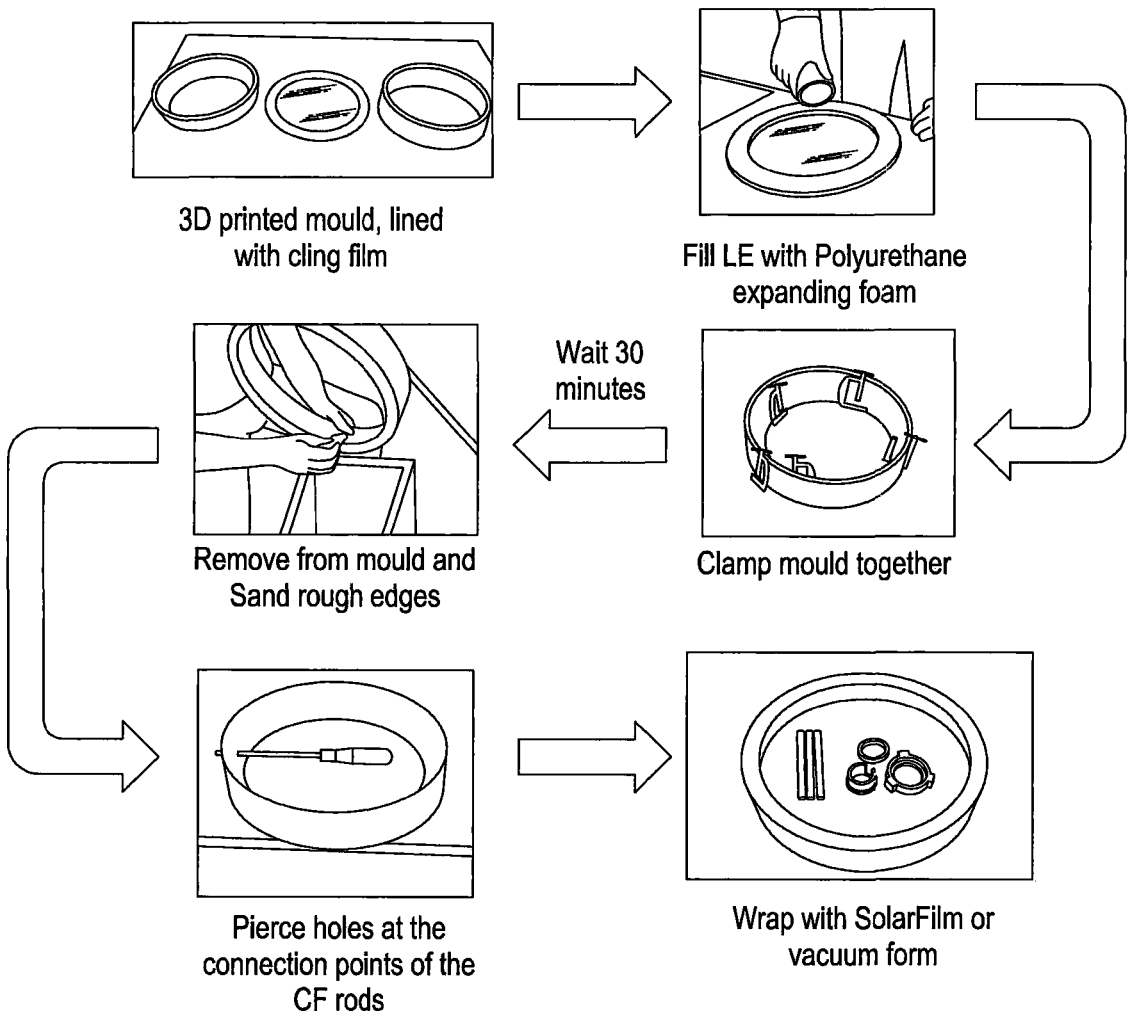
FIG. 54 shows a schematic of the manufacturing process.

Figure 54 : Schematic of the manufacturing process

Figure 56:
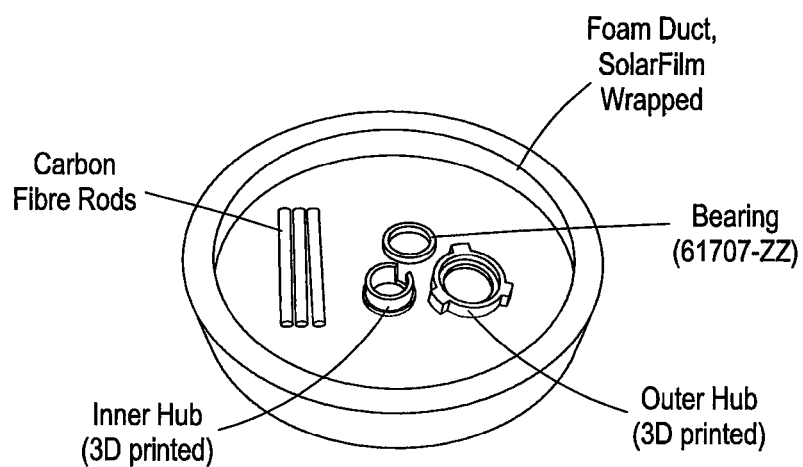
FIG. 56 shows components of the 2nd iteration design.

The components of the $2^{nd}$ iteration design are shown in Fig. 56 and the weight breakdown is given in Table C.2.

4.3.3 Design Analysis

The second iteration design proved successful in creating the rotational degree of freedom, however the weight was still too high to be flight tested. We can see from the weight breakdown that the two heaviest components in the table are the foam duct (58 grams) and the SolarFilm (15 grams).

SolarFilm was added to the design to protect the foam and prevent it from chipping in impact. A thin layer of vacuum formed plastic (0.25mm APET) was originally intended for this purpose, however it was found that the foam duct was deforming too much during the vacuum forming process. Whilst the polyurethane foam was useful for expedient manufacture of the ducts, it turned out to be too dense and slightly too brittle when moulded. If we consult the material selection graph in Fig. 68, we can see that we (a) Normalised thrust vs normalised LE radius (b) Full Duct        (c) 1DoF Duct Figure 55 : Expected thrust increase at the design point of the 1DoF rotor guard Figure 56 : Components of the $2^{nd}$ iteration design could get the same Young's Modulus at half of the density using a cross-linked PVC or closed cell polystyrene (PS) foam.

The second issue with the design, experienced during thrust testing, was that the complete coverage of the base of the motors was causing them to overheat and, as a result, perform at around 70% of their normal efficiency. Therefore a redesign of the central hub was also required.

4.4 $3^{rd}$ Iteration Design

The configuration remained largely the same as the $2^{nd}$ iteration design, with modifications made to address the two main flaws:

- Polystyrene (PS) foam was used instead of polyurethane (PU) foam to save weight and increase fracture toughness.

- The hub was redesigned to allow for more effective cooling of the motor.

This design utilised 0.25mm APET vacuum formed plastic shells to acheive the ducted shape required. A ring of PS foam was then inserted into the shell to increase the strength of the structure. The modified design is shown in Fig. 57 and the weight breakdown is given in Table C.3

Figure 57:
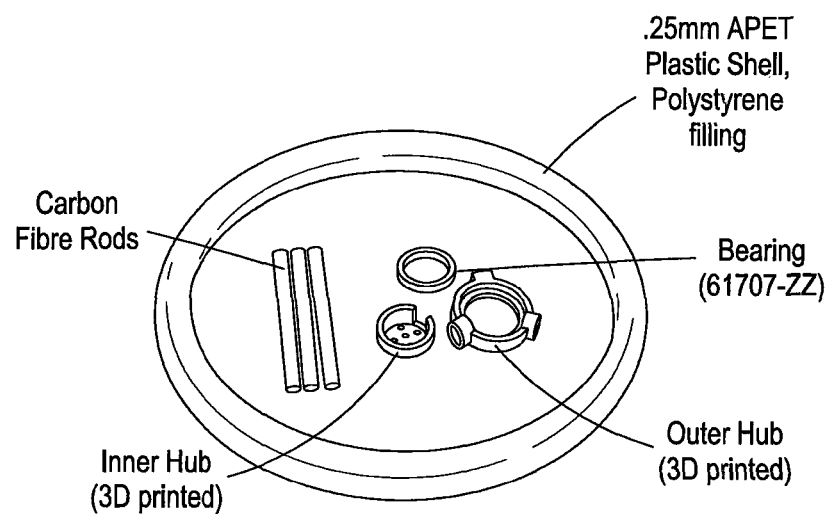
FIG. 57 shows components of the 3rd iteration design.

Figure 57 : Components of the $3^{rd}$ iteration design

4.5 Testing of 1DoF Protection

The impact properties of the 1DoF system were tested using flight and crash tests in the laboratory and in an outdoor forest environment.

There were several features to highlight about the design from the initial testing:

- From observation, all of the rotor guards tested were able to withstand impacts without deforming into the rotor, thus proving that the lateral Young's Modulus of the foam and rod structure used in the design was adequate to protect the rotor. The only issue that arose was that in some higher velocity impacts, the bearing dislodged from the central hub, pushing the carbon fibre rods up into the rotor blade. The way to correct this problem would have been to design for a more secure hub-bearing join. The structure was designed specifically to be collapsible and thus did not utilise any glue or non-detachable joints. If the requirements had allowed for a more permanent join, or a more secure non-permanent join, then the design would have been able to withstand the full range of impacts it was subjected to. This mechanism of failure was discussed from the outset of the central bearing idea and if unresolvable may require a transition to the bumper configuration as outlined in 1.4.

- The rotational degree of freedom was seen to improve the yaw response of the quadcopter, however due to a lack of appropriate equipment, it was difficult to quantify the magnitude of the effects due to the complexity of the model and the number of inputs it requires. It was determined in Chapter 2 that the yaw response of the quadcopter was dependent on the change of velocity of the quadcopter, $\Delta V$, the impact time $\Delta t$, the mass of the quadcopter $m_q$, the static friction coefficient between the surfaces, $\mu_s$, the angle between the collision plane and the velocity vector, $\beta$, and the angle between the arm and the velocity vector in the collision, $\alpha$ (see Section 2.2.1). $m_q$ is known, $\Delta V$ can be deduced from the quadcopter pixhawk data and $\alpha$ can be approximated from the configuration of the quadcopter during the crash, however the collision time $\Delta t$ and collision angle $\beta$ are not easy to obtain. It might have been possible, using a slow-motion camera, to have obtained reasonable estimates for these two values and therefore have plotted the effect of the rotational degree of freedom in subsequent collision tests.

- The free rotating rotor guards also had a tendency to spin, unperturbed, during flight at higher levels of rotor thrust. Whilst this side-effect was not detrimental, it may have increased the blockage in the flow and caused greater levels of rotational momentum. It might be possible to mitigate this issue by using a bearing with a higher level of friction that allows rotation of the guard in impacts, but not in free flight. One suggestion would be a plastic ball bearing, which would have higher friction and lower weight than the metal bearing used in the design.

4.6 Buoyancy of Designs

It was postulated that the low density foam used in these designs could also be used as a flotation device for the eventuality of a crash landing of the MAV into water. Furthermore, by adapting the structure or placement of the guards, we might be able to give the quadcopter the ability to land and take off from water.

Figure 58:
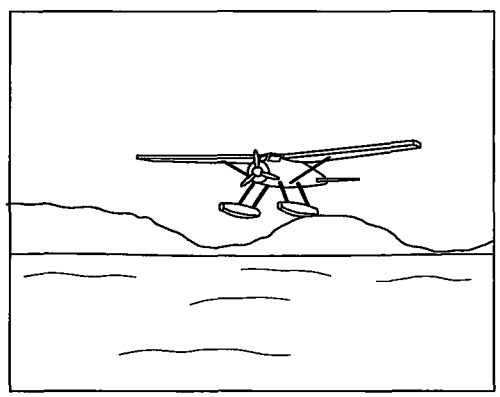
FIG. 58 shows different types of amphibious aircraft.
Figure 58:
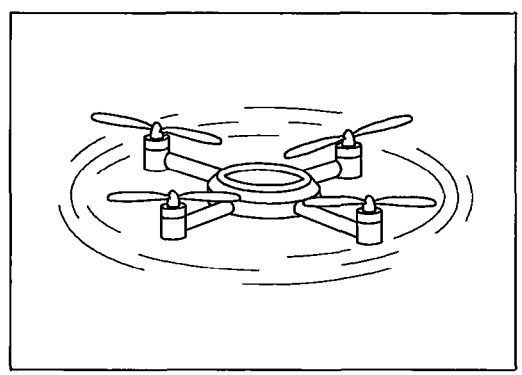

Aquatic landings are not a new thing in the aviation industry, and have also been trailed with MAVs, see Fig. 58 . However using a design by which the rotor guard position can be adapted to enable a MAV to float, without complex waterproofing techniques, has not been explored.

(a) SeaPlane    (b) Waterproof Quadcopter

Figure 58 : Different types of amphibious aircraft

Retrofitting an MAV with the ability to land and take off water will enhance the functionality of the MAV, thereby improving one of the design criteria outlined in Section 1.3 of the report. The trade-off will be between the increased functionality of the MAV and the extra weight and complexity of the structure, if applicable, which should be minimised in the design. Possible uses of an amphibious MAV could be as follows:

- Aquatic research - MAVs are powerful tools for research and being able to easily collect data, transmit images and take samples of marine environments could be hugely beneficial.

- Recharging on long missions - If quadcopters are given the ability to recharge (solar panels, sea water battery recharging etc.) then the ability to land on water could enable the MAV to achieve longer missions across large bodies of water.

- Water sampling - MAVs could be equipped with the ability to assess water purity in the event of a disaster (e.g. oil spill) or environmental change (e.g. water pollution).

4.6.1 Buoyancy Force of Designs

| Buoyancy Properties in Water | | | |
|---|---|---|---|
| Rotor Guard Design | Volume ($cm^3$) | Buoyancy Force(N) | Mass supported per Rotor Guard(kg) |
| Full Duct | 666 | 6.52 | 0.666 |
| 1DoF Duct | 578 | 5.66 | 0.577 |
| Vacuum Formed Duct | 511 | 5.01 | 0.511 |

TABLE 4.1: Buoyancy properties of each of the designs when fully submerged in water We can see the maximum mass that each rotor guard design is able to support in water in Table 4.1. The result being that all of the rotor guard designs are able to support an MAV weighing over 2kg, when 4 rotor guards are attached. The mass that each individual rotor guard is able to support, as LE radius of our rotor guard cross-section is increased is plotted in Fig. 59 .

Figure 59:
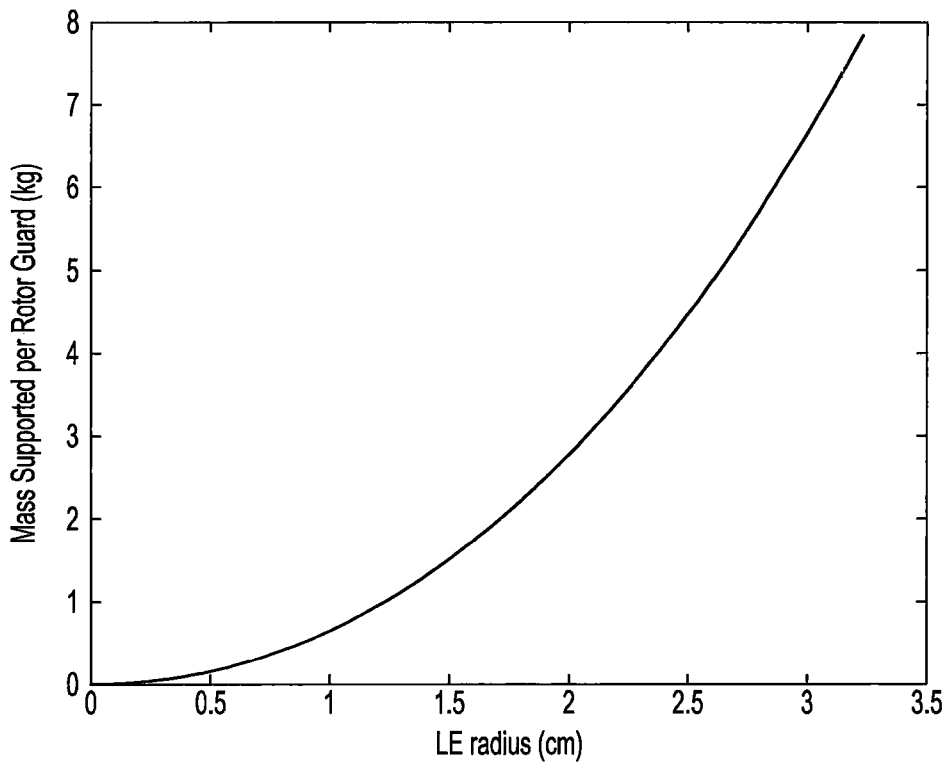
FIG. 59 shows mass supported by rotor guard when fully submerged in water as a function of the LE radius.

Figure 59 : Mass supported by rotor guard when fully submerged in water as a function of the LE radius

4.6.2 Proposed Buoyancy Mechanism

Figure 60:
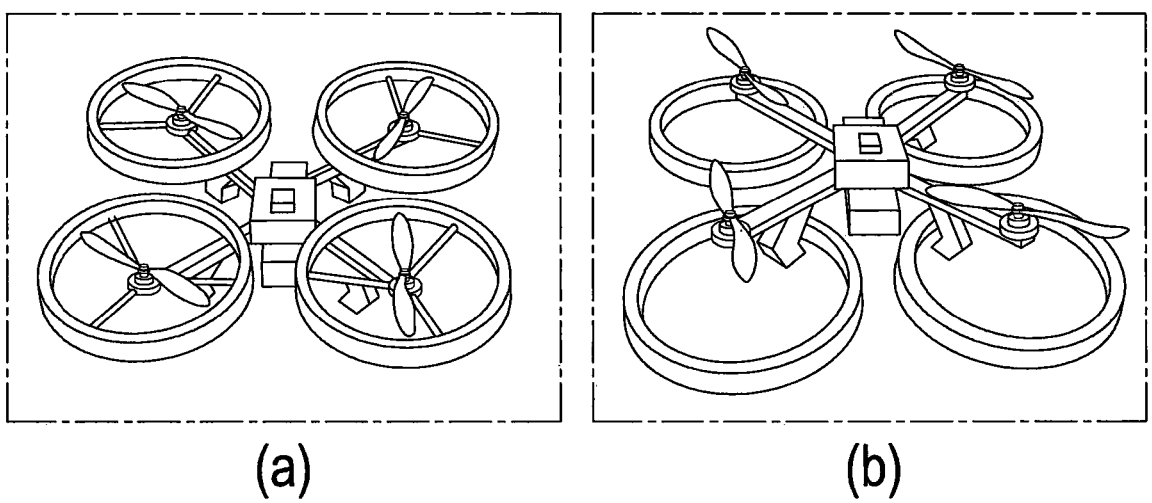
FIG. 60 shows a proposed mechanism to enable water landing and take-off.

The proposed mechanism to allow the MAV to sit on the water with as little of its body submerged as possible was to adjust the position of the rotor guards from their protective position around the rotor blades, to a stable water landing configuration as outlined in Fig 60. This rotor guard position change could either be mechanised using servo-motors to allow for alteration of the position during flight, or could be manually adjusted to save weight. Whilst we were unable to fully design and test the mechanism for this aspect of the project, the validity of the buoyancy concept was proven and the full design could be achieved in a subsequent project.

(a) Protective Position    (b) Water Landing Position

Figure 60 : Proposed mechanism to enable water landing and take-off

Further areas of interest with this aspect of the design would be the aerodynamic effect of the rotor guard in the water landing position and whether the thrust produced by the rotors could overcome the surface tension between the water and the rotor guards when submerged.

Chapter 5

Thrust Testing of the Ducted Rotor

5.1 Introduction

In Chapter 3, we outlined the theoretical basis for using a ducted (or shrouded) rotor to increase the net thrust of the rotor blade. It was determined in Figure 55(a) that for a duct of the size manufactured for our quadcopter, we can expect an increase in net thrust of around 30%. The most reliable way to test the thrust produced by the rotor is to measure the thrust force directly using a load cell. The thrust produced by the rotor also depends on the power input to the motor, therefore to obtain reliable results, we need to measure the power input as well.

5.1.1 Test Setup

Figure 61:
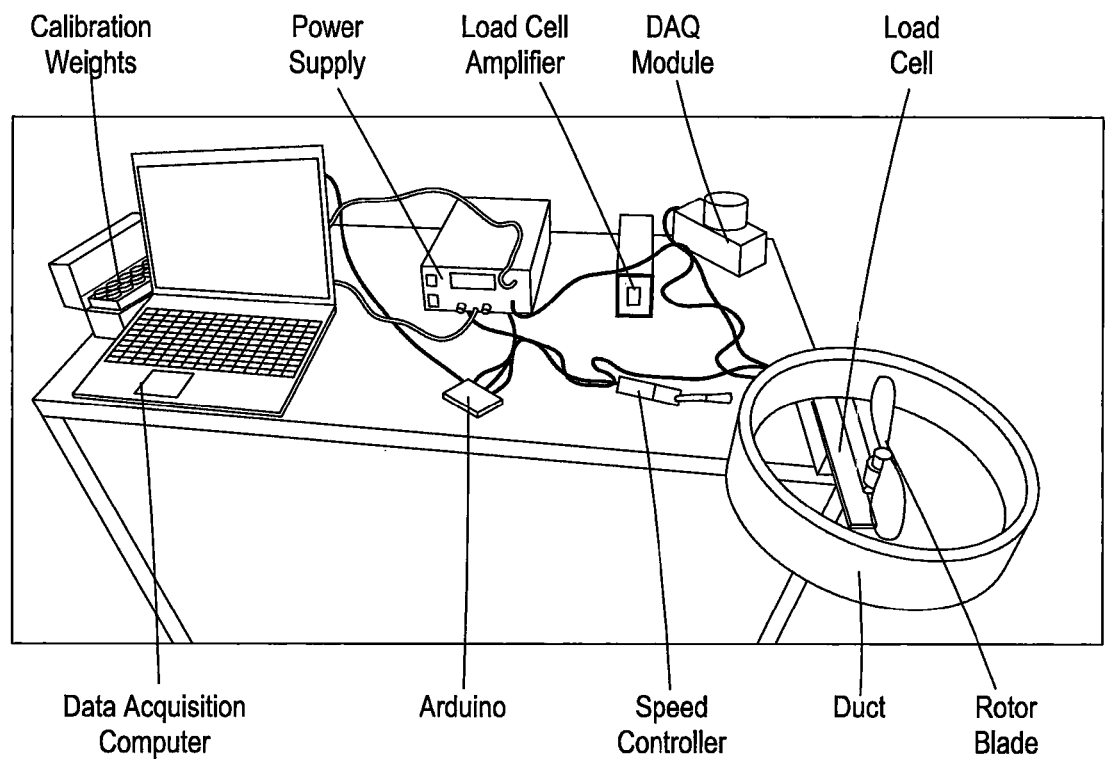
FIG. 61 shows an experimental Setup for thrust testing of ducted rotor blades.

The setup for the load cell testing of the ducted rotor blades is given in Fig. 61. The experiment uses the following apparatus to achieve a reliable result:

1. Load Cell - The load cell, which measures load in the vertical direction only, is attached to the rotor arm with a wooden brace. [Note: An insulative wooden brace is extremely important in this application to restrict the heat transfer from the motor to the load cell, which can significantly distort voltage readings].

2. Arduino and Speed Controller - The Arduino was used to send information to the speed controller to modify the power input to the rotor blade during the test. This enabled us to obtain thrust outputs for varying input power.

Figure 61 : Experimental Setup for thrust testing of ducted rotor blades

3. Power Supply - The power supply is connected to the speed controller as well as the data acquisition computer. The speed controller transmits power from the power supply to the motor depending on the information it receives from the Arduino. The power output from the supply is simultaneously logged by the computer to track the thrust vs power relationship.

4. Load Cell Amplifier - The load cell amplifier takes the output voltage from the load cell and amplifies it into a readable signal. The interface of the amplifier is used to adjust the gains and filters to get a steady, reliable output voltage.

5. DAQ Module - the DAQ module is used to transmit the data from the load cell amplifier to the computer.

6. Data Acquisition Computer - The computer simultaneously logs the power input to the rotor and voltage output from the load cell. This data is then processed to give a thrust output curve for a range of input powers.

7. Calibration Weights - As the voltage reading from the load cell is not always completely steady over long periods of time and varies with the gains applied by the load cell amplifier, it is necessary to calibrate the load cell during each test. The simplest method of calibration is to measure the load cell outputs for known weights across the whole range of the output readings.

Figure 62:
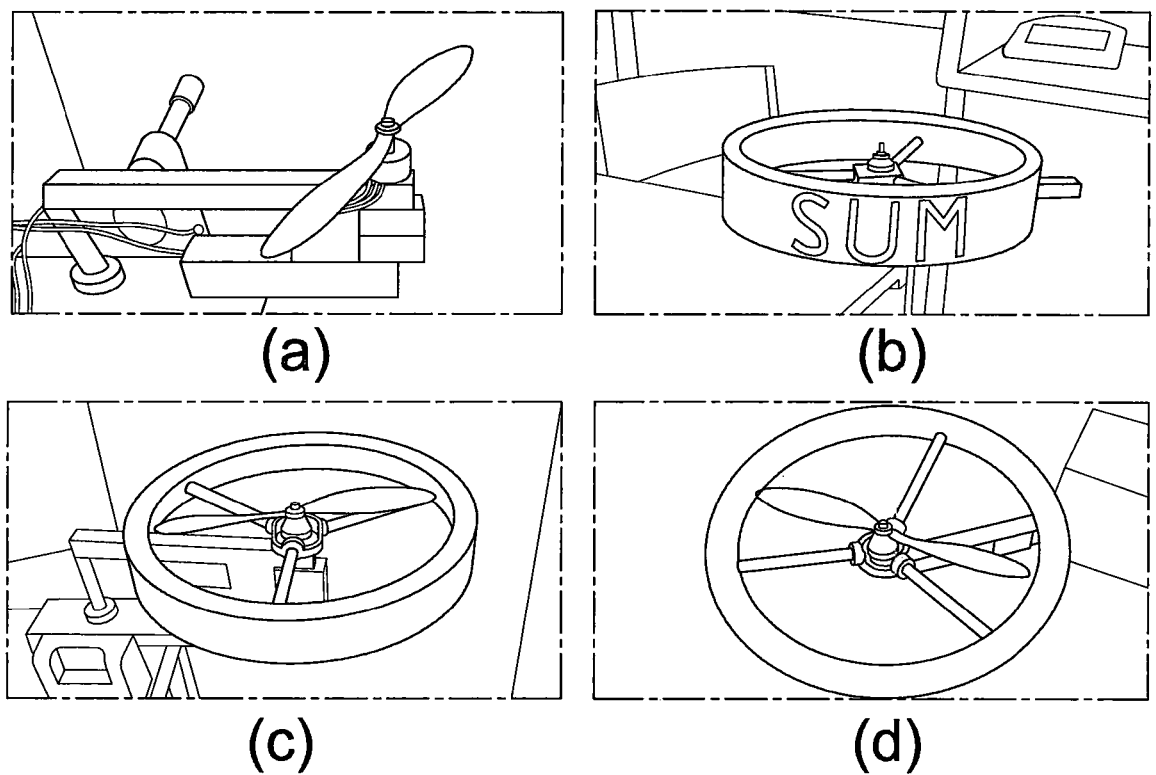
FIG. 62 shows different duct configurations tested.
Figure 63:
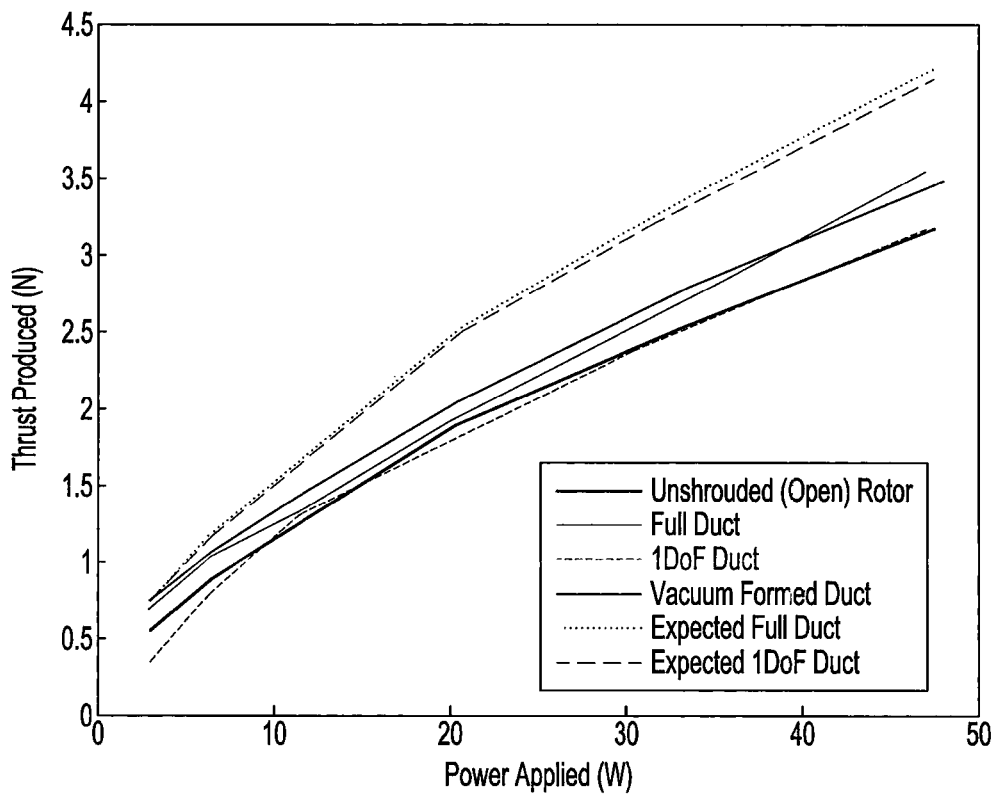
FIG. 63 shows thrust vs power plots for the different duct configurations and the theoretical expectation.

5.2 Thrust Vs. Power Results
5.2.1 Thrust vs Power
The first set of data was obtained from four different test cases, which can be seen in Fig. 62
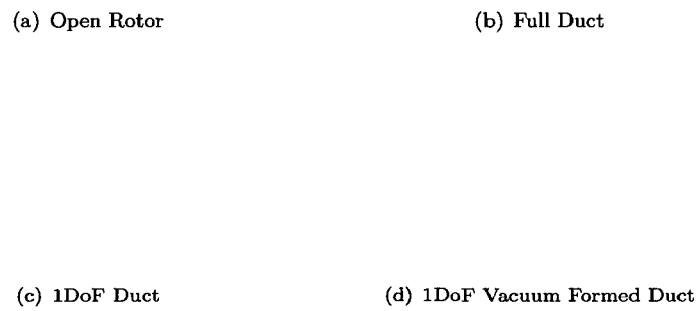
(a) Open Rotor    (b) Full Duct
(c) 1DoF Duct    (d) 1DoF Vacuum Formed Duct
Figure 62 : Different duct configurations tested
Figure 63 : Thrust vs Power plots for the different duct configurations and the theoretical expectation The thrust variation with power for these four test cases is plotted in Fig. 63 alongside the expected thrust power relationship as governed by Equation 3.2 of Chapter 3. Note that in this graph we have not adjusted the values to account for the additional weight of the ducts.

The most notable feature of the graph is that the experimental ducted thrust is 15 - 30% lower than the theoretical expectation. In the case of the full duct, the thrust produced is in the region of 5 - 10% higher than an open rotor. Interestingly the performance of the 1DoF vacuum formed duct matches the thrust produced by the full duct over most of the range of power, despite having a reduced diffuser expansion ratio, $\sigma_e$, and an unconverged trailing edge. The two possible reasons for this are as follows:

- The smoother surface of the vacuum formed plastic over that of the SolarFilm covered duct allows for a cleaner flow through the duct and better diffusion.

- The shallower LE curve cross-section created by the polystyrene ring pushing out the inside of the vacuum formed duct has a beneficial effect on the divergence of the flow.

The causality of this phenomenon could be verified by testing a vacuum formed ring on top of one of the moulded polyurethane foam ducts. If the result is increased thrust over the SolarFilm covered duct then the cause is likely to be the smoothness of the surface, but if the result is the same, then it is likely that a more gradual curvature on the inner surface of the duct would be preferable. This could be obtained by changing the geometry of the cross-section to a different aerofoil shape.

The reason for the discrepancy between the theoretical and experimental result is likely to be a combination of factors, including those mentioned above. Further effects will include blockage from the carbon fibre rods and the test rig (see Section 5.3) and the unrealistic nature of the assumptions in the momentum theory model. Momentum theory assumes only axial momentum is imparted on the flow, however in reality the flow exiting the duct will be vortical in nature and thus the interaction between the duct and the flow, especially at the trailing edge will be far more complex than the model suggests and is likely to involve certain losses. A more realistic model of the flow could be used, for example Blade-Element-Momentum-Theory, which allows for better refinement of the model in terms of the number of blades in the rotor and enables us to factor some of the effects of losses into the flow.

Figure 64:
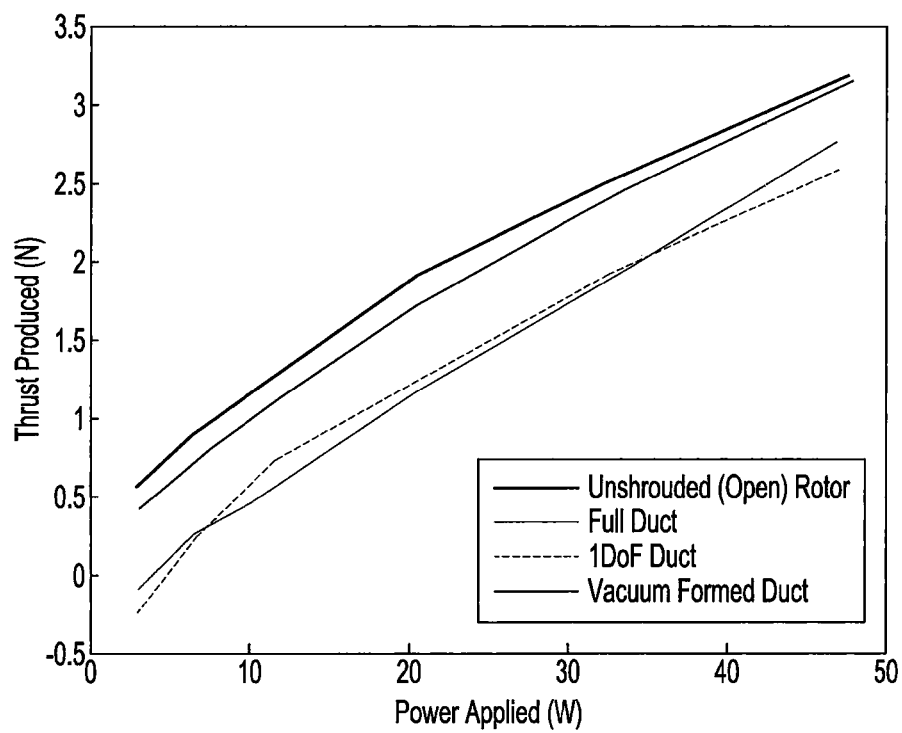
FIG. 64 shows net thrust (thrust—weight of duct) vs power plots for the four configurations.

Figure 64 : Net Thrust (Thrust - Weight of duct) vs Power plots for the four configurations

5.2.2 Net Thrust vs Power

From Fig. 64 we can see that after factoring in the weight of the duct, the open rotor becomes the most beneficial configuration, closely followed by the 1DoF vacuum formed $3^{rd}$ iteration design. The results show the importance of minimising weight in the design of the rotor guards and also the beneficial effect of having a smooth, gradual flow divergence as opposed to a sudden one.

The weight of the duct in the third iteration design was 35.7 grams, with the 1DoF mechanism and connectors weighing the remaining 32.1 grams. If we remove the degree of freedom, we can reduce the weight of the design by changing the way in which the guard is attached. For a static rotor guard it is possible to connect at a single point on the arm, as can be seen in Fig. 65. This configuration does not utilise radial beams and therefore the effect of blockage from the arms will be reduced, as discussed in Section 5.3. The benefits of having a rotational degree of freedom, discussed in Chapters 2 and 4, will be offset by the additional weight and blockage imposed on the design. A trade study between weight and yaw reduction will therefore need to be done on an individual basis, when choosing whether to implement such a system into an MAV design.

Figure 65 : Single attachment point, static rotor guard alternative

5.3 Blockage effects from Carbon Fibre Rods

To further assess the benefits of the design, it was helpful to quantify the effects of blockage induced by the carbon fibre rods. To achieve this we tested the results of a single attachment point (see Fig 65 ) against those of a 2 rod and 3 rod design for the $2^{nd}$ iteration duct (Fig.62(c). The thrust variation with power for these three test cases as well as the open rotor is given in Fig. 66.

Figure 66:
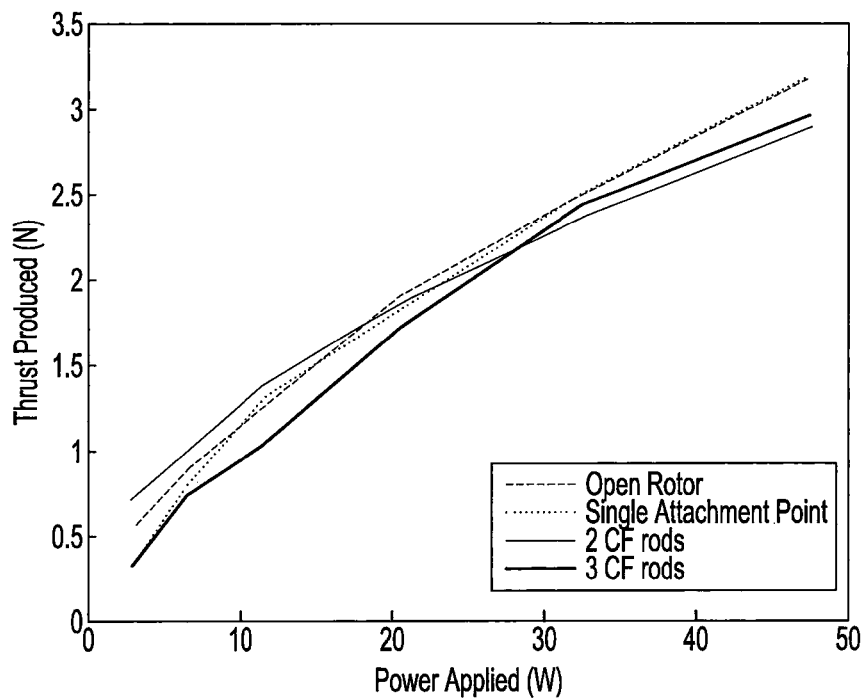
FIG. 66 shows a thrust against power plot for different numbers of rods.

Figure 66 : Thrust against power plot for different numbers of rods

Appendix A

Momentum Theory of an Open and Shrouded Rotor

A.1 Momentum Theory Applied to a Rotor Blade in Hover

The following analysis was used to determine the magnitude of the potential aerodynamic benefits of a shrouded rotor blade (i.e. a rotor blade enclosed by an aerodynamically shaped duct). This analysis is based on conservation laws and assumes inviscid, incompressible and steady, quasi-one-dimensional flow. We therefore also assume that the rotor affects only axial momentum in the flow and does not impart swirl into the wake. The simplest analysis can be undertaken when the rotorcraft is assumed to be in a stationary hover. In this condition, we assume that upstream, at ⓪ in Figures 103 and 67 , the flow is stationary ($v_0 = 0$). Also we assume that ⓔ is far enough downstream that the pressure has been restored to atmospheric. Or in the case of the shrouded rotor blade, the flow has been expanded back to atmospheric pressure ($p_0 = p_e = p_{atm}$).

We can see that for most of the domain, the effect of blockage on the flow is minimal, however at higher levels of input power ($P \geq 0.6P_{max}$), the effect of blockage becomes significant and the thrust lines diverge. The maximum thrust discrepancy between the blocked and unblocked flow is of the order of 8% of the thrust at $T_{max}$

5.4 Improvements to the Duct Design

Based on these results, we can make some suggestions for an improved duct design process, for MAVs of a similar size, in future projects:

- The sizing of the duct most likely needs to be placed nearer to the optimum design point (see Fig. 55 ). It is unlikely that the flow is being fully expanded by a duct of this size, thus nullifying the assumption of expansion to atmospheric pressure made in the analytic model. It would be useful to run wind tunnel tests on the duct to ascertain to what extent the flow velocity at the exit of the duct is being affected by the presence of the duct, from which we could draw conclusions about how the analytical model scales to a duct of this size.

- The smoothness of the duct surface also had a noticeable effect on the thrust, making material selection for the surface of the duct important. In the case of our experiment, vacuum formed plastic was seen to out-perform a SolarFilm covered duct of the same profile.

- Different aerofoil shapes could have been used for the cross section of the duct. By choosing an inner surface with a more gradual curvature, the flow expansion could have been improved.

- Blockage effects could have been reduced by using smaller diameter carbon fibre rods, or perhaps aerofoil shaped rods to minimise the effects in the wake of the rods.

Chapter 6

Conclusions and Further Work

6.1 Conclusions

In Chapter 1 of the project, we established a requirement for novel ways to protect multirotor MAVs for use in cluttered environments, such as rainforests, indoors, or in close proximity to humans. There is currently a lot of interest in this area due to the potential to vastly increase the range of applications and environments in which MAVs can be used. The downfalls of existing rotor protection methods are that they incur too great a penalty in weight, cost, performance and functionality.

By looking at new ways in which we can adapt the structure of an MAV, we can provide better protection and crash robustness, with a reduced penalty in these critical areas. A novel 1DoF rotor guard was proposed in Chapter 2, designed to reduce the yaw rate of the MAV in side-on collisions. The rotor guard was given freedom to rotate independently from the main body of the MAV. It was shown that as a result of this modification, the moment caused by the frictional force in impacts could be decoupled from the MAV frame, such that the yawing moment and therefore yaw rate of the MAV would be reduced in impact, allowing for better stability and improved remote piloting capabilities. An outline of the design and manufacturing processes of the 1DoF system was given in Chapter 4. The resulting final design was flight tested and collision tested and was found to generally improve the yaw response of the MAV as suggested by the analytical model. Further work is required to explicitly quantify the effect of the yaw reduction, thus allowing for a trade study between the impact performance improvement and weight increase incurred by enabling the rotational degree of freedom.

The buoyancy of the resulting designs were also analysed and it was found that the use of low density foams in the structure would enable an MAV of up to 2kg to float using the buoyancy force provided by the rotor guards. A mechanism was proposed by which the position of the rotor guards could be adjusted to enable it to land on water without submerging the central hub, where the majority of the electronics are situated.

In Chapter 3, the implementation of an aerodynamically shaped duct was discussed and estimates for the performance effects of such a rotor casing were calculated. It was found that by using a shrouded rotor, it is possible to offset the weight penalty of having complete circumferential rotor coverage. It was also shown that with an optimally designed duct, we could expect up to 40% net thrust increase (taking into account the weight of the duct). In Chapter 5, the effect of the duct on the thrust produced by the rotor was experimentally calculated using a load cell. It was found that the ducted rotors outperformed the open rotor in terms of raw thrust produced by up to 10%, however when the weight of the duct was factored into the calculations, the net thrust produced was 8 - 20% worse than the open rotor depending on the weight of the duct. Also the effect of blockage from the carbon fibre rods was calculated to be between 0 - 5% of the overall thrust produced. Suggested improvements to the duct design include a larger duct (closer to the optimum size) a smoother inner surface and an aerofoil cross section with a more gradual curvature.

6.2 Further Work

- The next stage of the 1DoF rotor guard design process would be to repeat the testing with the necessary apparatus to deduce the yawing moment of the MAV as a function of the collision angle $\beta$ and static friction coefficient $\mu_s$. We would therefore be able to plot yawing moment against $\beta$ and verify whether the MAV responded to collisions in the way predicted by the analytical collision model proposed in Chapter 2. Trade studies between rotor guard weight increase and yaw reduction could then be made.

- The rotor blade duct should be redesigned with the information obtained in the thrust testing experiment in Chapter 5. Finding a less dense alternative to Polyurethane foam, that will still allow for easy moulding and high strength to weight would also be important in the second iteration of the duct design. As an alternative, a shell structure could be used provided the material was strong enough to withstand the impact loads, e.g. carbon fibre.

- The water landing mechanism outlined in Section 4.6.2 can be designed, manufactured and implemented as a novel way of increasing the functionality of MAVs, for minimal extra weight, utilising the dual functionality of the rotor guards as protective structures as well as floatation devices.

Figure 103:
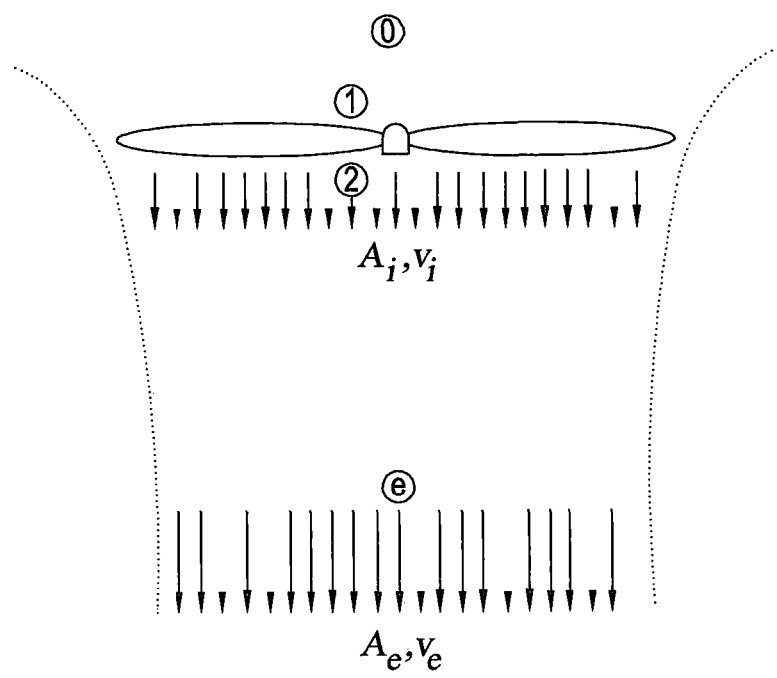
FIG. 103 shows a streamtube applied to the flow through an open rotor blade.

Figure 103 : Streamtube applied to the flow through an open rotor blade

A.1.1 Open Rotor

Using conservation laws on Figure 103, the following result is obtained:

$$\text{Conservation of Mass:} \quad \dot{m} = \rho A v_i = \rho A_e v_e \qquad (A.1)$$

$$\begin{aligned}\text{Conservation of Momentum:} \quad T &= \dot{m}(v_e - v_0) \\ &= \dot{m} v_e\end{aligned} \qquad (A.2)$$

$$\begin{aligned}\text{Conservation of Energy:} \quad P_i &= KE_e - KE_0 \\ &= \frac{1}{2}\dot{m} v_e^2\end{aligned} \qquad (A.3)$$

Bernoulli's Equation can be used to get pressures at ① ($p_1$) and ② ($p_2$) and therefore the pressure difference across the disk ($\Delta p = p_2 - p_1$).

$$p_0 + \frac{1}{2}\rho v_0^2 = p_1 + \frac{1}{2}\rho v_1^2$$

$$p_2 + \frac{1}{2}\rho v_2^2 = p_e + \frac{1}{2}\rho v_e^2$$

$$\Delta p = p_2 - p_1$$

$$= (p_e - p_0) + \frac{1}{2}\rho v_e^2$$

$$= \frac{1}{2}\rho v_e^2 \tag{A.4}$$

The actuator disk model of the rotor can therefore be used as an alternative method to calculate the thrust, T, produced by the rotor and the ideal power requirement, $P_i$ using the following relations:

$$T = \Delta p A \tag{A.5}$$

$$P_i = T v_i \tag{A.6}$$

Combining equations A.1, A.2, A.4 and A.5 we can obtain the relationship between the velocity of the flow at the rotor blade $(v_i)$ and at the exit $(v_e)$:

$$\rho A v_i v_e = \Delta p A$$

$$\rho v_i v_e = \frac{1}{2}\rho v_e^2$$

$$v_e = 2 v_i \tag{A.7}$$

Now substituting this result back into the conservation equations gives velocity and ideal power requirement in terms of thrust and actuator disk area:

$$v_i = \sqrt{\frac{T}{2\rho A}} \tag{A.8}$$

$$P_i = \frac{T^{\frac{3}{2}}}{\sqrt{2\rho A}} \tag{A.9}$$

A.1.2 Shrouded Rotor

A model of the flow through the rotor when it is surrounded by a converging and diverging duct (shrouded rotor) can be seen in Figure 67 . The flow is expanded by the presence of the duct, which changes the velocity profile and thus effects the thrust output of the rotor.

Figure 67 : Model of the flow through a shrouded rotor blade

The ratio between the area at the diffuser exit ($A_e$) and the area at the propeller ($A$) is the *diffuser expansion coefficient*, $\sigma_e$:

$$\sigma_e = \frac{A_e}{A}$$

As the diffuser exit area is now known, the conservation of mass equation gives the relationship between rotor velocity and exit velocity.

$$\text{Conservation of Mass:} \quad \dot{m} = \rho A v_i = \rho A_e v_e \quad (A.10)$$

$$\rightarrow v_e = \frac{A}{A_e} v_i = \frac{v_i}{\sigma_e} \quad (A.11)$$

Using the conservation of momentum and energy equations we can also derive the following relations, where the subscript '$SR$' denotes shrouded rotor. The thrust and power values below are the total values, made up of thrust from the rotor and thrust from the duct ($T_{SR} = T_{rotor} + T_{duct}$).

$$\text{Conservation of Momentum:} \quad T_{SR} = \dot{m} v_e = \rho A \frac{v_i^2}{\sigma_e}$$

$$\rightarrow v_i = \sqrt{\frac{\sigma_e T_{SR}}{\rho A}} \quad (A.12)$$

Conservation of Energy: $P_{i,SR} = \frac{1}{2}mv_e^2$ $$= \frac{1}{2}\rho A \frac{v_e^3}{\sigma_e^2} \qquad (A.13)$$

$$= \frac{T^{\frac{3}{2}}}{\sqrt{4\sigma_e \rho A}}$$

The actuator disk model is only required to derive the expression for the thrust produced by the rotor alone:

$$T_{rotor} = \Delta p A \qquad (A.14)$$

$$\rightarrow \frac{T_{rotor}}{T_{total}} = \frac{\frac{1}{2}\rho A v_e^2}{(\rho A v_i) v_e}$$

$$= \frac{1}{2\sigma_e} \qquad (A.15)$$

Note that we can recover the open rotor result by setting $T_{rotor} = T_{total}$, giving an open rotor expansion coefficient of $\sigma_e = \frac{1}{2}$.

A.2 Cross-section of the Duct

Figure 102:
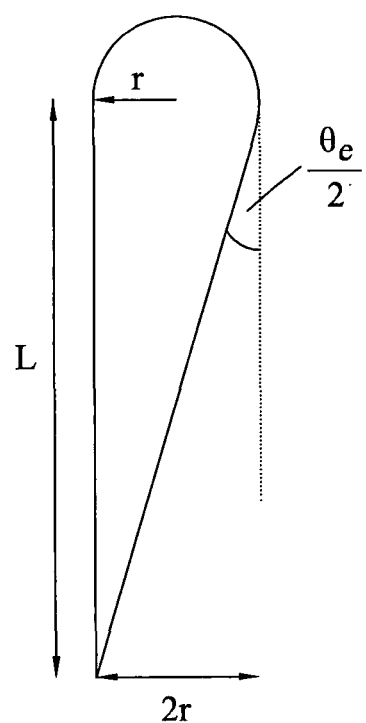
FIG. 102 shows another cross-section of duct, with varying leading edge radius (r)

Figure 102 shows the geometry of the duct and how it varies with the radius of the leading edge, $r$.

Figure 102 : Cross-section of duct, with varying leading edge radius ($r$)

Appendix B
Material Selection Graph

Figure 68: Strength vs density graph for material selection

Appendix C

Weight Breakdown Tables

C.1 First Iteration Design

| Component Weight Breakdown ||||
|---|---|---|---|
| Component (Number) | Individual Weight (g) | Total Weight (g) | Percentage of Overall Weight |
| Base Plate | 84.4 | - | 40.1 |
| Top Plate | 73.5 | - | 34.9 |
| Bolts (12) | 2.97 | 35.64 | 16.9 |
| Nuts (36) | 0.43 | 15.48 | 7.4 |
| CF Rollers (12) | 0.11 | 1.32 | 0.63 |
| Total Weight | 210.3 g | | |

TABLE C.1: Component Weight breakdown for the $1^{st}$ iteration rotor guard design

C.2 Second Iteration Design

| Component Weight Breakdown ||||
|---|---|---|---|
| Component (Number) | Individual Weight (g) | Total Weight (g) | Percentage of Overall Weight |
| Foam Duct | 58 | - | 53.7 |
| Bearing | 13.8 | - | 12.8 |
| Inner Hub | 3.5 | - | 3.2 |
| Outer Hub | 9.0 | - | 8.3 |
| CF Tubes (3) | 2.9 | 8.7 | 8.1 |
| SolarFilm | 15.0 | - | 13.9 |
| Total Weight | 108 g | | |

TABLE C.2: Component Weight breakdown for the $2^{nd}$ iteration rotor guard design

C.3 Third Iteration Design

| Component Weight Breakdown | | | |
|---|---|---|---|
| Component (Number) | Individual Weight (g) | Total Weight (g) | Percentage of Overall Weight |
| Foam Duct | 15.5 | - | 22.8 |
| APET Plastic Shell | 20.2 | - | 29.7 |
| Bearing | 13.8 | - | 20.3 |
| Inner Hub | 2.9 | - | 4.3 |
| Outer Hub | 6.7 | - | 9.9 |
| CF Tubes (3) | 2.9 | 8.7 | 12.8 |
| Total Weight | 67.8 g | | |

TABLE C.3: Component Weight breakdown for the $3^{rd}$ iteration rotor guard design

3 Parametric modelling and analysis of the circular origami structure

3.1 Parametric modelling

Figure 69:
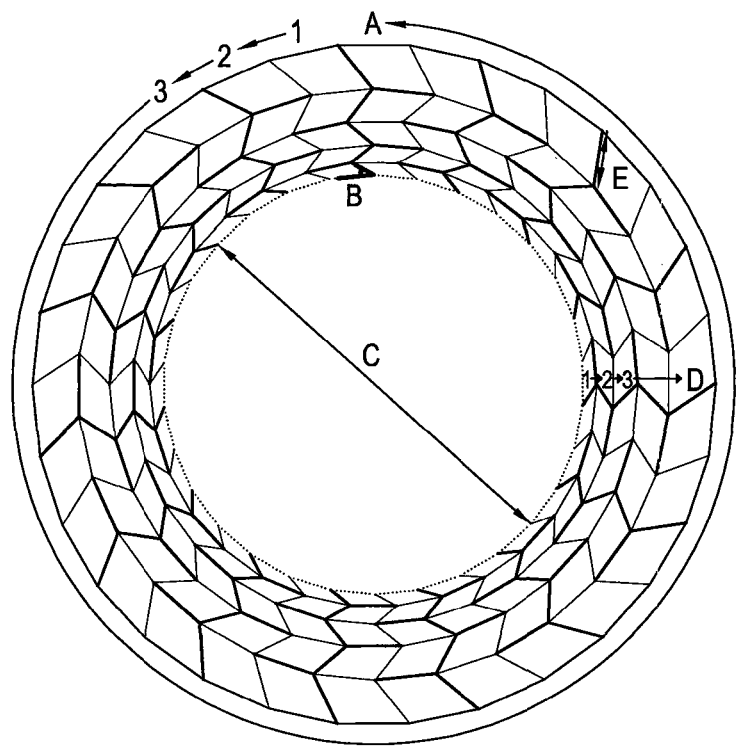
FIG. 69 shows geometric parameters of the origami pattern.

Modelling the protection structure as a function of its geometric parameters enables us to easily produce an array of different models which serve as inputs to Finite Element simulations. After processing the FEA results, the structural behaviour of the structure will be able to be defined empirically as a function of its initial geometric parameters. Figure 69 shows the five parameters which fully-define the circular origami pattern used. They are:

Figure 69 : Geometric parameters of the origami pattern:
A. Number of radial segments; B. Pattern angle; C. Inner diameter;
D. Number of concentric layers; E. Width of external facets

- A. Number of radial segments: This is the number of segments in which the circle in divided. It has to be an even number to keep the number of mountain and valley fold lines equal. In this model, it ranges from 30 to 70.

- B. Pattern angle: Changing one angle will affect all others as there is only one degree of freedom dictating all angles in this origami pattern. In this model, we decide to change the acute angle of the most internal facets, which can range from 20 deg to 50 deg.

- C. Inner diameter: As seen in the next section, the inner diameter shrinks as the model is folded but an empirical function can be established from Freeform Origami to estimate the value it needs to have in the two-dimensional pattern for the diameter of the folded structure to be constant at 149.8 mm, to fit around the frame of the small quadrotor used.

- D. Number of concentric layers: Because of time constraints, this value is held constant at 5 in our model, and we will not investigate the effects of varying this parameter on structural performance.

- E. Width of external facets: The width of the cells on the external edge of the pattern have an extra degree of freedom. This parameter is expressed as a factor of the unchanged width and is set to range from 0.6 to 1.4.

3.2 Origami folding behaviour

The two-dimensional drawing of the origami pattern is used as an input to FreeformOrigami, a software which creates a triangular mesh of the pattern and folds it into a three-dimensional object along predefined mountain and valley lines (respectively the thick and thin solid lines in Figure 69). As our model is a non-rigid-foldable origami structure, it is important to triangulate each facet to replicate the bend endured by each facet in folding.

Figure 70:
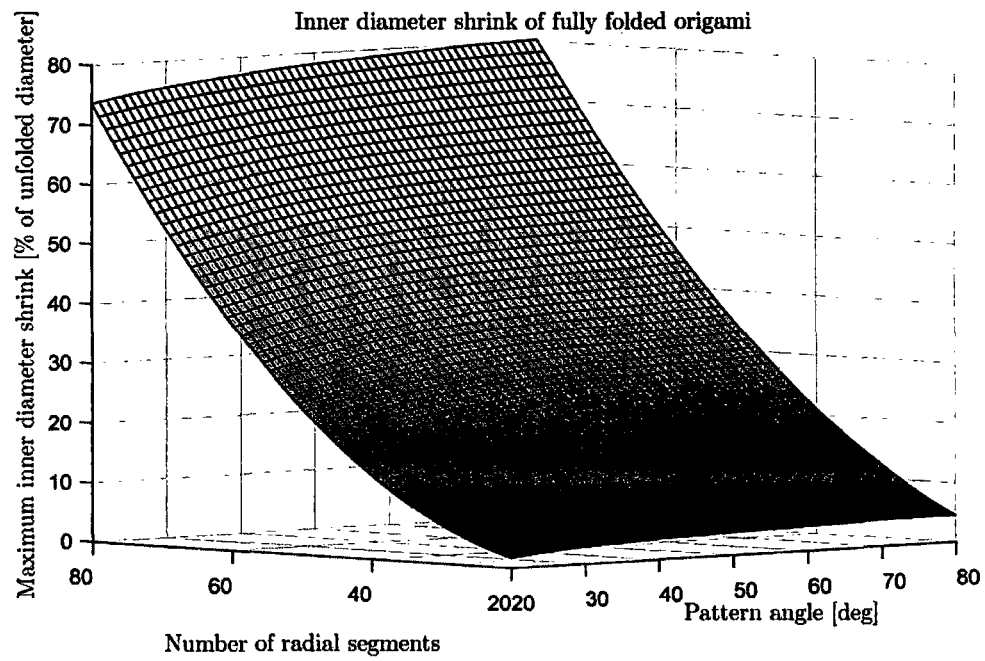
FIG. 70 shows that the inner diameter of the fully-folded origami depends on two parameters.

Figure 24 shows different degrees of folding in FreeformOrigami. We notice the diameter of the structure shrink as it is folded. The extent at which the inner diameter shrinks can be evaluated with a measuring tool in the software on a series of different models. It is found to depend on both on the pattern angle (Parameter B) and the number of radial segments (Parameter C). Using the Basic Curve Fitting tool in MATLAB, it is possible to establish a mathematical function relating the extent at which the inner diameter of the structure shrinks to these two initial geometric parameters (Figure 70). As a result, the diameter of the fully folded origami structures can be estimated for any set of parameters. The numerical details of this analysis can be found in Appendix A.

(a) Flat sheet (b) Naturally folded (c) Fully folded

Figure 24 : Folding an origami structure in FreeformOrigami

Figure 70 : The inner diameter of the fully-folded origami depends on two parameters The naturally folded state (Figure 24) is the relaxed state in which the origami structure remains after it has been folded by hand and endured plastic deformation along its fold lines. It has a complex dependency on the manufacturing process, notably on the degree of plastic deformation along the fold lines and the fatigue endured by the structure after multiple impact tests.

It is important to know the value which the inner diameter of the two-dimensional origami pattern needs to have for the naturally folded origami to be assembled on the 149.8 mm diameter drone frame used. As we know the value of the diameter of the fully folded model from our empirical relation, we can measure the diameter of our manufactured origami structure and assume the following linear relation is constant for all set of geometric parameters:

$$\frac{\text{inner diameter}_{flat\ sheet} - \text{inner diameter}_{naturally\ folded}}{\text{inner diameter}_{flat\ sheet} - \text{inner diameter}_{fully\ folded}}$$

This formula, together with the empirical function relating the geometric parameters to the diameter of the fully folded model, can be inserted in the parametric model to eliminate one parameter, the diameter of the pattern. We are left with 3 variables defining the geometry of our model. Our manufactured, reference model ( Figure 1.1*) defined with a number of radial segments A=40, a pattern angle B=32.5 deg and an external facet width E=0.832.

3.3 Finite Elements simulations setup

By performing a series of identical Finite Elements simulations on origami structures with varying geometric parameters, it will be possible to relate those parameters directly to the stiffness and energy absorption capabilities of the structure.

The folded model obtained from FreeformOrigami is a three-dimensional shell object. When importing it into Abaqus CAE, thickness is added to it with the surface of the object as the mid-plane. This means that while the geometry of the structure is accurately represented in these models, the nature of the fold lines (with perforations and plastic deformation) is not. To account for this, a separate study focused on the parametric analysis of fold line perforations is contained in Chapter 4.

Figure 71:
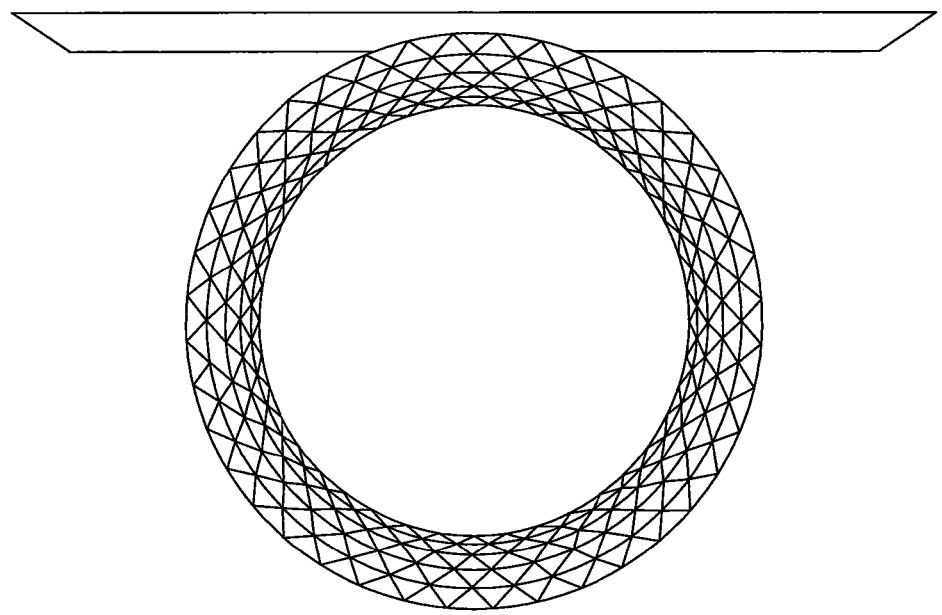
FIG. 71 shows a Finite Elements simulation setup for a simple compression.

Figure 71 shows the load configuration in Abaqus. As this study is only concerned about simple horizontal impact, the simulation involves displacing a vertical rigid plate towards the centre of the protection structure. For the purpose of a comparative parametric analysis, it is important to be consistent in the choice of loads and boundary constraints imposed on the structure. To analysis exclusively the structural behaviour on the origami, the other components in the assembly (the quadrotor and the supportive frame) are omitted from this series of simulations and replaces by a a rigid body constraint on the inner most vertices of the origami structure.

Figure 72:
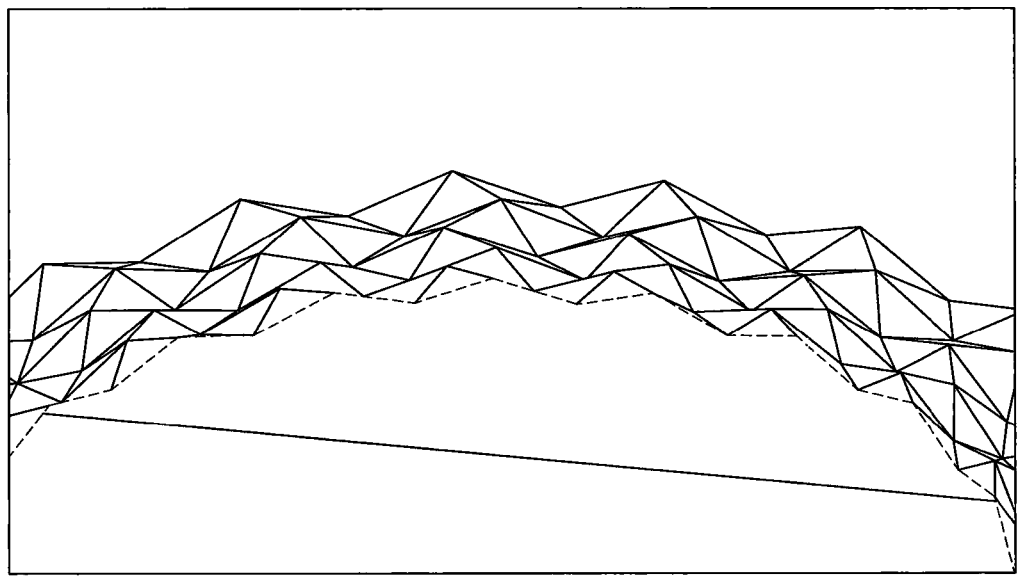
FIG. 72 shows a rigid body constraint on vertices.

Figure 72 shows this constraint in Abaqus, where the vertices marked in red are part on an encastrated rigid body, meaning they can not rotate or translate in any direction.

Figure 71 : Finite Elements simulation setup for a simple compression

Figure 72 : Rigid body constraint on vertices marked in red

To visualise and understand the structural behaviour of origami models under compression, it is best to reduce kinetic effects by performing quasi-static simulations. For all tests performed, the rigid plate is displaced at a constant speed of 5 mm/s towards the fixed model. This is sufficient to eliminate kinetic effects considering the elasticity of origami, and any slower would be too computationally expensive.

Figure 73:
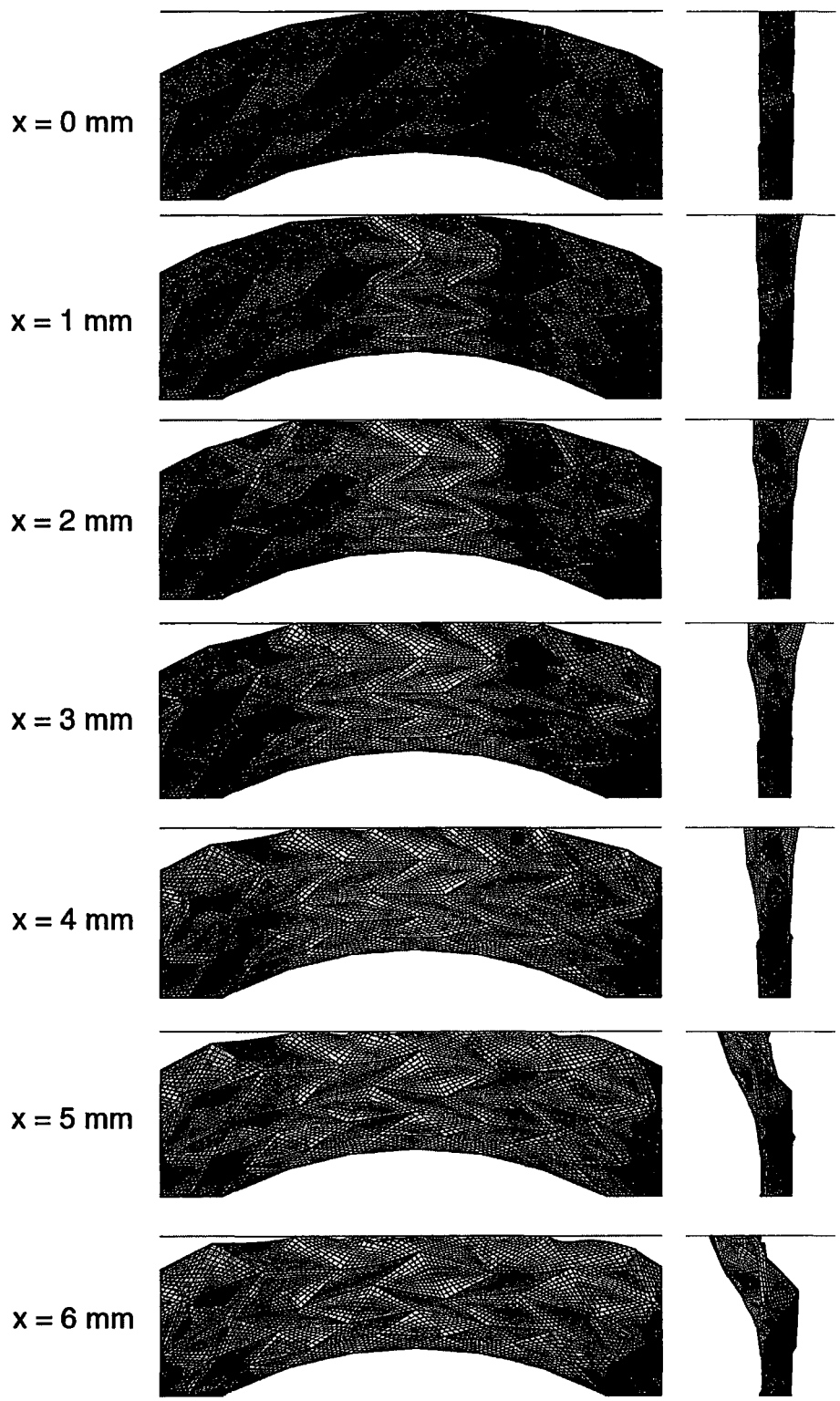
FIG. 73 shows front and side views of the compression of the reference model with frictionless contact.

Figure 73 shows the visual output of the simulation of our reference model (A = 40, B = 32.5 deg, E = 0.832). In the Abaqus Interaction module, the contact property between the plate and the structure in this case is set to be frictionless.

Figure 73 : Front and side views of the compression of the reference model with frictionless contact The structure can be seen to slip out of plane after an initial planar contraction. The force vs. displacement curve (Figure 74) confirms this slip in the form of a sudden drop in the reaction force on the plate, after a displacement of x = 4.33 mm.

The first derivative of this curve indicates two punctual increases in its gradient at x = 1.74 mm and x = 2.47 mm. From the visual output, we notice these points correspond to the moments when external vertices get in contact with the plate. This triggers the facets and fold lines which are linked to these vertices to experience bending, which stiffens the structure.

However, the gradient then slowly decays until the slip point. As the structure is not perfectly symmetrical about its horizontal plane and compression modifies the shape and stress field of the structure, it will eventually yield as the force imposed on it increases.

Figure 74:
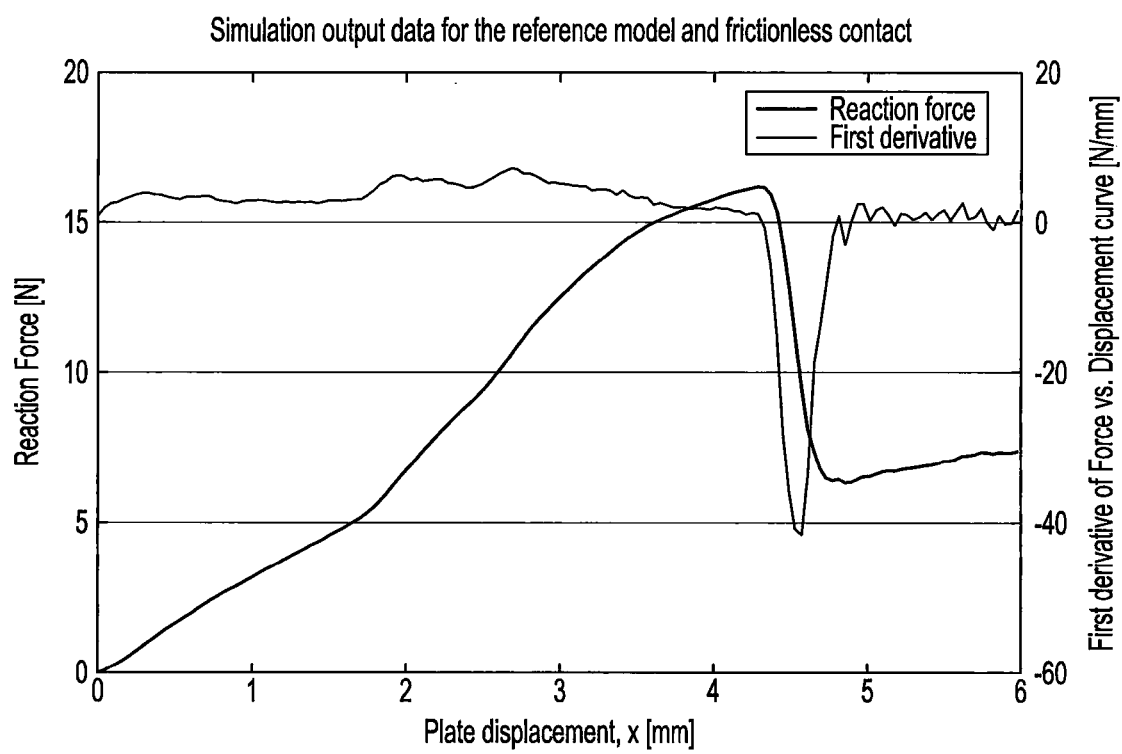
FIG. 74 shows reaction force vs. displacement of the plate for the reference simulation.

Figure 74 : Reaction force vs. displacement of the plate for the reference simulation This type of curve will be obtained for all models tested, and specific values need to be outputted to characterise the structural performance of each model for the purposes of choosing an optimum design. These outputs are:

- The initial elastic gradient [MPa]. As discussed, this value varies as the structure is compressed. To maintain consistency, it is will be recorded as the average gradient in the the range of forces between 0 N and 5 N.

- The energy absorbed by the structure until it slips out of plane [mJ]. This value is the area under the force vs. displacement curve from the start of the compression to the moment the force drops, as is evaluated using the trapz command in MATLAB. It is an indication of how unstable the structure is as the compression force imposed on it increases, and how prone it is to slipping out of plane. As will be seen, this value depends heavily of the friction coefficient of the simulation, but for the purposes of this comparative analysis, the frictionless case is chosen as it pin points a sudden slip at a clear displacement value.

- The mass of the structure [g]. This is obtained by measuring the surface of the origami pattern in Rhinoceros, and multiplying it by the thickness of the sheet and density of polypropylene. It is an important design consideration as it affects the aerodynamic performance and stability of the flying robot, as well as its momentum for a given impact speed.

3.4 Parametric comparative analysis

Figure 75:
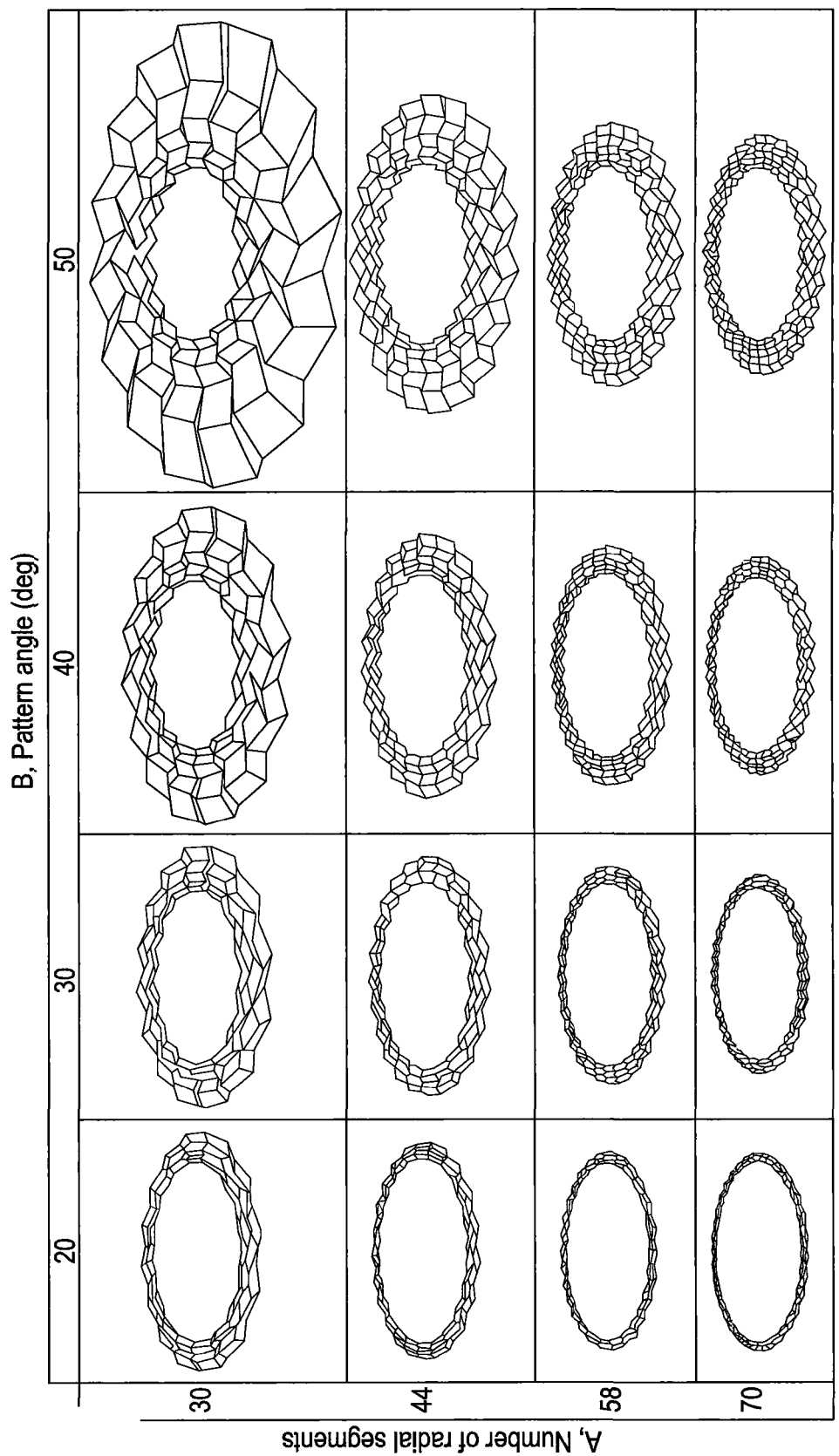
FIG. 75 shows a matrix of models tested for parameters A and B whilst E=1.

The two parameters which affect the overall geometry of the structure (A, the number of radial segments and B, the pattern angle) will compose a matrix of models to be simulated (Figure 75). As the last parameter (E, the width of external facets) has a more singular effect on the structural behaviour of the model, it will compose a simple array of models which all have the reference values for parameters A and B.

Figure 75 : Matrix of models tested for parameters A and B whilst E=1

Figure 76:
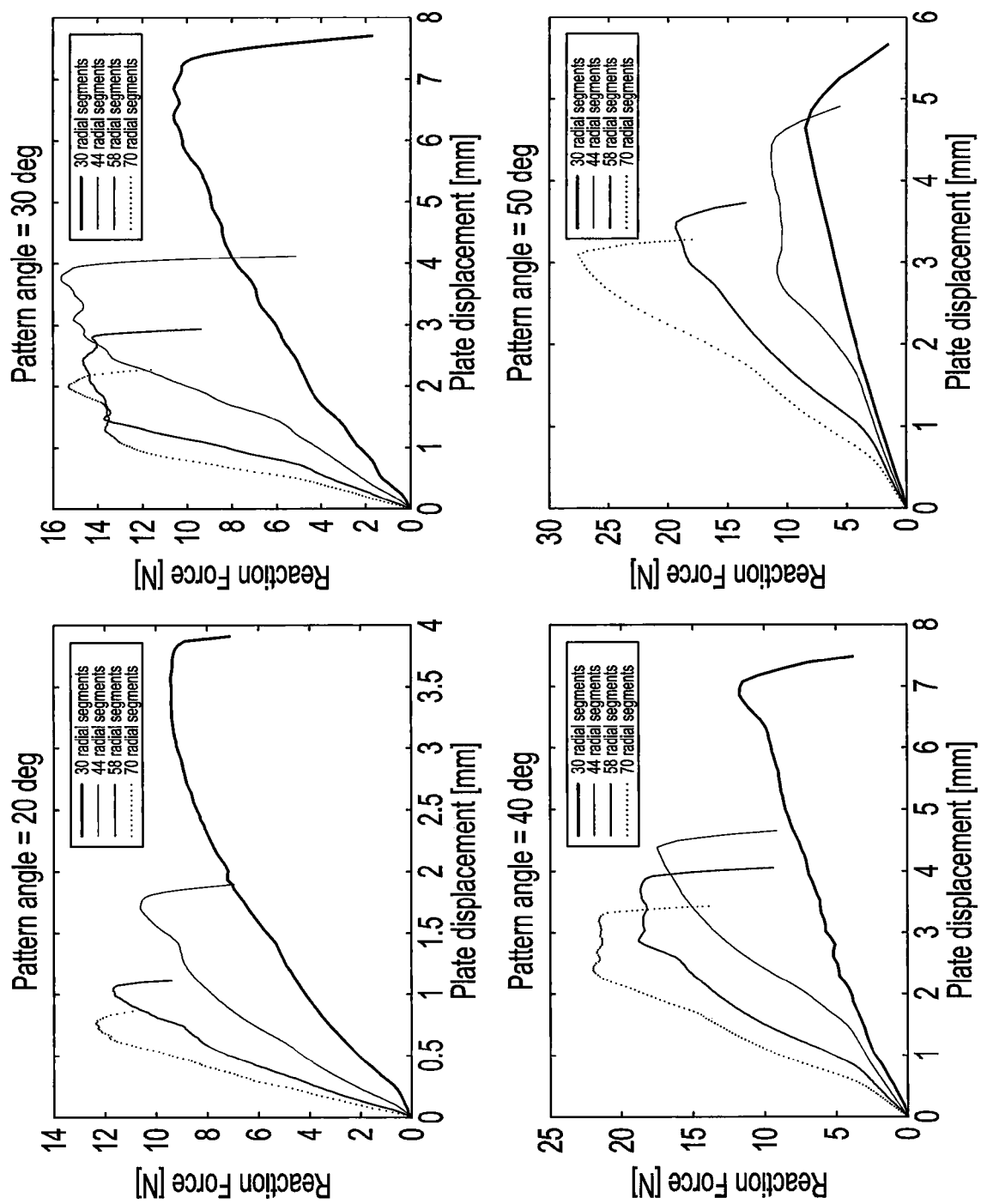
FIG. 76 shows output data from simulations of the matrix of models with varying parameters A and B.

Figure 76 shows the output data from these 16 simulations on models with varying parameters A and B. It is clear that as the number of radial segments on the pattern is increased, so is the stiffness of the structure. However, this also has the effect of shortening the time during which the structure is stable under compression it slips out of plane.

Figure 76 : Output data from simulations of the matrix of models with varying parameters A and B

3.5 Discussion of simulation output parameters

As previously explained, the stiffness gradient for each model under compression experiences an increase as external vertices become in contact with the plate. To illustrate this phenomenon, Figure 77 in a top view of the reference model displaying the angles of all external vertices. As the number of radial segments is increased, the angles between each successive line in Figure 77 decreases proportionally, and more external facets will be in contact with a compressing plate for a given displacement. Consequently, more fold line will be sollicitated to contribute to supporting the applied force.

Figure 77:
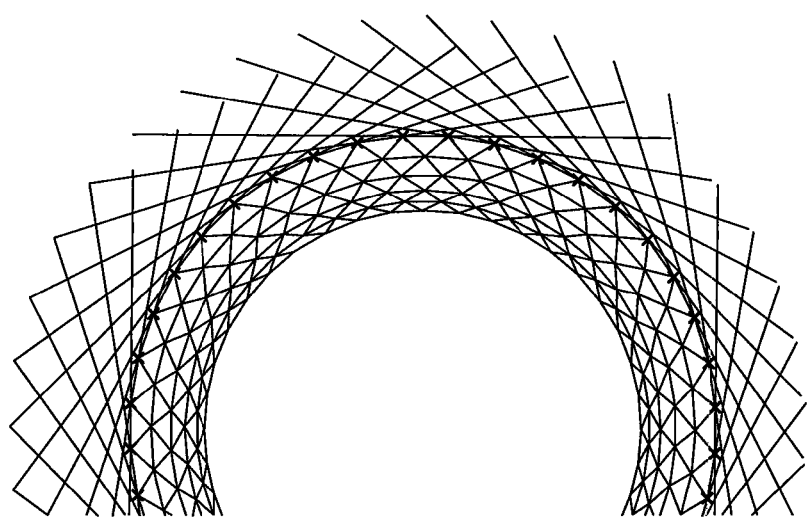
FIG. 77 shows the stiffness of each model in the parametric matrix.

Figure 77 : Stiffness of each model in the parametric matrix

Figure 78:
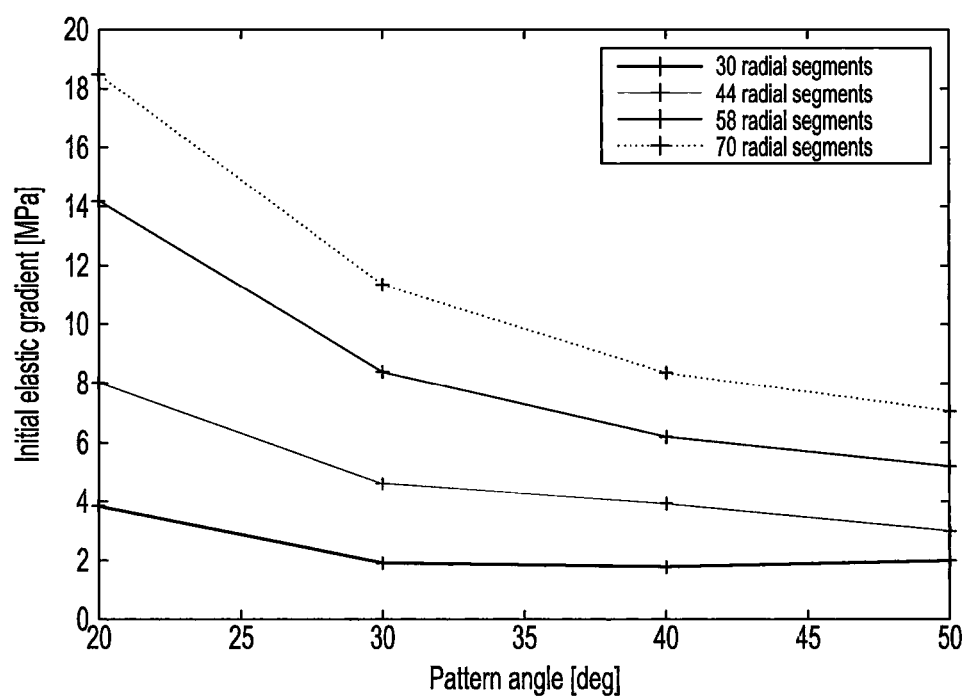
FIG. 78 also shows the stiffness of each model in the parametric matrix.

Figure 78 shows the average elastic gradients measured for each curve in the range of force between 0 N and 5 N. Using the MATALB Basic Fitting tool, these 16 measurements can serve as a baseline to empirically estimate the stiffness a model with any initial geometric parameters. It is clear from these measurements that the number of radial segments has a direct effect on the stiffness for the reasons just mentionned.

Figure 78 : Stiffness of each model in the parametric matrix

However, we also notice that decreasing the pattern angle increases the stiffness. Indeed, doing so creates a more compact structure, as the number of fold lines is maintained but the width of the structure decreases. As a consequence, facets are less likely to experience local buckling as their projected length in the direction of the compressive load is reduced.

Figure 79:
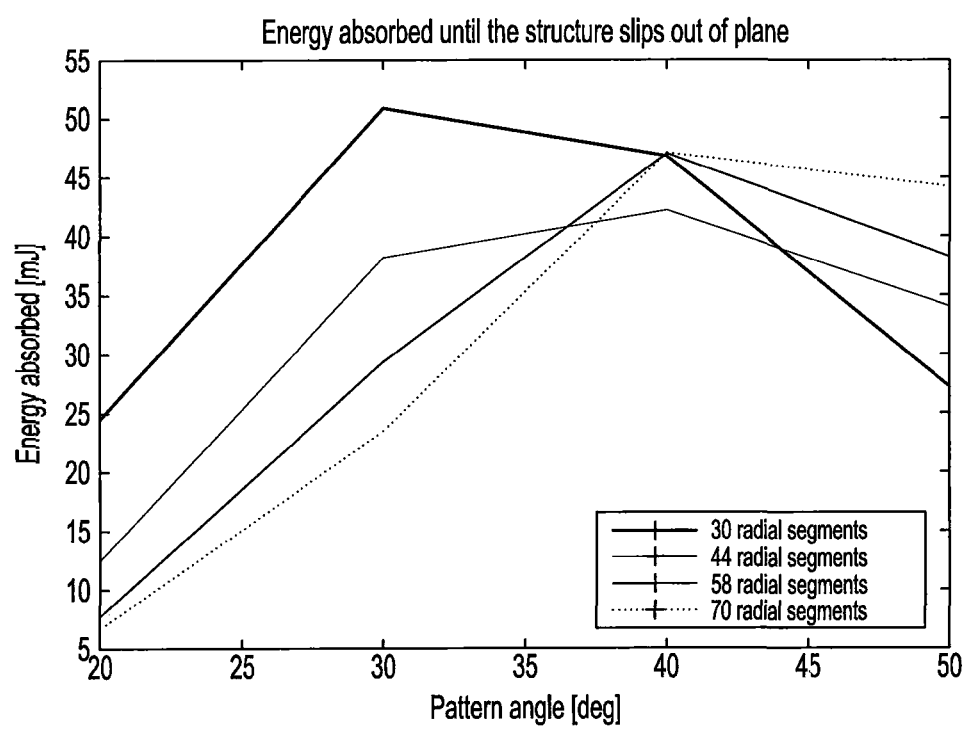
FIG. 79 shows the energy absorbed by each model in the parametric matrix.

The next output parameter to consider in the prospect of defining an optimum design is the energy absorbed by the origami structure (the area until the force vs. displcamenet curve) until it slips out of plane in the case of frictionless contact (Figure 79 ). This is also a measure of the stability of the structure under compression.

Figure 79 : Energy absorbed by each model in the parametric matrix

Figure 80:
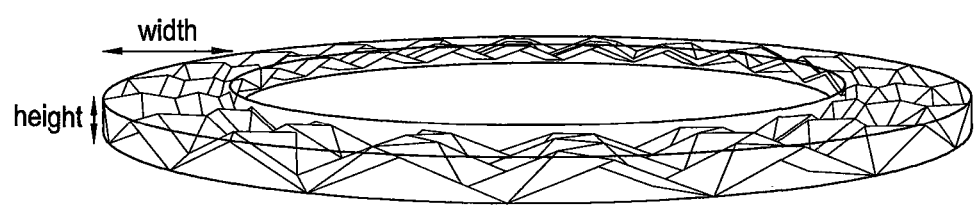
FIG. 80 shows a rhinoceros model evaluating projected height and width of a folded origami structure.
Figure 81:
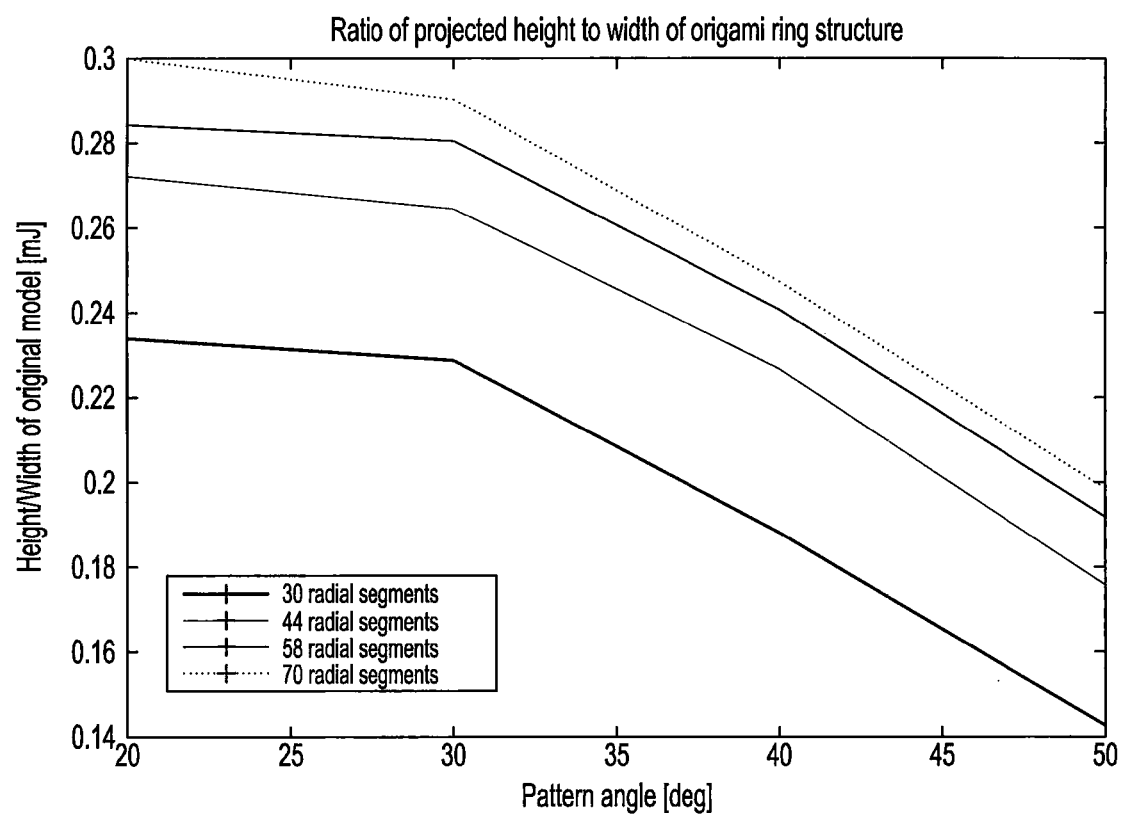
FIG. 81 shows a ratio of height to width of each model in the parametric matrix.

For the same reason as the stiffness of the model being low, the energy absorbed is low if the pattern angle is too high. To illustrate this, Figure 80 shows a ring-shaped solid in Rhinoceros fitting around the reference origami model. This ring can be fully defined according to its height and width. Figure 81 shows the ratio of these two measurements.

Figure 80 : Rhinoceros model evaluating projected height and width of a folded origami structure Figure 81 : Ratio of height to width of each model in the parametric matrix If the projected height of the structure on the compressing plate is small in proportion to its width, it will be more unstable and prone to buckling. By increasing the pattern angle of the structure, it not only get thinner (in proportion to its height) but there are also less fold lines and per unit width and the facets are each elongated in the direction of the force applied. The structure therefore become less stiff and more unstable.

However, we also notice in Figure 79 the energy absorbed for low pattern angles is also low. In this case, the stiffness is so high that the structure slips quickly out of plane due to a high applied force before having absorbed a lot of energy.

Together, the analysis of the stiffness and the energy absorption capabilities of this model tell us that whilst increasing the number of radial segments makes the structure stiffer, it also makes it more prone to slip out of plane at impact.

Figure 82:
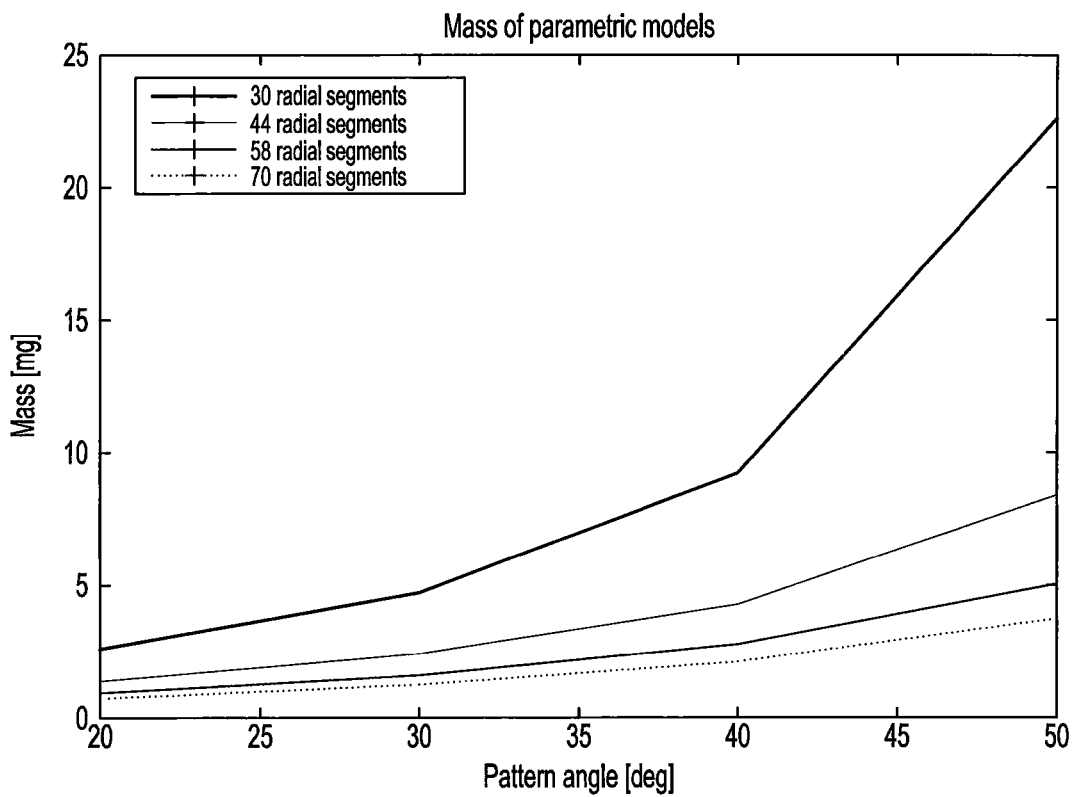
FIG. 82 shows the mass of each model in the parametric matrix.

The last design consideration is the mass of the structure , which is obtained from measuring the surface of the origami pattern on Rhinoceros and multiplying it by the thickness of the sheet and the density of polypropylene. As can be seen in Figure 82, reducing the pattern angle and increasing the number of radial segments creates the most lightweight structures (less than 5 grams). Again, these curves can be extrapolated to formulate a function providing the mass of models of any geometry. This information, as well as the projected width of the structure, are important ingredients to consider in the prospect of a study of the aerodynamics and flight stability of the assembly.

Figure 82 : Mass of each model in the parametric matrix

Whilst reducing the number of radial segments and the pattern angle both contribute to creating a stiffer and more lightweight structure, a simple merit function of our three design outputs (Figure 83 ) indicates that a more optimum design can be found by choosing a pattern angle of 30 deg, because of the instability which arises from using stiff structures.

Figure 83:
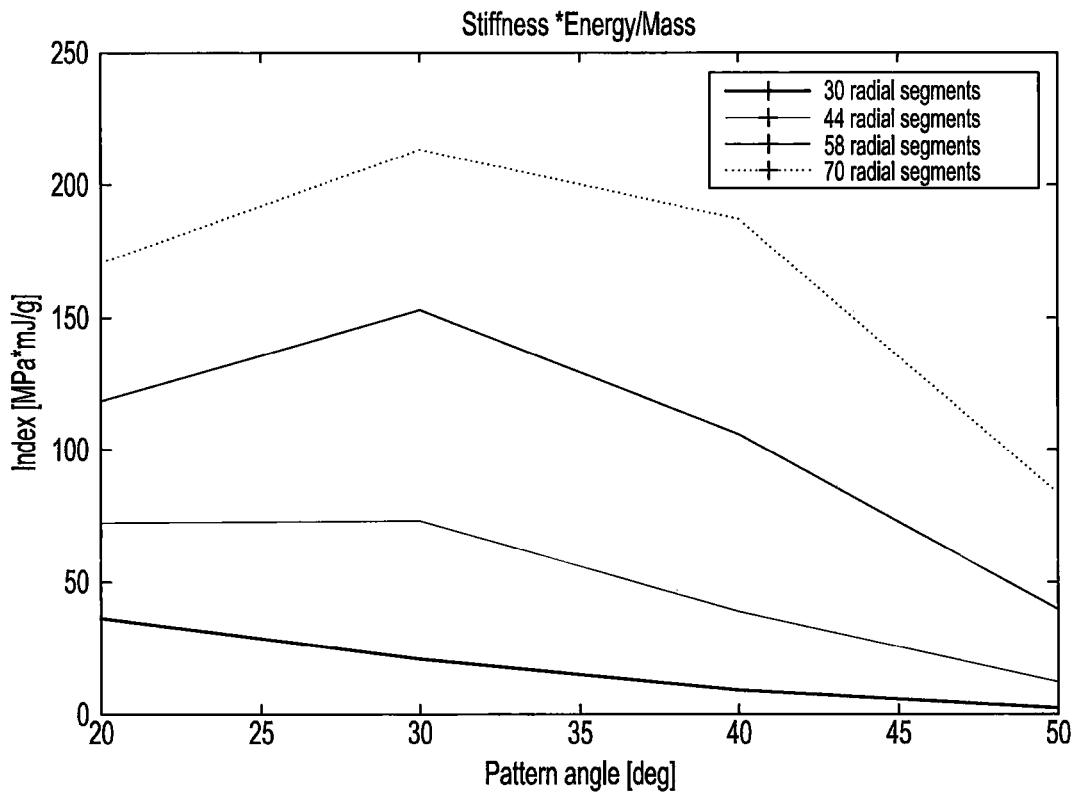
FIG. 83 shows a merit function evaluation for each model in the parametric matrix.

Figure 83 : Merit function evaluation for each model in the parametric matrix

4 Materials machine testing and correction of Abaqus simulations

4.1 Fold line perforations

The Abaqus simulations performed on a series of parametric models provide a good comparative analysis to quantify how modifying the geometry of an origami structure influences its performance in proportion.

However, an important simplification in the modelling of the origami structures on Abaqus makes the values (of stiffness and energy absorbed) inaccurate. Indeed, the model imported from FreeformOrigami into Abaqus is a three-dimensional object to which a thickness is added, with the surface of the object as the mid-plane. However, the structure is manufactured by laser-cutting perforations along the fold lines of the pattern, and folding the sheet creates permanent plastic deformation along the fold lines (Figure 84 ), which greatly reduces the stiffness of the structure in compression.

Figure 84:
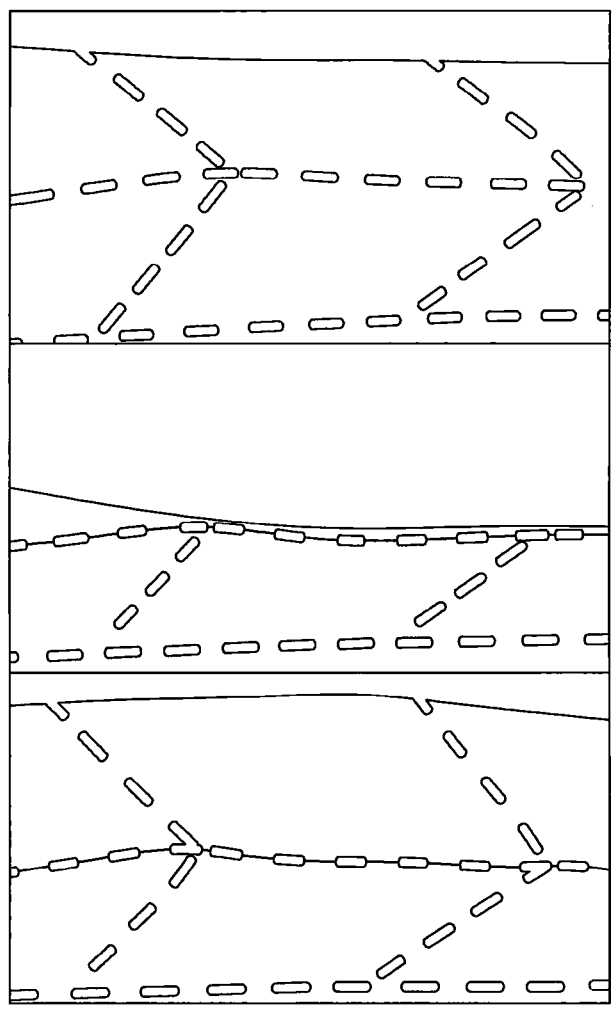
FIG. 84 shows the appearance of plastic deformation along fold line during manufacturing.

Figure 84 : The appearance of plastic deformation along fold line during manufacturing As seen in the visual outputs from the Abaqus simulations (Figure 73 ), the fold lines of the structure carry most of its stiffness. It is therefore crucial to account for the reduced stiffness which exists along the perforated and plastically deformed fold lines.

Figure 85:
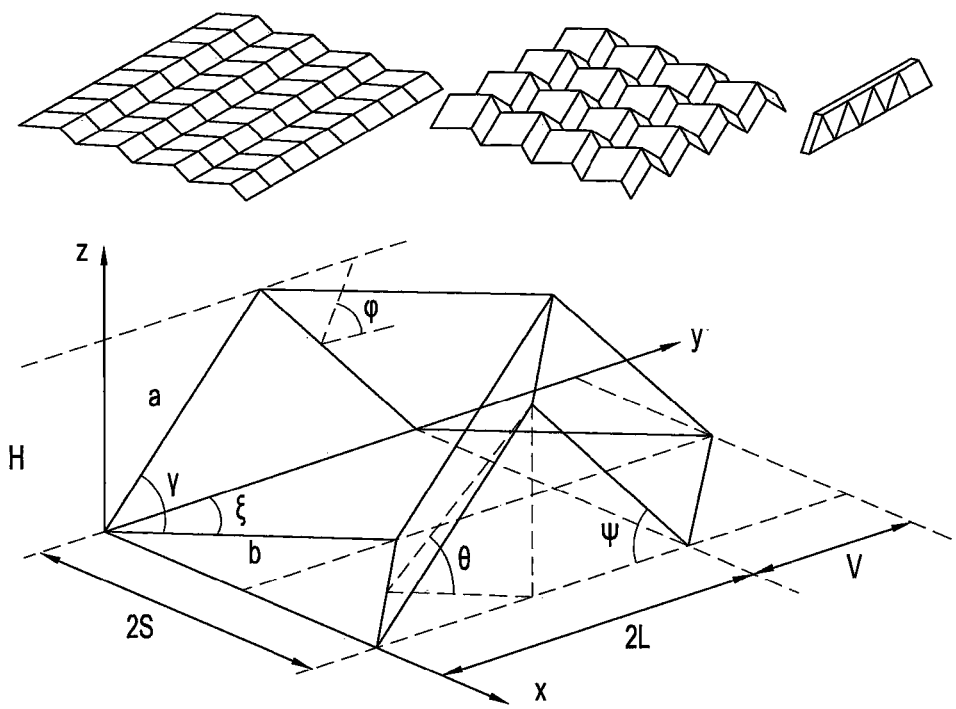
FIG. 85 shows a geometry of a Miura-ori unit cell.

As a platform for the materials analysis of fold lines, we use a compression test on a Miura-ori unit cell (Figure 85 ). It provides a convenient set up for computational and experimental analysis. It is relevant to use this cell since our protection structure is based on the same geometry and experiences similar bending and sheer forces under compression. However, this rectangular cell is a module of an open origami structure (4 open sides), whilst our model is a closed version of it (only 2 open sides) and comprises of curved unit cells. As a result, the rectangular Miura-ori cell (unlike the cells constituting the circular protective structure) is a rigid-foldable origami structure, meaning its facets remain planar during folding. By using such a structure, we assume the results of a materials analysis of the fold lines on a rigid-foldable structure can be translated to our non-rigid-foldable structure.

Figure 85 : Geometry of a Miura-ori unit cell

We start by parametrically modelling this unit cell in Rhinoceros as a three-dimensional surface object. The key function used to determine the rotation of each facet during folding is $$\tan \xi = \cos \theta \tan \gamma.$$

While this model is folded, each facet experiences the same rate and magnitude of rotational and translation motion, only in different directions. It is therefore only necessary to define the geometric parameters of one facet, and the others are modelled by translating its mirror images. The parameters which define this model are the lengths of segments $a$ and $b$, the pattern angle $\gamma$ and the fold angle $\theta$.

4.2 Compression tests on a Muira-ori unit cell

As with the model of the full protection structure, this analysis consists of compressing this unit cell (along the x-axis in Figure 85 ) and output the reaction force vs. displacement curve of the compressive plate. As a reference simulation, we compress a unit cell which is modelled in the same way as the circular origami model. The unit parametric model is dimensioned to match the size and folding angle of an average unit cell comprising the full circular origami model. The surface model is then 'frozen' using the Baking tool in Rhinoceros, and imported in Abaqus as a shell model to which thickness is added. The visual representation of its simulation is seen in Figure 86 .

Figure 86:
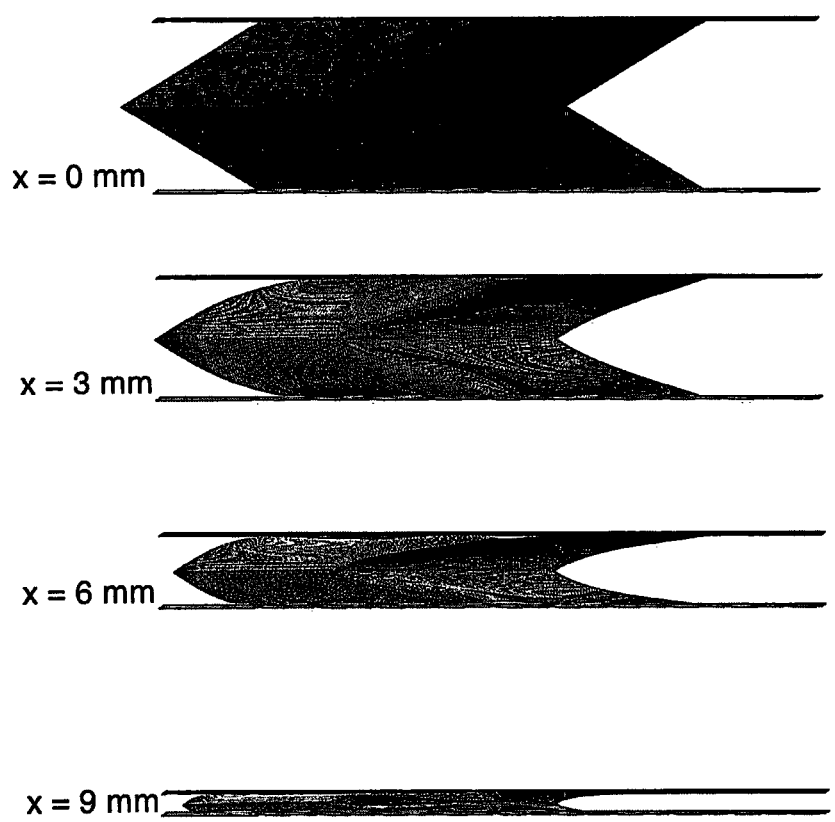
FIG. 86 shows a simulation of the reference unit cell, modelled as a solid shell.

Figure 86 : Simulation of the reference unit cell, modelled as a solid shell

Figure 87:
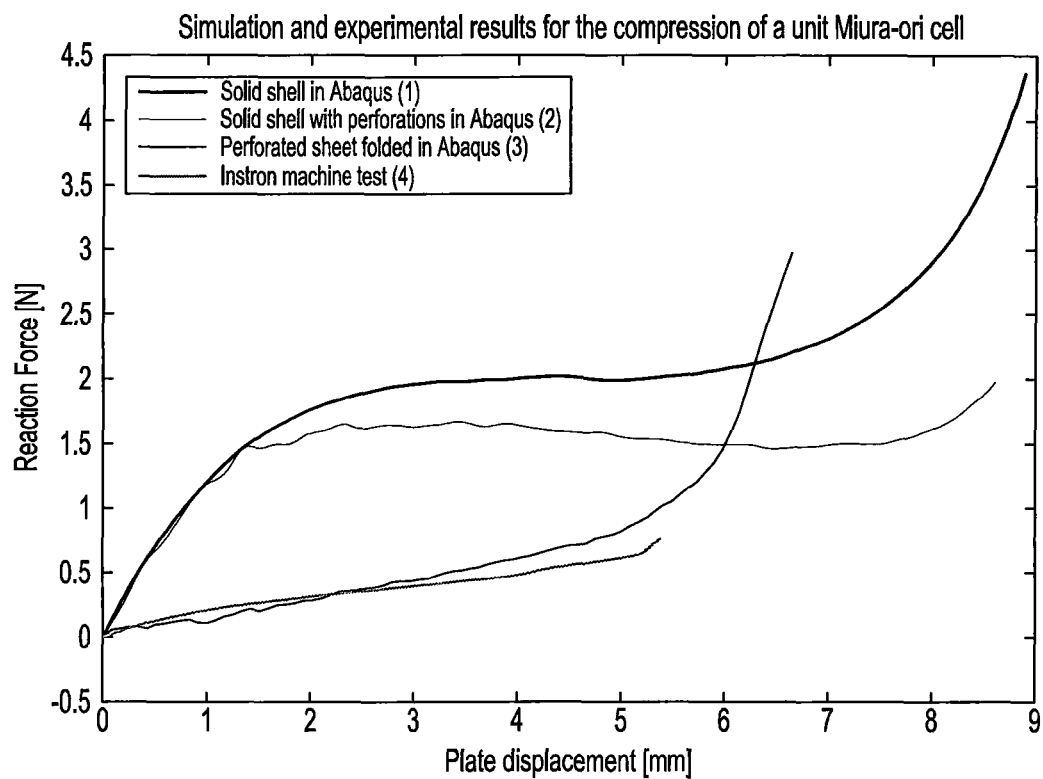
FIG. 87 shows a numerical output of Miura-ori unit cell compression tests.

The numerical output of this simulation is curve (1) in Figure 87, which shows an initial negative curvature (slowly decaying gradient) similar to those seen in the force vs. displacement curve of the full circular origami structure. As multiple origami cells are successively compressed in the full circular structure, its curve is in a way a superposition of multiple unit cell curves.

The other curves in Figure 87 are the results of the next three compression tests explained in this section.

Figure 87 : Numerical output of Miura-ori unit cell compression tests

Figure 88:
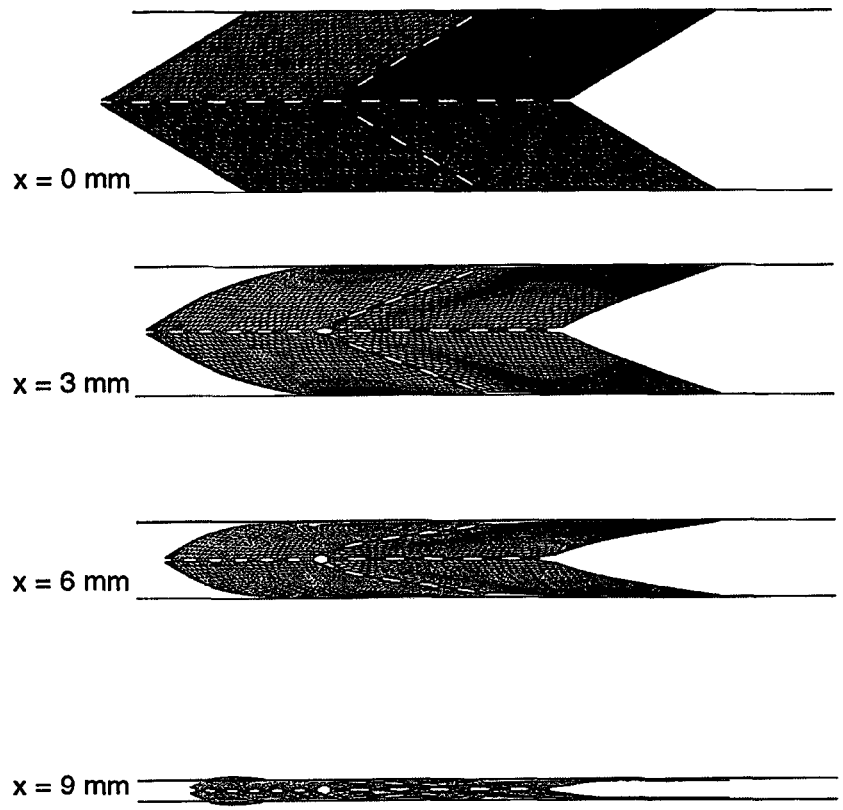
FIG. 88 shows a simulation of a solid shell unit cell with perforations.

Curve (2) in Figure 87 shows the results of the same solid shell as the previous simulation, with the addition of perforations along the fold lines (Figure 88 ). The length, width, depth and spacing between these perforations are the same as on our reference origami structure.

Figure 88 : Simulation of solid shell unit cell with perforations

In this case, the initial stiffness of the cell is the same, but plastic deformation quickly occurs along the fold lines with the guidance of the perforations. This plastic deformation weakens the structure and less energy is absorbed.

The third Abaqus simulation performed to analyse the performance of a unit cell attempts to incorporate the manufacturing process in Abaqus before performing the compression test. To do so, we use control points on the edges of an unfolded unit cell model (Figure 89 ) and impose a displacement on each of them. To know the position which each control point needs to have at each stage of the fold, we simply measure it using our Rhinoceros/Grasshopper parametric model (Figure 90 ).

Figure 89:
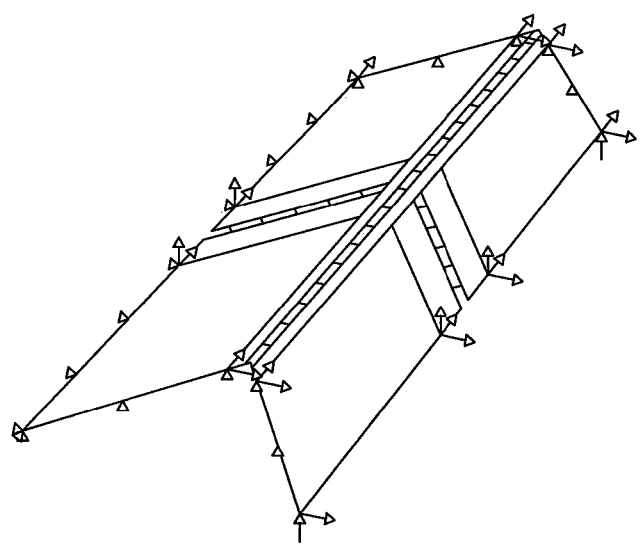
FIG. 89 shows control points in the Abaqus simulation set up.

Figure 89 : Control points in the Abaqus simulation set up

Figure 90:
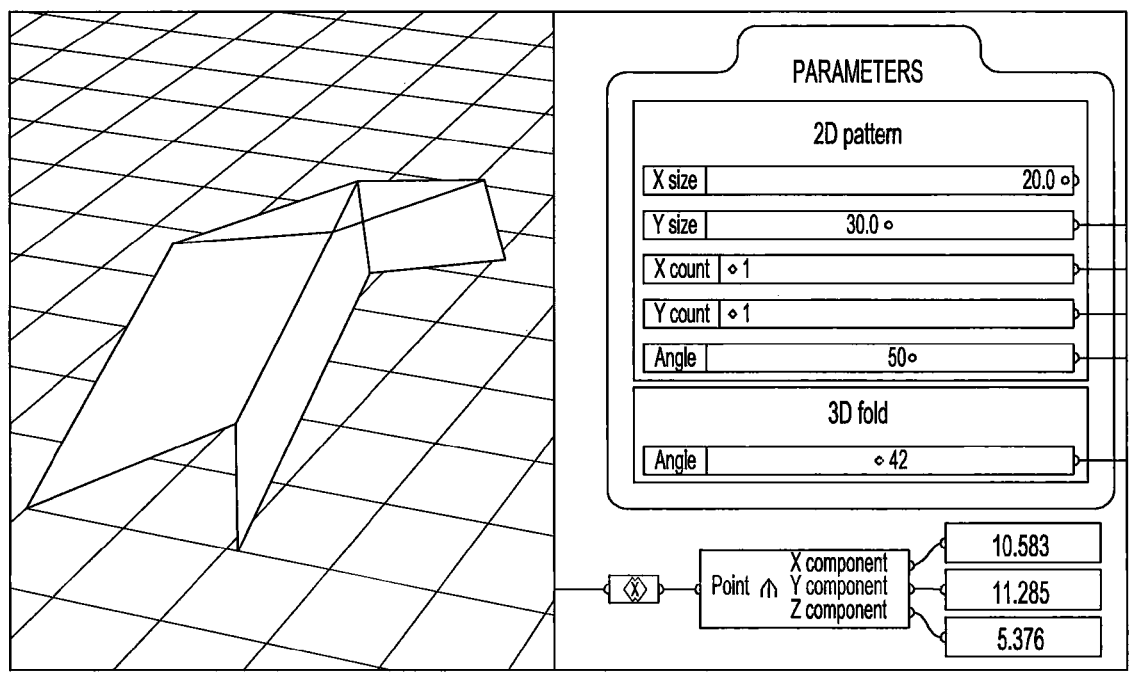
FIG. 90 illustrates the evaluation of the coordinates of a control point using Rhinoceros/Grasshopper.
Figure 91:
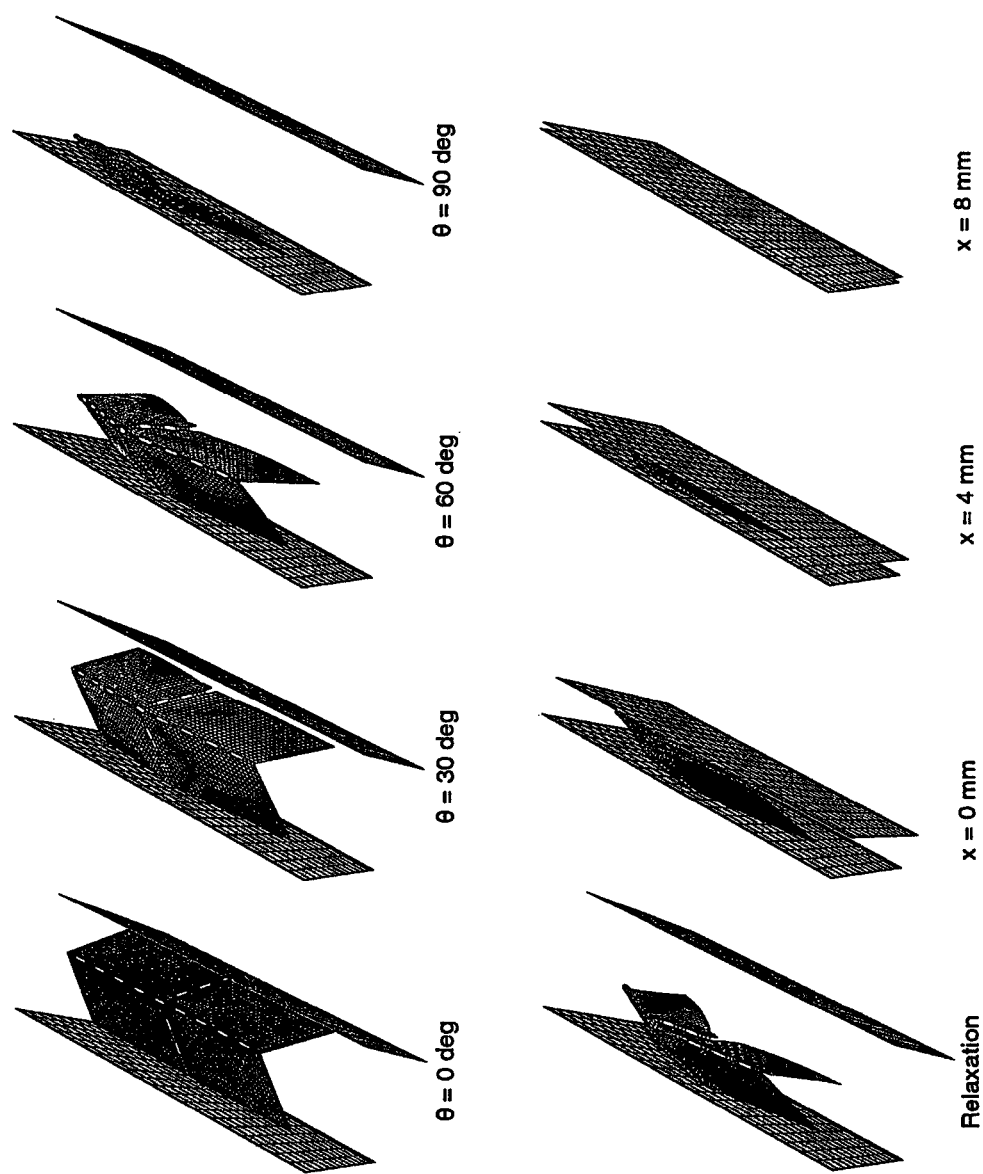
FIG. 91 illustrates the folding, relaxing and compressing of a unit cell in Abaqus.

Figure 90 : Evaluating the coordinates of a control point using Rhinoceros/Grasshopper This particular simulation constitutes of three stages. Firstly, the sheet is fully folded by imposing displacement to its control points, in order to plastically deform it along its fold lines. It is then relaxed to reached its natural folding state. Finally, it is compressed in the same manor as the two previous simulations. Figure 91 shows the visual representation of this simulation and curve (3) in Figure 87 shows its force vs. displacement curve.

Figure 91 : Folding, relaxing and compressing a unit cell in Abaqus

Whilst the numerical output clearly indicates the model is weakened by the plastic deformation created along its fold lines, this simulation is not satisfactory for the basis of a materials analysis. Its force vs. displacement curve doesn't indicate a curvature to be compared against the reference simulation. It is also extremely computationally expensive and Abaqus is found to be an unreliable tool to carry out materials analysis on a micro-scale.

Instead, we chose to carry out quasi-static compression tests (Figure 92 ) on Miura-ori unit cells which are laser cut and folded in the same way as the full circular protection structure. The output for a test performed on a cell with the same geometry and perforation sizes as our reference model is shown as curve (4) in Figure 87 . It shows a general allure comparable to the reference simulation, with an initial negative curvature.

Figure 92:
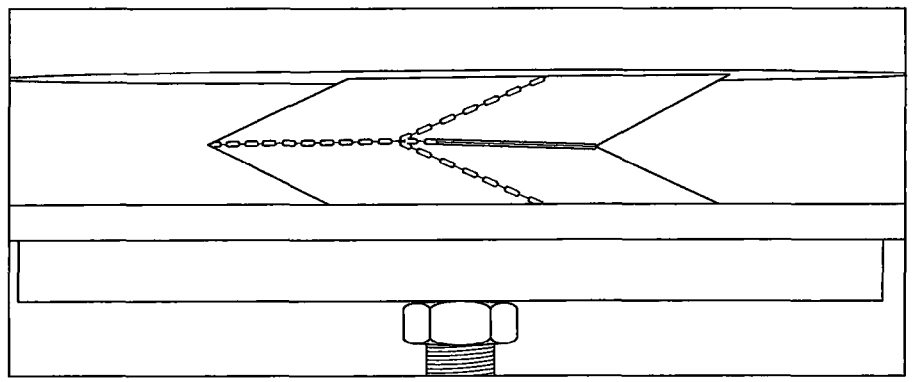
FIG. 92 shows a manufactured unit cell in the Instron materials testing machine.

Figure 92 : Manufactured unit cell in the Instron materials testing machine

4.3 Formulation of a stiffness correction factor

As the manufactured and tested unit cell shows a force vs. displacement curve which has a similar appearance than that of the reference (solid shell) unit cell, we set out to quantify the the difference in magnitude between them (which corresponds to the difference in stiffness) and formulate a correction factor which can be translated to the simulation of the full circular structure.

The force vs. displacement curves of the machine tested cells of the reference model all have the same appearance. They initially indicate a high gradient which slowly decays as the structure is folded. At the end of the compression, the facets become fully folded and the gradient increases as the force recorded is the result of plastic strain.

Figure 93:
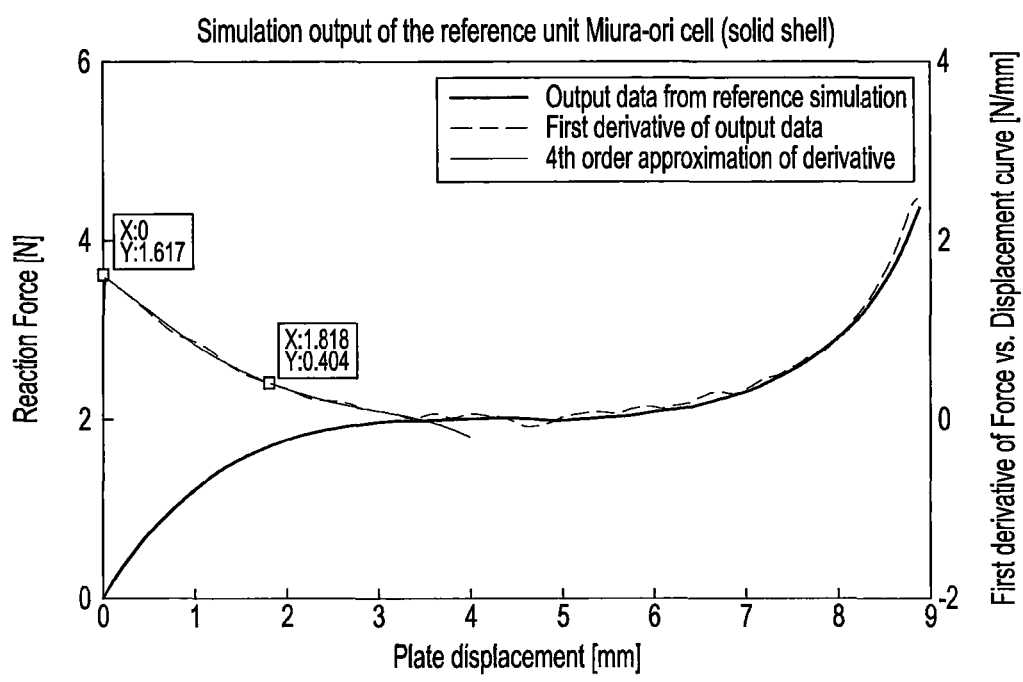
FIG. 93 illustrates the evaluation of a value for stiffness from a force vs. displacement curve.

Figure 93 shows the force vs. displacement curve of the reference unit cell (Figure 86 ) with its first derivative and a 4th order approximation of this derivative for the beginning of compression. This approximation is created with the MATLAB Basic Fitting tool.

Figure 93 : Evaluating a value for stiffness from a force vs. displacement curve We need a consistent method to evaluate the elastic stiffness of such a cell in compression, despite the fact that the gradient is not constant. We choose the define the stiffness as the average gradient from the beginning of the compression (maximum gradient) to the point when the gradient has decayed by four times it's initial value. In Figure 93, two data points indicate the range used to calculate the stiffness of the structure (average of the first derivative between these two points). This method was found to be the most reliable to compare the elastic stiffness of unit cells in a consistent way.

In the case of the reference unit cell, the initial (maximum) gradient is 1.617 N/mm, but the average gradient up until a quarter of this value is 0.9410 N/mm. Using the same method, the measurement obtained for the quasi-static machine test on a cell of the same geometry (curve (4) in Figure 87) is 0.1471 N/mm, which is 6.4 times less.

Figure 94:
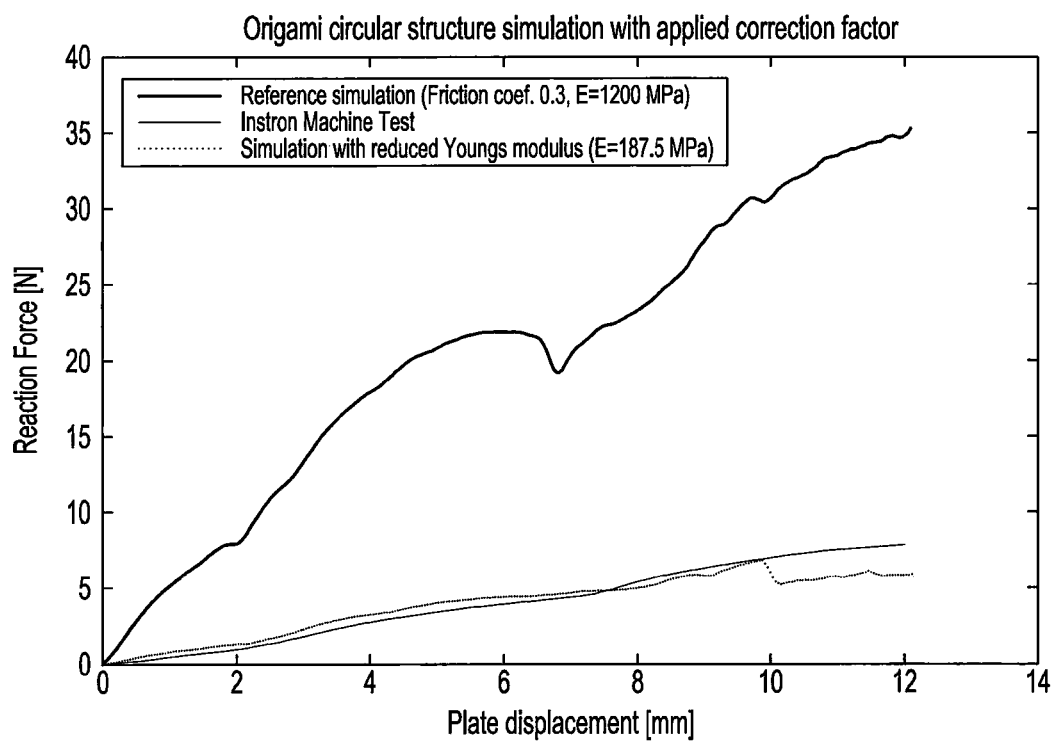
FIG. 94 illustrates the validation of the simulation with corrected stiffness against quasi-static test.
Figure 95:
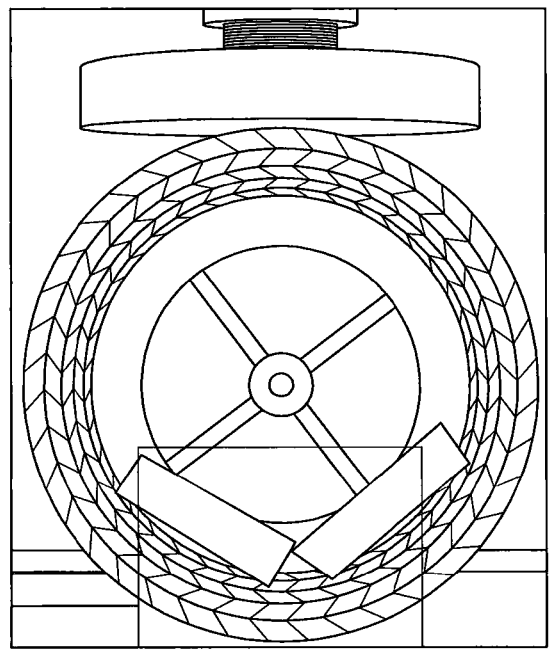
FIG. 95 shows a reference origami model in the Instron material testing machine, assembled on a rigid frame.

This factor serves as a basis for modifying the stiffness of the material used in the Abaqus simulations of the reference circular origami structure. Indeed, an approximation is made to model polypropylene with a Young's modulus reduced by a factor of 6.4 (from 1200 MPa to 187.5 MPa). Figure 94 presents the output data of this simulation, compared to that of a quasi-static test performed on a manufacture circular structure of the same geometry (Figure 95 ). For this materials machine test, the manufactured structure is assembled to a 3D-printed rigid frame to be compared with the rigid body constraint imposed on the inner vertices of the structure in the Abaqus simulation. As can be seen, the simulation with the reduced Young's modulus compares well to the quasi-static test, not only in terms of initial stiffness but also in terms of the evolution of its gradient and total energy absorbed.

The factor obtained from comparing the stiffness of Miura-ori unit cells, when used as reduction factor on the stiffness of polypropylene in the material property settings of Abaqus, provides Figure 94 : Validating the simulation with corrected stiffness against quasi-static test Figure 95 : Reference origami model in the Instron material testing machine, assembled on a rigid frame very satisfactory results compared to a quasi-static test of the protection structure. The value of this reduction factor is a function only of the manufacturing process and specifically the dimensions of the fold line perforations.

To establish an empirical function relating the geometry of the fold lines perforations to the stiffness reduction factor, quasi-static tests are performed on a series of unit Miura-ori cells.

Figure 96:
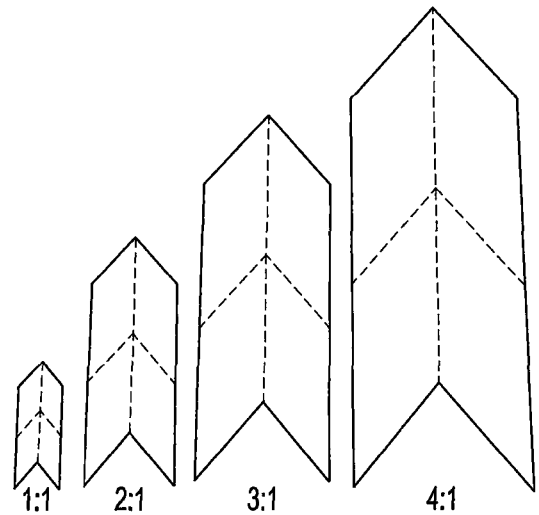
FIG. 96 shows an array of unit cells tested with varying scale compared to our reference.
Figure 97:
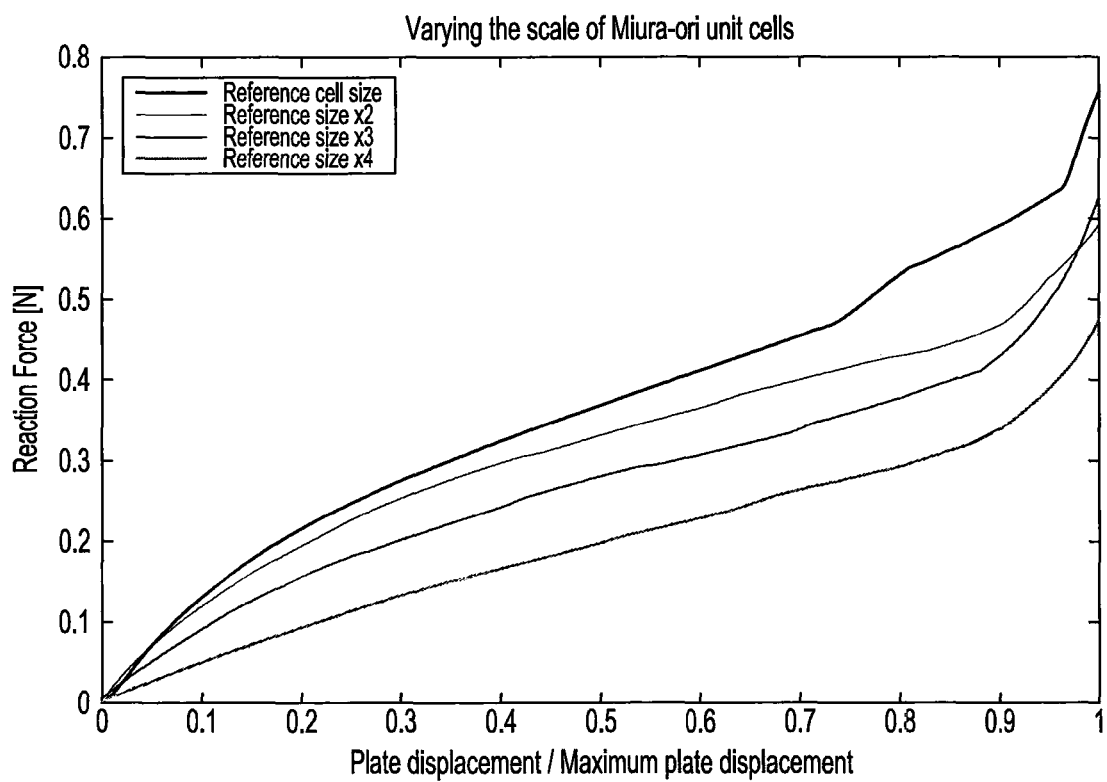
FIG. 97 shows a numerical output of simulations of unit cells of varying scale.

The first variable investigated is the scale of the unit cell tested. Figure 96 shows four cells which were folded and compressed to produce the numerical output in Figure 97 . It is clear to see that the smaller cells produce a higher elastic stiffness and can absorb more energy in proportion to their size. This is because each facet is thinner in proportion as it is enlarged, and therefore more prone to experience local buckling.

Figure 96 : Array of unit cells tested with varying scale compared to our reference Figure 97 : Numerical output of simulations of unit cells of varying scale The scale of the unit cell chosen as a reference to determine the stiffness correction factor is dependant on the sizes of cells which compose the full circular origami structure. However, for a fixed geometry, the dimensions of the fold line perforations also have an impact on the value of this correction factor. With the current chosen manufacturing process, these perforations can be defined in terms of their length, the spacing between them and the power at which they are engraved (which affects their width and depth).

Figure 98:
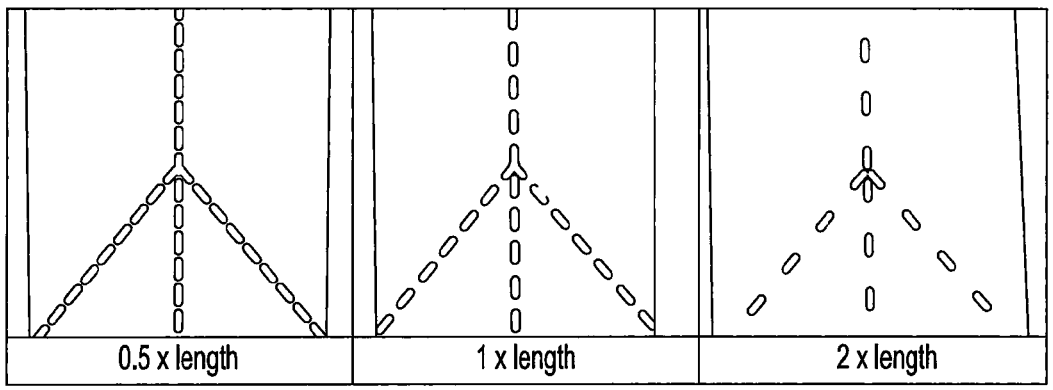
FIG. 98 shows an array of unit cells with varying spacing between fold line perforations.

The next array of unit cells tested have varying spacing between perforations (Figure 98 ).

Figure 99:
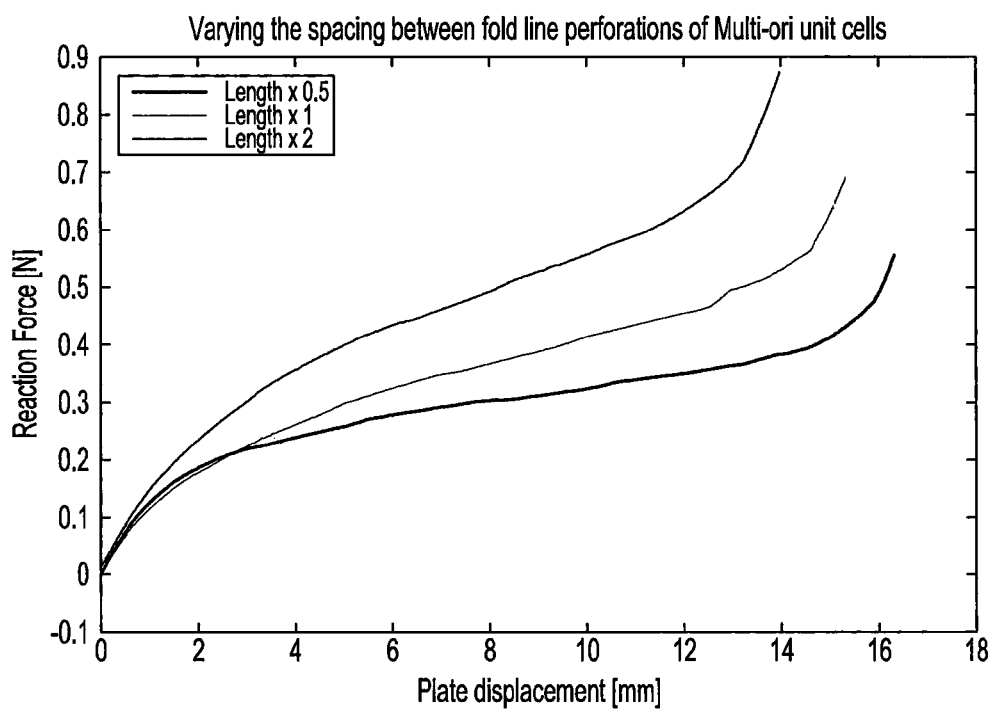
FIG. 99 shows simulations of unit cells of varying spacing between fold line perforations.

Figure 98 : Array of unit cells with varying spacing between fold line perforations Figure 99 : Simulations of unit cells of varying spacing between fold line perforations Larger spacing between fold line perforations increases stiffness, as more material is kept along the fold lines per unit length. The curves in Figure 99 allow us to quantify this increase. A series of test on cells with varying perforation lengths (but constant spacing) was inconclusive in proving a trend in the evolution of stiffness. By only increasing length, the amount of material along the fold lines is kept constant.

The power at which the perforations are created on the laser cutter can be modified, affecting their depth and width. The perforations of cells in Figure 100 were created at different engraving powers. At a power of 3%, the scoring doesn't pierce the whole thickness of the sheet. Figure 101 shows the output of compressive tests on these specimens. A clear trend indicating a loss of stiffness with increasing laser cutting power can be noticed.

Figure 100:
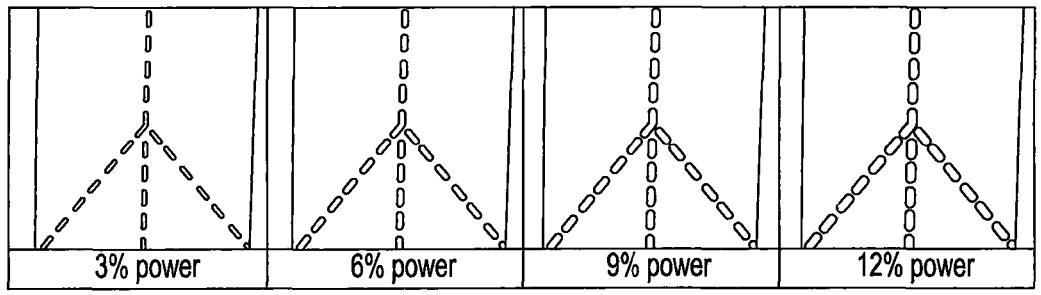
FIG. 100 shows an array of unit cells with varying perforation engraving power.
Figure 101:
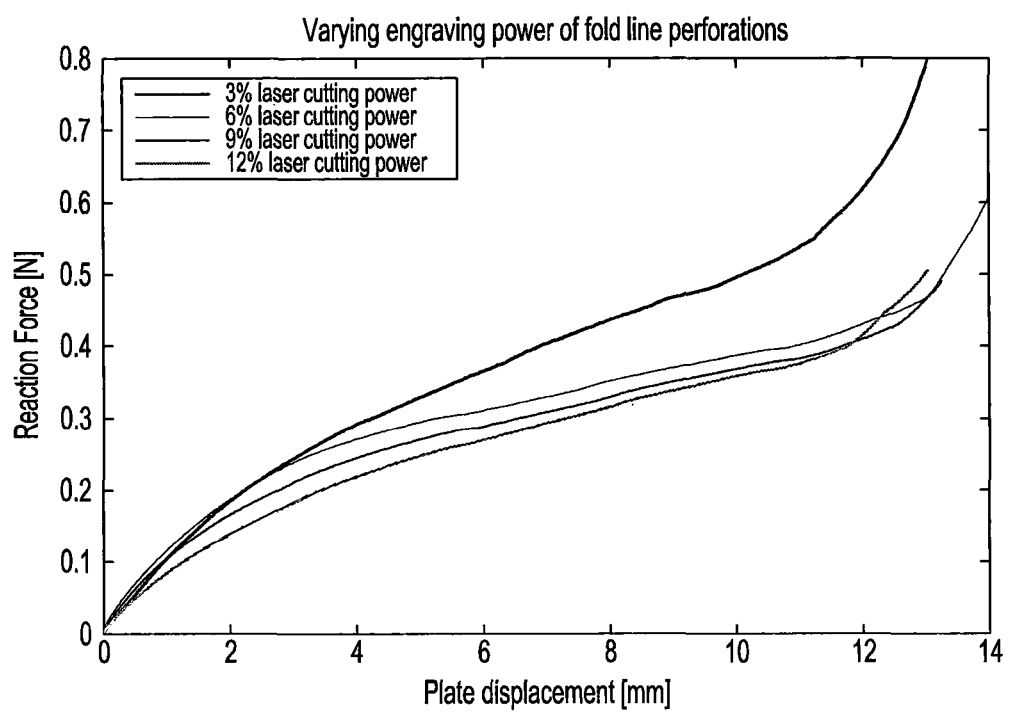
FIG. 101 shows simulations of unit cells with varying perforation engraving power.

Figure 100 : Array of unit cells with varying perforation engraving power

Figure 101 : Simulations of unit cells with varying perforation engraving power

While these series of tests indicate clear trends on the different stiffness properties which arise from varying the dimensions of fold line perforations, a full matrix of tests need to be performed to obtain a reliable empirical function relating all aspects of the manufacturing process to the stiffness of the structure.

The invention claimed is:

1. An aerial device capable of controlled flight, the aerial device comprising:
   a body;
   a rotor arranged to rotate relative to the body; and
   a deployable sheet, the sheet having an undeployed configuration in which the sheet is folded against the body and a deployed configuration in which the sheet is at least partially unfolded away from the body,
   wherein the sheet comprises at least one crease, and wherein the at least one crease of the sheet is scored or perforated.

2. The aerial device of claim 1, wherein the sheet comprises a plurality of creases that define a tessellated surface thereof, and wherein the tessellated surface comprises a plurality of parallelograms defined by the creases.

3. The aerial device of claim 1, wherein the rotor is arranged to rotate in a plane and wherein, in the deployed configuration, the sheet is at least partially unfolded away from the body in a direction parallel to the plane.

4. The aerial device of claim 1 further comprising an actuator operable to deploy the sheet from the undeployed configuration to the deployed configuration and/or to undeploy the sheet from the deployed configuration to the undeployed configuration.

5. The aerial device of claim 4 further comprising a controller arranged to operate the actuator, and at least one sensor for generating sensor data relating to a surrounding environment in which the aerial device is controllably flown, wherein the controller is arranged to operate the actuator based on the sensor data.

6. The aerial device of claim 5, wherein the sensor data includes data relating to a distance between the aerial device and a potential obstacle and the controller is arranged to operate the actuator based on the data relating to the distance.

7. The aerial device of claim 5, the aerial device further comprising an energy store, and wherein the controller is arranged to operate the actuator based on an energy level of the energy store.

8. The aerial device of claim 1, wherein the body defines a space for the rotor to rotate within.

9. The aerial device of claim 8, wherein the space is defined by a duct portion of the body, and further wherein at least a portion of the duct portion is moveable relative to the body so that, when the rotor rotates relative to the body and the at least a portion of the duct portion is moved, a fluid flow through the duct portion is changed.

10. An aerial device capable of controlled flight, the aerial device comprising:
    a body;
    a rotor arranged to rotate relative to the body; a rotor guard arranged to define a space for the rotor to rotate within; and
    one or more deployable structures, each structure having an undeployed configuration in which that structure is compressed against the rotor guard and a deployed configuration in which that structure extends away from the rotor guard,
    wherein at least a portion of the rotor guard is arranged to rotate relative to the body and relative to the rotor.

11. The aerial device of claim 10, wherein the rotor is a first rotor, the aerial device further comprising a second rotor arranged to rotate relative to the body, wherein the rotor guard is arranged to define a space for both the first and second rotors to rotate within.

12. The aerial device of claim 10, wherein an outer perimeter of the rotor guard has one or more radiused corners and at least one of the one or more deployable structures is fixed to one of the radiused corners.

13. The aerial device of claim 10, wherein the deployable structure is a sheet and wherein, in the undeployed configuration, the sheet is folded against the rotor guard and, in the deployed configuration, the sheet is at least partially unfolded away from the rotor guard.

14. The aerial device of claim 13, wherein the rotor is arranged to rotate in a plane and wherein, in the deployed configuration, the sheet is at least partially unfolded away from the body in a direction parallel to the plane.

15. The aerial device of claim 10, wherein the one or more deployable structures comprises a plurality of deployable structures, and wherein each deployable structure is fixed to a respective portion of an outer perimeter of the rotor guard.

16. The aerial device of claim 10, further comprising an actuator operable to deploy the structure from the undeployed configuration to the deployed configuration and/or to undeploy the structure from the deployed configuration to the undeployed configuration.

17. The aerial device of claim 10, wherein the body defines a space for the rotor to rotate within.

18. The aerial device of claim 17, wherein the space is defined by a duct portion of the body, and further wherein at least a portion of the duct portion is moveable relative to the body so that, when the rotor rotates relative to the body and the at least a portion of the duct portion is moved, a fluid flow through the duct portion is changed.

* * * * *